United States Patent
Zhou et al.

(10) Patent No.: US 11,997,606 B2
(45) Date of Patent: May 28, 2024

(54) UPLINK TRANSMISSION IN A WIRELESS COMMUNICATION SYSTEM

(71) Applicant: Ofinno, LLC, Reston, VA (US)

(72) Inventors: Hua Zhou, Herndon, VA (US); Esmael Hejazi Dinan, McLean, VA (US); Alireza Babaei, Fairfax, VA (US); Ali Cagatay Cirik, Herndon, VA (US); Hyoungsuk Jeon, Centreville, VA (US); Kyungmin Park, Vienna, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 413 days.

(21) Appl. No.: 17/188,650

(22) Filed: Mar. 1, 2021

(65) Prior Publication Data

US 2021/0185614 A1   Jun. 17, 2021

Related U.S. Application Data

(63) Continuation of application No. PCT/US2019/048550, filed on Aug. 28, 2019.
(Continued)

(51) Int. Cl.
*H04W 52/02* (2009.01)
*H04L 5/00* (2006.01)
(Continued)

(52) U.S. Cl.
CPC ....... *H04W 52/0235* (2013.01); *H04L 5/0048* (2013.01); *H04L 27/261* (2013.01); *H04W 76/27* (2018.02)

(58) Field of Classification Search
CPC ............. H04W 52/0235; H04W 76/27; H04W 52/0225; H04L 5/0048; H04L 27/261;
(Continued)

(56) References Cited

U.S. PATENT DOCUMENTS 11,277,792 B2* 3/2022 Kadiri .................. H04L 1/0027
2011/0268087 A1  11/2011 Kwon et al.
(Continued)

FOREIGN PATENT DOCUMENTS

WO   2018084544   5/2018

OTHER PUBLICATIONS

3GPP TSG-RAN WG2 Meeting #101 R2-180xxxx; Sanya, China, Apr. 16-20, 2018 R2-1804763; CR-Form-v11.1 Change Request.
(Continued)

*Primary Examiner* — Harry H Kim
(74) *Attorney, Agent, or Firm* — Matthew Fernandez; Kavon Nasabzadeh; Philip R. Smith

(57) ABSTRACT

A wireless device receives radio resource control message(s) comprising configuration parameters of a cell. The configuration parameters comprise a first configuration of a first sounding reference signal of the cell in a first power state, and a second configuration of a second sounding reference signal of the cell in a second power state. A first command indicating transition of the cell into the first power state is received. In response to the first command, the first sounding reference signal is transmitted via the cell. A second command indicating transition of the cell into the second power state is received. In response to the second command, the second sounding reference signal is transmitting via the cell.

20 Claims, 51 Drawing Sheets

Related U.S. Application Data

(60) Provisional application No. 62/736,248, filed on Sep. 25, 2018, provisional application No. 62/723,583, filed on Aug. 28, 2018.

(51) Int. Cl.
  *H04L 27/26* (2006.01)
  *H04W 76/27* (2018.01)

(58) Field of Classification Search
  CPC ... H04L 5/0096; H04L 5/0057; H04L 5/0051; Y02D 30/70
  See application file for complete search history.

(56) References Cited

U.S. PATENT DOCUMENTS

| | | | |
|---|---|---|---|
| 2015/0189574 A1 | 7/2015 | Ng et al. | |
| 2018/0124687 A1 | 5/2018 | Park et al. | |
| 2018/0132266 A1 | 5/2018 | Chen et al. | |
| 2020/0036492 A1* | 1/2020 | Sun | H04L 5/0048 |
| 2020/0059867 A1* | 2/2020 | Haghighat | H04W 52/42 |
| 2021/0014016 A1* | 1/2021 | Liu | H04W 52/42 |
| 2021/0058967 A1* | 2/2021 | Oteri | H04W 72/23 |
| 2021/0083824 A1* | 3/2021 | Wernersson | H04L 5/0051 |
| 2023/0076577 A1* | 3/2023 | Li | H04W 72/21 |
| 2023/0217434 A1* | 7/2023 | Cirik | H04L 5/0094 370/329 |

OTHER PUBLICATIONS

R1-1704282; 3GPP TSG RAN WG1 Meeting #88bis; Spokane, USA, Apr. 3-7, 2017; Agenda Item:7.2.6.2; Source: Huawei, HiSilicon; Title:Considerations on 'wake-up signal' for eFeMTC.

R1-1704290; 3GPP TSG RAN WG1 Meeting #88bis; Spokane, USA, Apr. 3-7, 2017; Agenda Item:7.2.7.1.1; Source: Huawei, HiSilicon; Title:On 'wake-up signal' for paging and connected-mode DRX.

R1-1704531_feMTC_wakeup; 3GPP TSG RAN WG1 Meeting #88bis; Spokane, WA, USA Apr. 3-7, 2017; Agenda item:7.2.6.2.

R1-1704532_eNB-IoT_wakeup; 3GPP TSG RAN WG1 Meeting #88bis; Spokane, WA, USA Apr. 3-7, 2017; Agenda item:7.2.7.1.

R1-1704693; 3GPP TSG RAN WG1 Meeting #88bis; Spokane, USA Apr. 3-7, 2017; Source:Intel Corporation; Title:DL Power Consumption Reduction for efeMTC; Agenda Item:7.2.6.2.

R1-1704698; 3GPP TSG RAN WG1 Meeting #88bis; Spokane, USA Apr. 3-7, 2017; Source:Intel Corporation; Title:DL Power Consumption Reduction for feNB-IoT; Agenda Item:7.2.7.1.1.

R1-1704845; 3GPP TSG RAN WG1 Meeting #88bis; Spokane, USA, Apr. 3-7, 2017; Agenda Item:7.2.6.2; Source: LG Electronics; Title: UE power consumption reduction by new physical channel in MTC.

R1-1704847; 3GPP TSG RAN WG1 Meeting #88bis; Spokane, USA, Apr. 3-7, 2017; Agenda Item:7.2.7.1.1; Source: LG Electronics; Title: UE power consumption reduction by new physical channel in NB-IoT.

R1-1705012 Efficient monitoring of DL control channels; 3GPP TSG RAN WG1 Meeting #88bis; Spokane, Washington, USA, Apr. 3-7, 2017; Agenda item:7.2.6.2; Source: Qualcomm Incorporated; Title:Efficient monitoring of DL control channels.

R1-1705017 Efficient monitoring of DL control channels; 3GPP TSG RAN WG1 Meeting #88bis; Spokane, Washington, USA, Apr. 3-7, 2017; Agenda item:7.2.7.1.1; Source: Qualcomm Incorporated; Title:Efficient monitoring of DL control channels.

R1-1705038; 3GPP TSG RAN WG1 Meeting #88bis; Spokane, USA, Apr. 3-7, 2017; Agenda item:7.2.6.2; Source: Nokia, Alcatel-Lucent Shanghai Bell; Title: Signalling for efficient decoding of physical channels.

R1-1705043; 3GPP TSG RAN WG1 Meeting #88bis; Spokane, USA, Apr. 3-7, 2017; Agenda item:7.2.7.1.1; Source:Nokia, Alcatel-Lucent Shanghai Bell; Title:Signalling for efficient decoding of physical channels.

R1-1705182—Power consumption reduction for paging and connected-mode DRX; 3GPP TSG-RAN1#88bis; Apr. 3-7, 2017; Spokane, Washington, USA; Agenda Item:7.2.7.1.1; Source: Ericsson.

R1-1705192—Downlink channel power efficiency for MTC; 3GPP TSG-RAN1#88bis; Apr. 3-7, 2017; Spokane, Washington, USA; Agenda Item:7.2.6.2; Source: Ericsson.

R1-1705203; 3GPP TSG RAN WG1 Meeting #88bis; Spokane, USA Apr. 3-7, 2017; Agenda Item:7.2.7.1.1; Source: Sony; Title:NB-IoT UE Power Consumption Reduction in Idle Mode Paging ; Document for:Discussion / Decision.

R1-1705204; 3GPP TSG RAN WG1 Meeting #88bis; Spokane, USA Apr. 3-7, 2017; Agenda Item:7.2.6.2; Source: Sony; Title:MTC UE Power Consumption Reduction in Idle Mode Paging; Document for:Discussion / Decision.

R1-1705305; 3GPP TSG RAN WG1 #88bis; Spokane, USA, Apr. 3-7, 2017; Agenda item:7.2.6.2; Source: Samsung ; Title: Power consumption reduction for paging and connected-mode DRX for eMTC; Document for: Discussion and Decision.

R1-1705309; 3GPP TSG RAN WG1 #88bis; Spokane, USA, Apr. 3-7, 2017; Agenda item:7.2.7.1.1; Source: Samsung ; Title: Power consumption reduction for paging and connected-mode DRX for NB-IOT; Document for: Discussion and Decision.

R1-1705494; 3GPP TSG RAN WG1 Meeting #88bis; Spokane, USA Apr. 3-7, 2017; Source: ZTE, ZTE Microelectronics; Title: Power consumption reduction for physical channels for MTC; Agenda item:7.2.6.2; Document for:Discussion and Decision.

R1-1705495; 3GPP TSG RAN WG1 Meeting #88bis; Spokane, USA Apr. 3-7, 2017; Source: ZTE, ZTE Microelectronics; Title: Power consumption reduction for physical channels for NB-IoT; Agenda item:7.2.7.1.1; Document for:Discussion and Decision.

R1-1706882 Downlink channel power efficiency for MTC; 3GPP TSG-RAN WG1 #89; Hangzhou, P.R. China May 15-19, 2017; Agenda Item:6.2.6.2; Source:Ericsson; Title:Downlink channel power efficiency for MTC.

R1-1707018; 3GPP TSG RAN WG1 Meeting #89; Hangzhou, China, May 15-19, 2017; Agenda Item:6.2.6.2; Source: Huawei, HiSilicon; Title:On 'wake-up signal' for eFeMTC.

R1-1707101 power consumption for MTC 0505; 3GPP TSG-RAN WG1 Meeting #89 ; Hangzhou, China, May 15-19, 2017; Source: ZTE; Title:Power consumption reduction for physical channels for MTC; Agenda item:6.2.6.2; Document for:Discussion and Decision.

R1-1707315; 3GPP TSG RAN WG1 Meeting #89; Hangzhou, P.R. China May 15-19, 2017; Source:Intel Corporation; Title:Analysis of impact of Wake-up signaling on power consumption and resource efficiency for efeMTC; Agenda Item:6.2.6.2.

R1-1707455_feMTC_wakeup; 3GPP TSG RAN WG1 Meeting #89; Hangzhou, China, May 15-19, 2017; Agenda Item:6.2.6.2.

R1-1707568; 3GPP TSG RAN WG1 Meeting #89; Hangzhou, P.R. China May 15-19, 2017; Agenda Item:6.2.6.2; Source: LG Electronics; Title: UE power consumption reduction by new physical signal/channel in MTC.

R1-1707862; 3GPP TSG RAN WG1 Meeting #89; Hangzhou, P.R. China, May 15-19, 2017; Agenda item:6.2.6.2; Source:Nokia, Alcatel-Lucent Shanghai Bell; Title:Signalling for efficient decoding of physical channels.

R1-1708311 Idle Mode V2; 3GPP TSG RAN WG1 Meeting #89 ; Hangzhou, P.R. China May 15-19, 2017; Agenda Item:6.2.6.2 Downlink channel power efficiency; Source: Sierra Wireles.

R1-1708796 Efficient monitoring of DL control channels; 3GPP TSG RAN WG1 Meeting #89; Hangzhou, China, May 15-19, 2017; Agenda item:6.2.6.2; Source: Qualcomm Incorporated; Title:Efficient monitoring of DL control channels.

R1-1712106; 3GPP TSG RAN WG1 Meeting #90; Prague, Czech Republic, Aug. 21-25, 2017; Agenda Item:5.2.6.2; Source:Huawei, HiSilicon; Title:On power-saving signal for eFeMTC.

R1-1712153; 3GPP TSG RAN WG1 Meeting #90; Prague, Czech Republic, Aug. 21-25, 2017; Agenda Item:6.1.3.5; Source:Huawei, HiSilicon; Title:Overview of bandwidth part.

(56) References Cited

OTHER PUBLICATIONS

R1-1713204 wideband; 3GPP TSG RAN WG1 Meeting #90; Prague, Czech Republic Aug. 21-25, 2017; Agenda Item:6.1.5; Source: LG Electronics; Title: Further remaining details on wider bandwidth operation.
R1-1713978_further details on bandwidth part operation in NR; 3GPP TSG RAN WG1 Meeting #90R1-17013978 Prague, Czech Republic, Aug. 21-25, 2017; Agenda Item: 6.1.3.5; Source: MediaTek Inc.; Title: Further Details on Bandwidth Part Operation in NR; Document for: Discussion.
R1-1719650 ATT BWP; 3GPP TSG RAN WG1 Meeting 91; Reno, USA, Nov. 27-Dec. 1, 2017; Agenda Item:7.3.4.1; Source:AT&T; Title:Remaining details on bandwidth parts.
R1-1719651 ATT CA; 3GPP TSG RAN WG1 Meeting 91; Reno, USA, Nov. 27-Dec. 1, 2017; Agenda Item: 7.3.4.2; Source:AT&T; Title:Remaining details on carrier aggregation.
R1-1721027; 3GPP TSG RAN WG1#91; Reno, USA, Nov. 27-Dec. 1, 2017; Source:Ericsson; Title:On Carrier aggregation related aspects; Agenda Item:7.3.4.2.
R1-1800879 Remaining issues on BWP; 3GPP TSG RAN WG1 Meeting AH 1801; Vancouver, Canada, Jan. 22-26, 2018; Agenda item:7.3.4.1; Source: Qualcomm Incorporated; Title: Remaining Issues on BWP.
R2-1713170_Report of [99bis#32] Faster activation for SCells; 3GPP TSG-RAN WG2 #100; Reno, USA, Nov. 27-Dec. 1, 2017; Agenda item:9.9.2; Source:Nokia (rapporteur); Title:Report of [99bis#32][LTE/euCA] Faster activation for Scells (Nokia).
R2-1714289_euCA Stage-2 running CR (Rel-15)_v3; 3GPP TSG-RAN WG2 #100; Reno, USA, Nov. 27-Dec. 1, 2017; CR-Form-v11.1.
R2-1801432; 3GPP TSG-RAN WG2 Meeting NR Ad-Hoc #1; Vancouver, Canada, Jan. 22-26, 2018; Agenda item: 10.3.1.2; Source: Qualcomm; Title: Dormant BWP for fast SCell activation.
R2-1802756; 3GPP TSG-RAN WG2 #101; Athens, Greece, Feb. 26-Mar. 2, 2018; Agenda item: 9.9.2; Source: Nokia, Nokia Shanghai Bell; Title: Remaining details on temporary CQI reporting during activation.
R2-1803564; 3GPP TSG-RAN WG2 Meeting #101; Athens, Greece, Feb. 26-Mar. 2, 2018 Resubmission of R2-1801432 ; Agenda item: 10.3.1.2; Source: Qualcomm; Title: Dormant BWP for fast SCell activation.
R2-1806774; 3GPP TSG-RAN WG2 Meeting #102; Busan, South Korea, May 21-25, 2018; Agenda item: 9.9.2; Source: Nokia, Nokia Shanghai Bell; Title: Finalization of dormant Scell state.
R2-1806924; 3GPP TSG-RAN2 Meeting #102; Busan, S. Korea, May 21-25, 2018; (Revision of R2-1804548); Agenda item: 9.9.2; Source: Qualcomm Inc; Title: SCell Dormant State Transitions based on New Timers & MAC-CEs.
R2-1807481; 3GPP TSG-RAN WG2 Meeting #102; Busan, Korea, May 21-25, 2018; revision on R2-1804654; Agenda item: 9.9.2; Source: Huawei, HiSilicon; Title: Remaining issues of temporary CQI reporting.
R2-1808570; 3GPP TSG-RAN WG2 Meeting #102; Busan, Korea, May 21-May 25, 2018 Resubmission of R2-1805748; Agenda item: 10.3.1.2; Source: Qualcomm Inc; Title: Dormant BWP for fast SCell activation.
R2-1808809; 3GPP TSG-WG2 Meeting #102 R2-1808809; Busan, Republic of Korea, May 20-25, 2018; Title: CR on Dormat SCell state transition MAC CE.
Tdoc R2-1810063; 3GPP TSG-RAN WG2 AH 1807 Tdoc R2-1810063; Montreal, Canada, Jul. 2-6, 2018; Agenda Item: 10.3.1.13; Source: Ericsson; Title: Dormant SCell state in NR.
RP-181344RP-181158; 3GPP TSG-RAN#80 RP-181344RP-181158; La Jolla, CA, USA, Jun. 11-14, 2018; Source: Ericsson, Nokia, Nokia Shanghai Bell, Huawei; Title: New WID on MR-DC enhancements (NR_MRDC_Enh).
International Search Report for International Application No. PCT/US2019/048550, dated Oct. 28, 2019.
R2-1707787; 3GPP TSG-RAN2 Meeting #99 R2-1707787; Berlin, Germany, Aug. 21-25, 2017; Agenda item: 9.9.2 Source: Qualcomm Incorporated; Title: Fast SCell activation for enhanced CA utilization.

* cited by examiner

User Plane Protocol Stack

Control Plane Protocol Stack

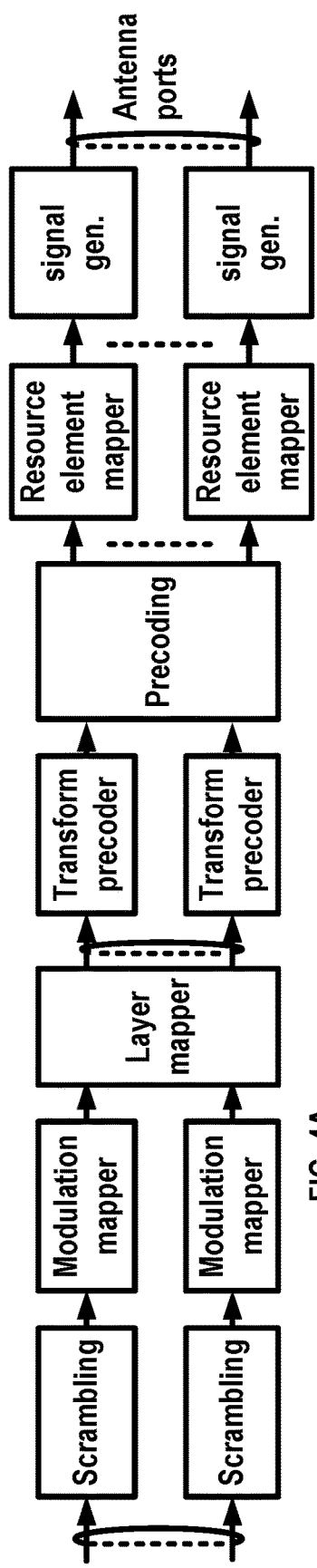
FIG. 4A
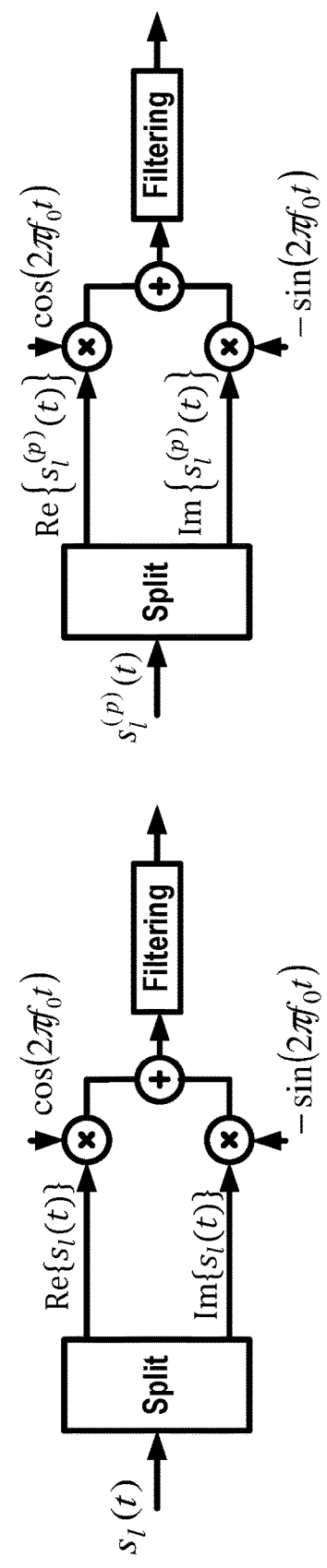
FIG. 4B
FIG. 4D
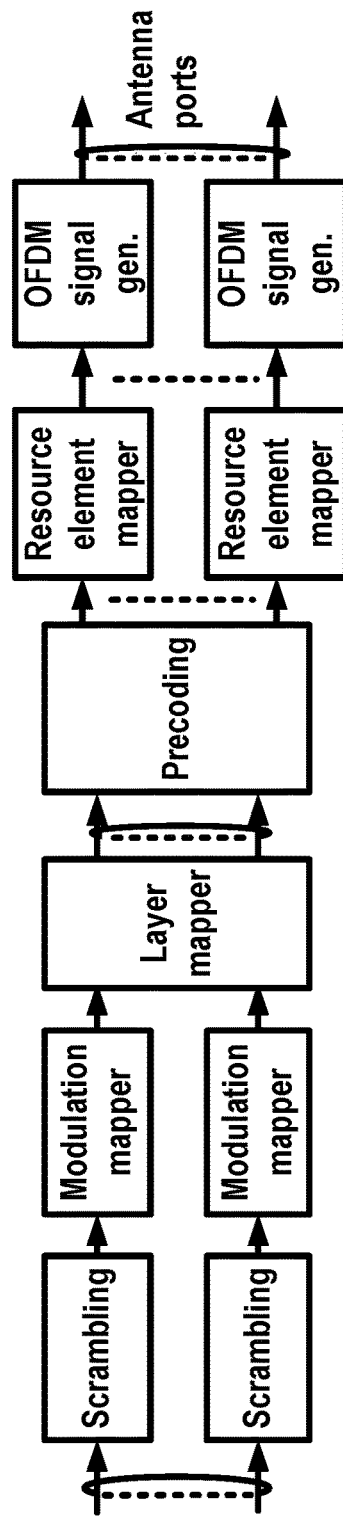
FIG. 4C

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

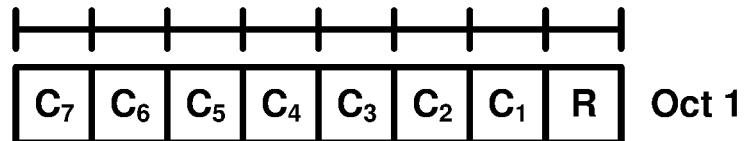
FIG. 21A
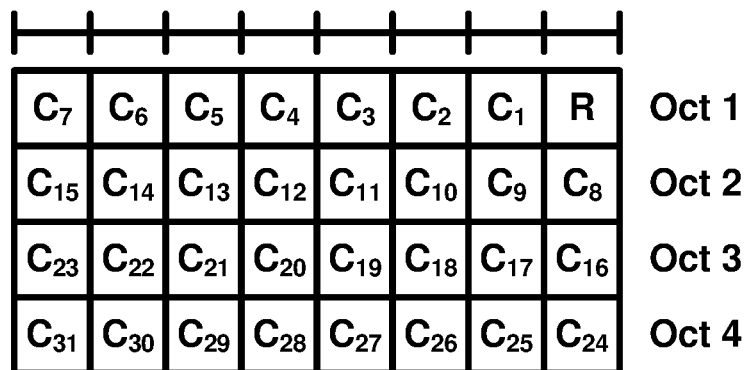
FIG. 21B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 21C

```
┌─────────────────────────────────────────────────────────┐
│ Receive configuration parameters of a cell, comprising first │
│ configuration of first SRS(s) for a first power state and second │
│   configuration of second SRS(s) for a second power state   │
│                           4410                          │
└─────────────────────────────────────────────────────────┘
                              │
                              ▼
┌─────────────────────────────────────────────────────────┐
│  Receive a first command indicating transition of the cell into  │
│                     the first power state                │
│                           4420                          │
└─────────────────────────────────────────────────────────┘
                              │
                              ▼
┌─────────────────────────────────────────────────────────┐
│    Transmit the first SRS(s) via the cell in the first power state   │
│                           4430                          │
└─────────────────────────────────────────────────────────┘
                              │
                              ▼
┌─────────────────────────────────────────────────────────┐
│ Receive a second command indicating transition of the cell into  │
│                    the second power state               │
│                           4440                          │
└─────────────────────────────────────────────────────────┘
                              │
                              ▼
┌─────────────────────────────────────────────────────────┐
│  Transmit the second SRS(s) via the cell in the second power   │
│                            state                        │
│                           4450                          │
└─────────────────────────────────────────────────────────┘
```

FIG. 44

Receive configuration parameters of a cell, comprising first parameters of a first power state and a second power state, and second parameters of uplink radio resources of SRS(s) in the first power state
4810

Transmit, in the first power state, the SRS(s) via at least one of the uplink radio resources of the cell, the SRS(s) indicating a transition of the cell to the second power state
4820

Transition the cell to the second power state from the first power state
4830

Start monitoring a PDCCH via the cell for receiving a DCI
4840

Transmit transport blocks via an uplink grant based on the DCI
4850

FIG. 48

UPLINK TRANSMISSION IN A WIRELESS COMMUNICATION SYSTEM

CROSS-REFERENCE TO RELATED APPLICATIONS

This application is a continuation of International Application No. PCT/US2019/048550, filed Aug. 28, 2019, which claims the benefit of U.S. Provisional Application No. 62/723,583, filed Aug. 28, 2018, and U.S. Provisional Application No. 62/736,248, filed Sep. 25, 2018, each of which is hereby incorporated by reference in its entirety.

BRIEF DESCRIPTION OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 18 is an example of LCIDs for DL-SCH as per an aspect of an embodiment of the present disclosure.

FIG. 19 is an example of LCIDs for UL-SCH as per an aspect of an embodiment of the present disclosure.

FIG. 21A is an example of an SCell hibernation MAC CE of one octet as per an aspect of an embodiment of the present disclosure.

FIG. 21B is an example of an SCell hibernation MAC CE of four octets as per an aspect of an embodiment of the present disclosure.

FIG. 21C is an example of MAC control elements for an SCell state transitions as per an aspect of an embodiment of the present disclosure.

FIG. 44 a flowchart of an example SRS transmission in a power saving state as per an aspect of an embodiment of the present disclosure.

FIG. 48 is a flowchart of an example SRS transmission in a power saving state as per an aspect of an embodiment of the present disclosure.

DETAILED DESCRIPTION

Figure 1:
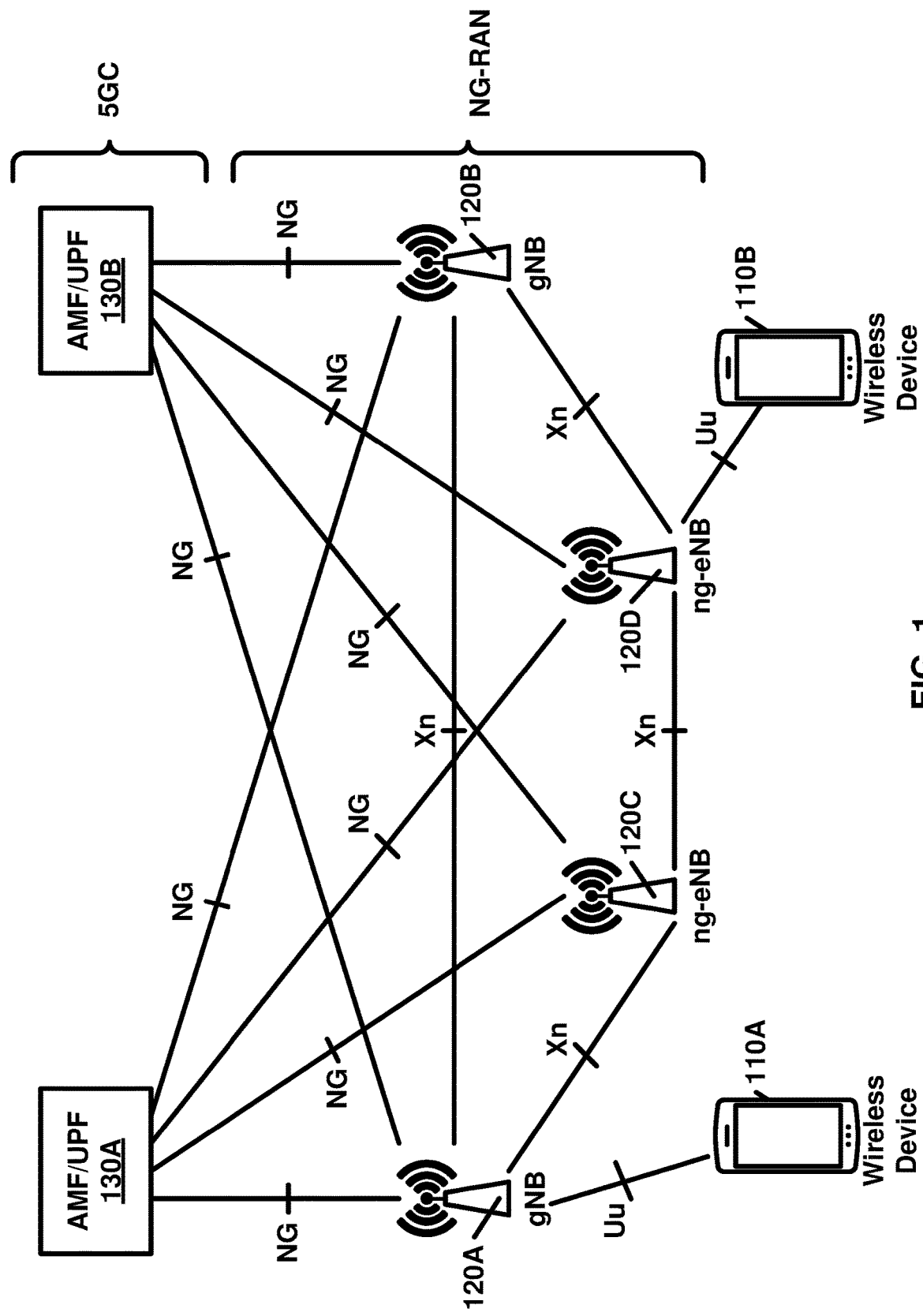
FIG. 1 is a diagram of an example RAN architecture as per an aspect of an embodiment of the present disclosure.

Example embodiments of the present disclosure enable power saving operations of a wireless device and/or a base station. Embodiments of the technology disclosed herein may be employed in the technical field of multicarrier communication systems. More particularly, the embodiments of the technology disclosed herein may relate to a wireless device and/or a base station in a multicarrier communication system.

The following Acronyms are used throughout the present disclosure:

| Acronym | Definition |
|---|---|
| 3GPP | 3rd Generation Partnership Project |
| 5GC | 5G Core Network |
| ACK | Acknowledgement |
| AMF | Access and Mobility Management Function |
| ARQ | Automatic Repeat Request |
| AS | Access Stratum |
| ASIC | Application-Specific Integrated Circuit |
| BA | Bandwidth Adaptation |
| BCCH | Broadcast Control Channel |
| BCH | Broadcast Channel |
| BPSK | Binary Phase Shift Keying |
| BWP | Bandwidth Part |
| CA | Carrier Aggregation |
| CC | Component Carrier |
| CCCH | Common Control CHannel |
| CDMA | Code Division Multiple Access |
| CN | Core Network |
| CP | Cyclic Prefix |
| CP-OFDM | Cyclic Prefix- Orthogonal Frequency Division Multiplex |
| C-RNTI | Cell-Radio Network Temporary Identifier |
| CS | Configured Scheduling |
| CSI | Channel State Information |
| CSI-RS | Channel State Information-Reference Signal |
| CQI | Channel Quality Indicator |
| CSS | Common Search Space |
| CU | Central Unit |
| DAI | Downlink Assignment Index |
| DC | Dual Connectivity |
| DCCH | Dedicated Control Channel |
| DCI | Downlink Control Information |
| DL | Downlink |
| DL-SCH | Downlink Shared CHannel |
| DM-RS | DeModulation Reference Signal |
| DRB | Data Radio Bearer |
| DRX | Discontinuous Reception |
| DTCH | Dedicated Traffic Channel |
| DU | Distributed Unit |
| EPC | Evolved Packet Core |
| E-UTRA | Evolved UMTS Terrestrial Radio Access |
| E-UTRAN | Evolved-Universal Terrestrial Radio Access Network |
| FDD | Frequency Division Duplex |
| FPGA | Field Programmable Gate Arrays |
| F1-C | F1-Control plane |
| F1-U | F1-User plane |
| gNB | next generation Node B |
| HARQ | Hybrid Automatic Repeat reQuest |
| HDL | Hardware Description Languages |
| IE | Information Element |
| IP | Internet Protocol |
| LCID | Logical Channel Identifier |
| LTE | Long Term Evolution |
| MAC | Media Access Control |
| MCG | Master Cell Group |
| MCS | Modulation and Coding Scheme |
| MeNB | Master evolved Node B |
| MIB | Master Information Block |
| MME | Mobility Management Entity |
| MN | Master Node |
| NACK | Negative Acknowledgement |
| NAS | Non-Access Stratum |
| NG CP | Next Generation Control Plane |
| NGC | Next Generation Core |
| NG-C | NG-Control plane |
| ng-eNB | next generation evolved Node B |
| NG-U | NG-User plane |
| NR | New Radio |
| NR MAC | New Radio MAC |
| NR PDCP | New Radio PDCP |
| NR PHY | New Radio PHYsical |
| NR RLC | New Radio RLC |
| NR RRC | New Radio RRC |
| NSSAI | Network Slice Selection Assistance Information |
| O&M | Operation and Maintenance |
| OFDM | orthogonal Frequency Division Multiplexing |
| PBCH | Physical Broadcast CHannel |
| PCC | Primary Component Carrier |
| PCCH | Paging Control CHannel |
| PCell | Primary Cell |
| PCH | Paging CHannel |
| PDCCH | Physical Downlink Control CHannel |
| PDCP | Packet Data Convergence Protocol |

| | -continued |
|---|---|
| PDSCH | Physical Downlink Shared CHannel |
| PDU | Protocol Data Unit |
| PHICH | Physical HARQ Indicator CHannel |
| PHY | PHYsical |
| PLMN | Public Land Mobile Network |
| PMI | Precoding Matrix Indicator |
| PRACH | Physical Random Access CHannel |
| PRB | Physical Resource Block |
| PSCell | Primary Secondary Cell |
| PSS | Primary Synchronization Signal |
| pTAG | primary Timing Advance Group |
| PT-RS | Phase Tracking Reference Signal |
| PUCCH | Physical Uplink Control CHannel |
| PUSCH | Physical Uplink Shared CHannel |
| QAM | Quadrature Amplitude Modulation |
| QFI | Quality of Service Indicator |
| QoS | Quality of Service |
| QPSK | Quadrature Phase Shift Keying |
| RA | Random Access |
| RACH | Random Access CHannel |
| RAN | Radio Access Network |
| RAT | Radio Access Technology |
| RA-RNTI | Random Access-Radio Network Temporary Identifier |
| RB | Resource Blocks |
| RBG | Resource Block Groups |
| RI | Rank indicator |
| RLC | Radio Link Control |
| RLM | Radio Link Monitoring |
| RNTI | Radio Network Temporary Identifier |
| RRC | Radio Resource Control |
| RRM | Radio Resource Management |
| RS | Reference Signal |
| RSRP | Reference Signal Received Power |
| SCC | Secondary Component Carrier |
| SCell | Secondary Cell |
| SCG | Secondary Cell Group |
| SC-FDMA | Single Carrier-Frequency Division Multiple Access |
| SDAP | Service Data Adaptation Protocol |
| SDU | Service Data Unit |
| SeNB | Secondary evolved Node B |
| SFN | System Frame Number |
| S-GW | Serving GateWay |
| SI | System Information |
| SIB | System Information Block |
| SMF | Session Management Function |
| SN | Secondary Node |
| SpCell | Special Cell |
| SRB | Signaling Radio Bearer |
| SRS | Sounding Reference Signal |
| SS | Synchronization Signal |
| SSS | Secondary Synchronization Signal |
| sTAG | secondary Timing Advance Group |
| TA | Timing Advance |
| TAG | Timing Advance Group |
| TAI | Tracking Area Identifier |
| TAT | Time Alignment Timer |
| TB | Transport Block |
| TCI | Transmission Configuration Indication |
| TC-RNTI | Temporary Cell-Radio Network Temporary Identifier |
| TDD | Time Division Duplex |
| TDMA | Time Division Multiple Access |
| TRP | Transmission Reception Point |
| TTI | Transmission Time Interval |
| UCI | Uplink Control Information |
| UE | User Equipment |
| UL | Uplink |
| UL-SCH | Uplink Shared CHannel |
| UPF | User Plane Function |
| UPGW | User Plane Gateway |
| VHDL | VHSIC Hardware Description Language |
| Xn-C | Xn-Control plane |
| Xn-U | Xn-User plane |

Example embodiments of the disclosure may be implemented using various physical layer modulation and transmission mechanisms. Example transmission mechanisms may include, but not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight inter-working between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
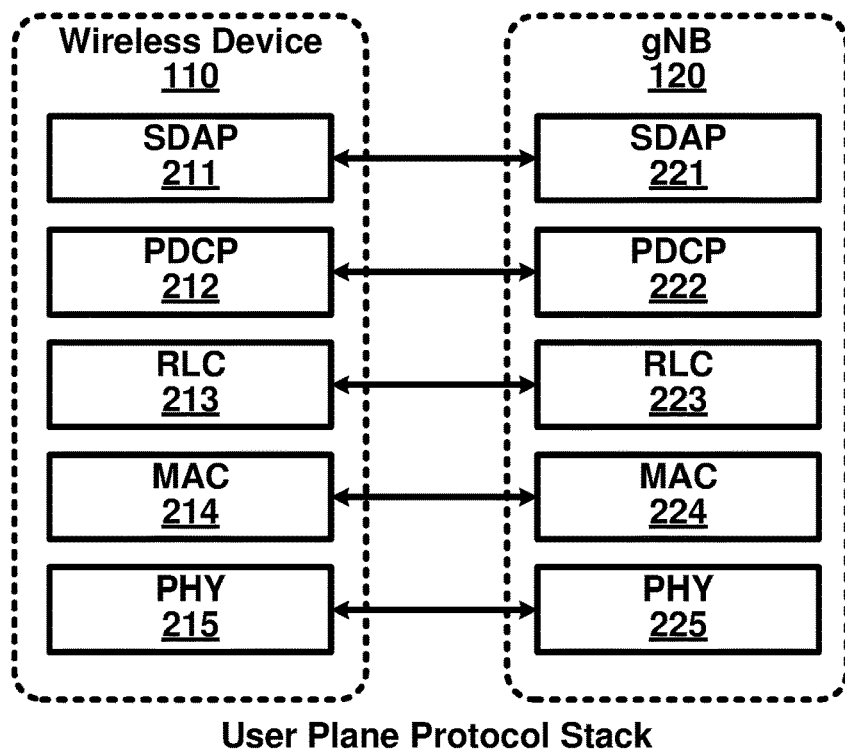
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
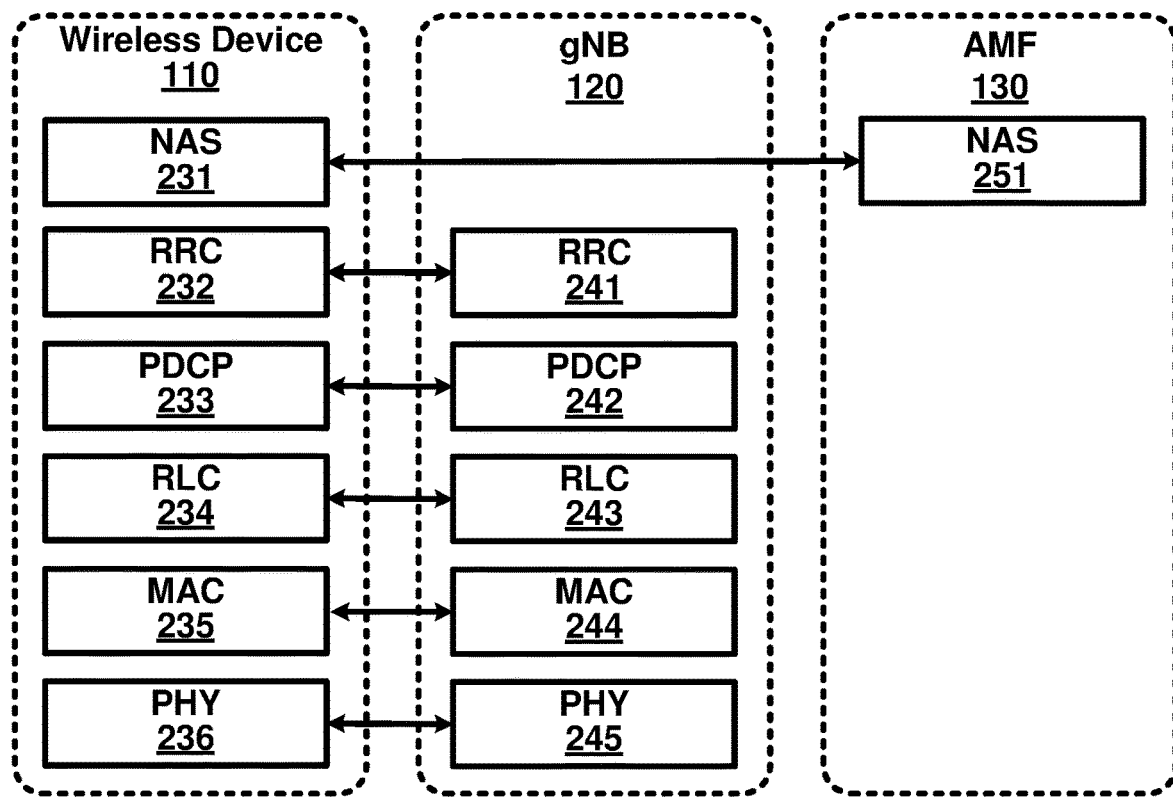
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
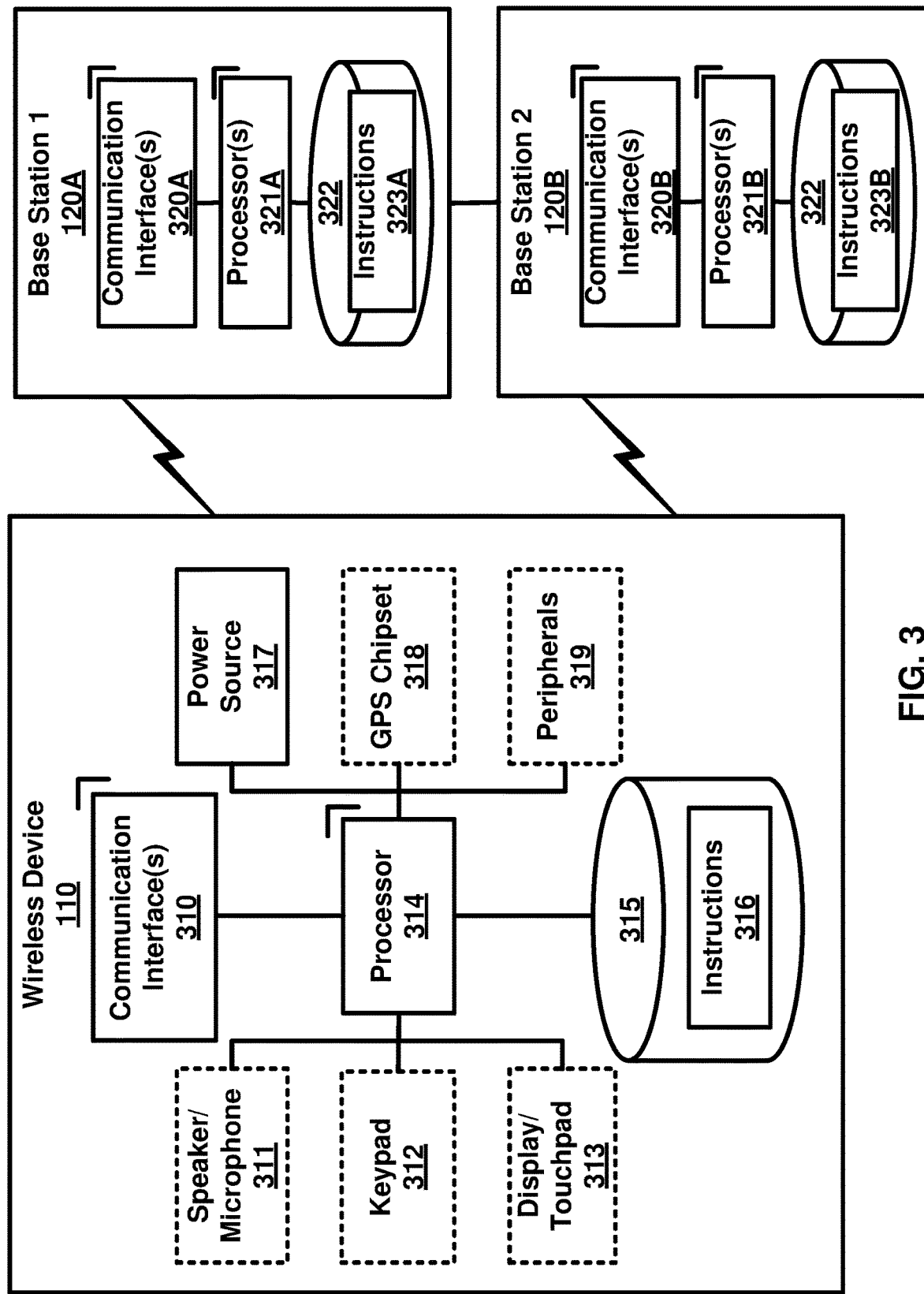
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
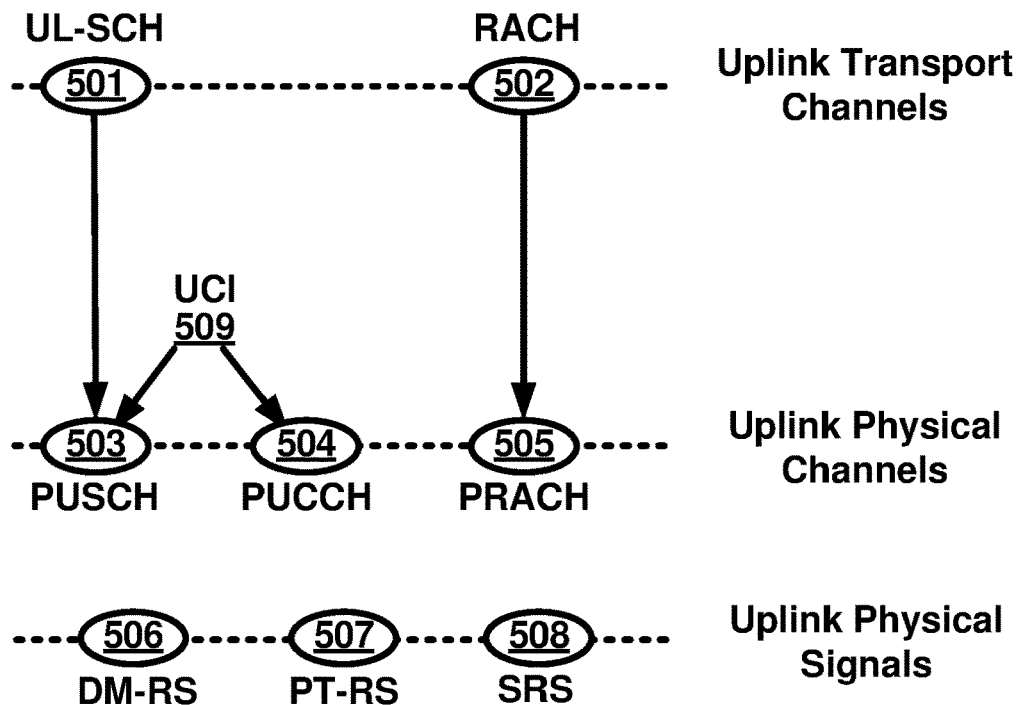
FIG. 5A is a diagram of an example uplink channel mapping and example uplink physical signals as per an aspect of an embodiment of the present disclosure.
Figure 5B:
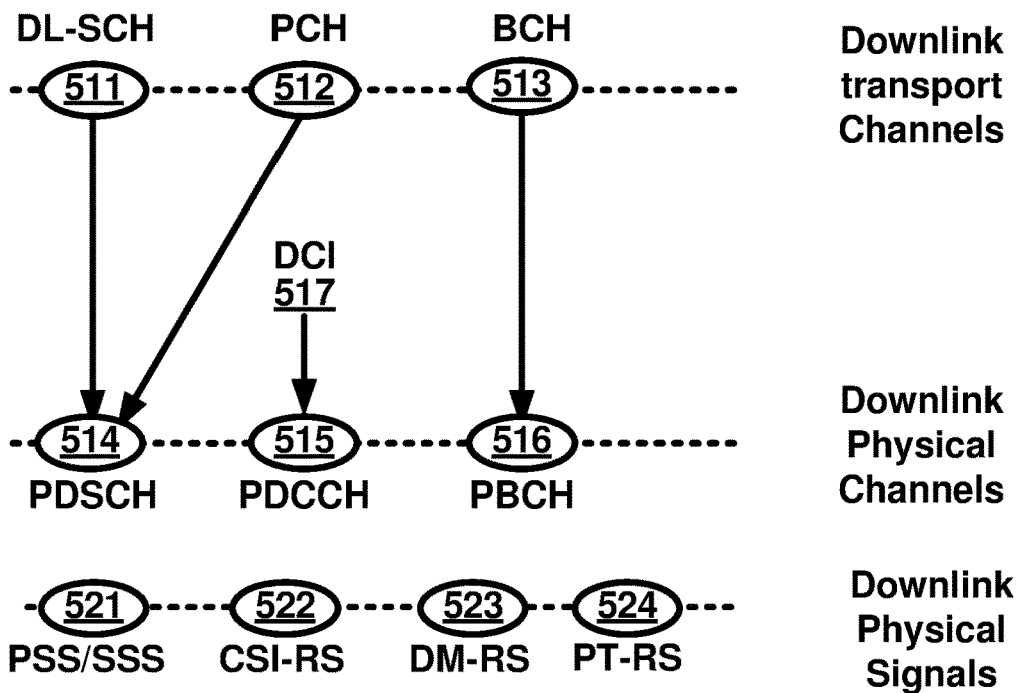
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (minislot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
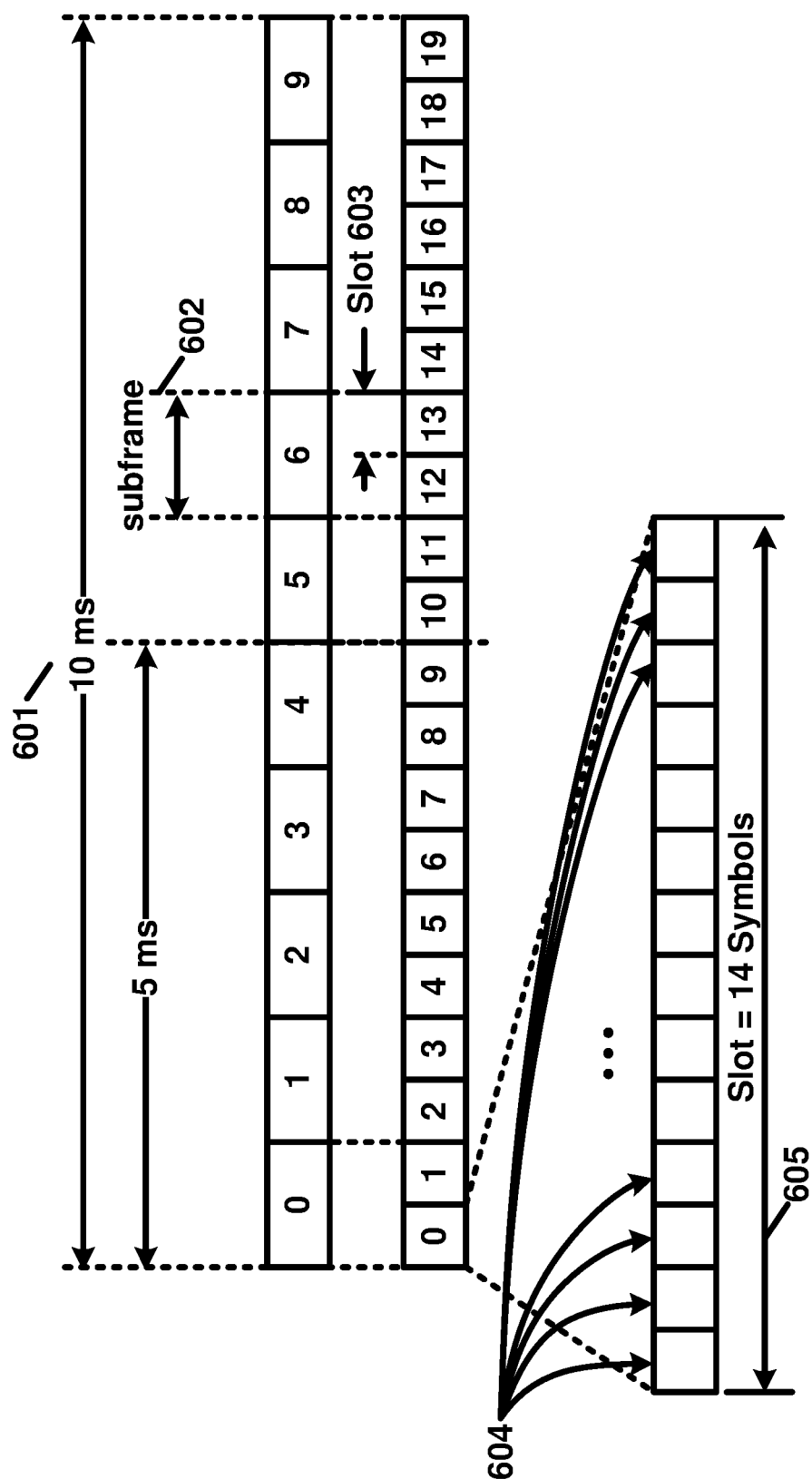
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
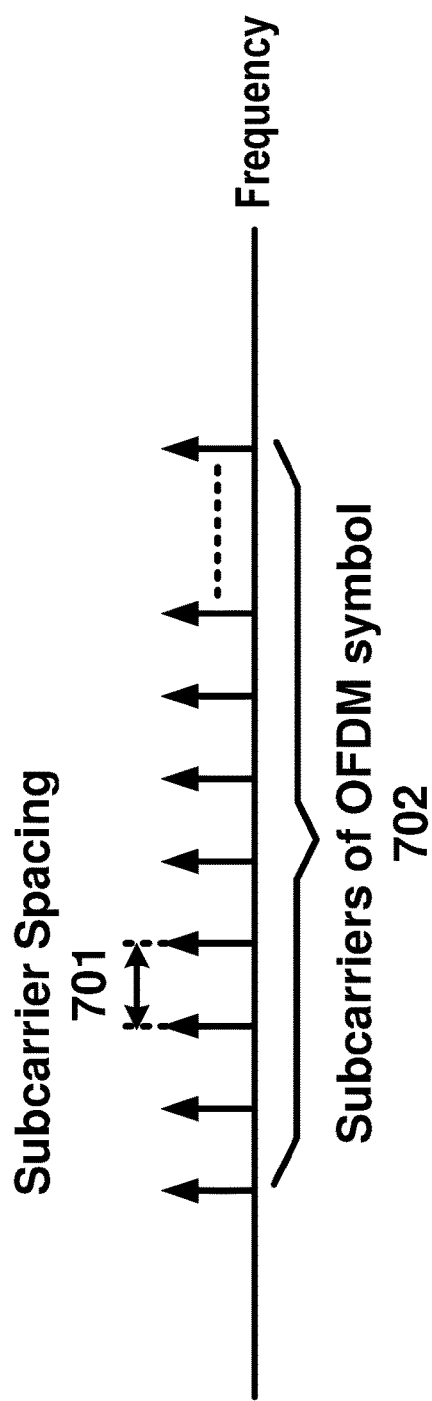
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
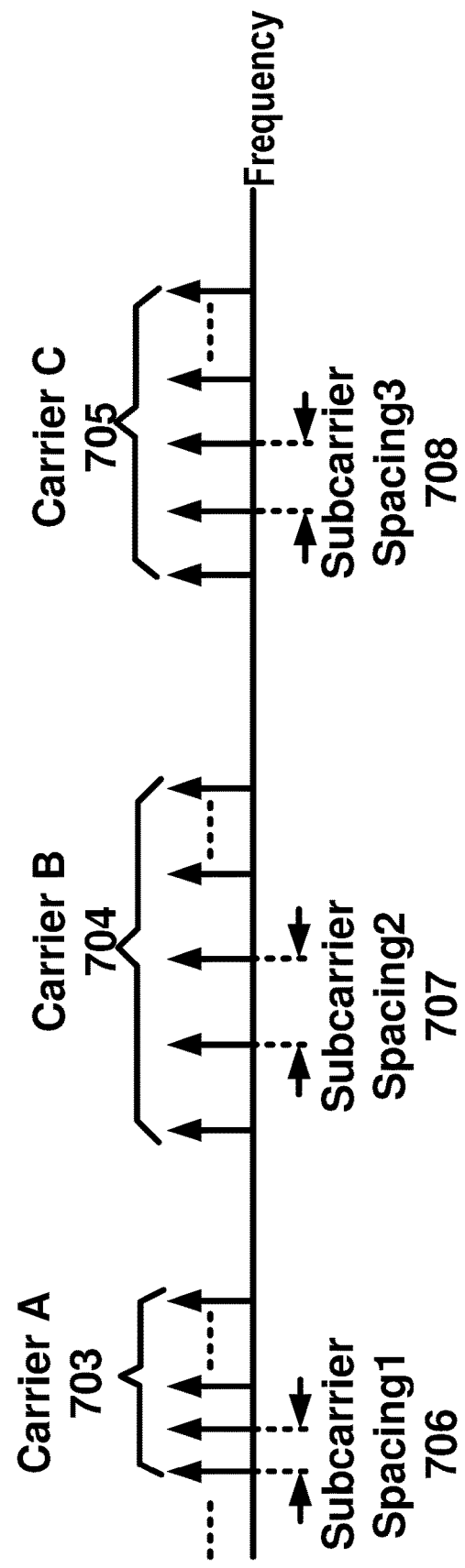

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
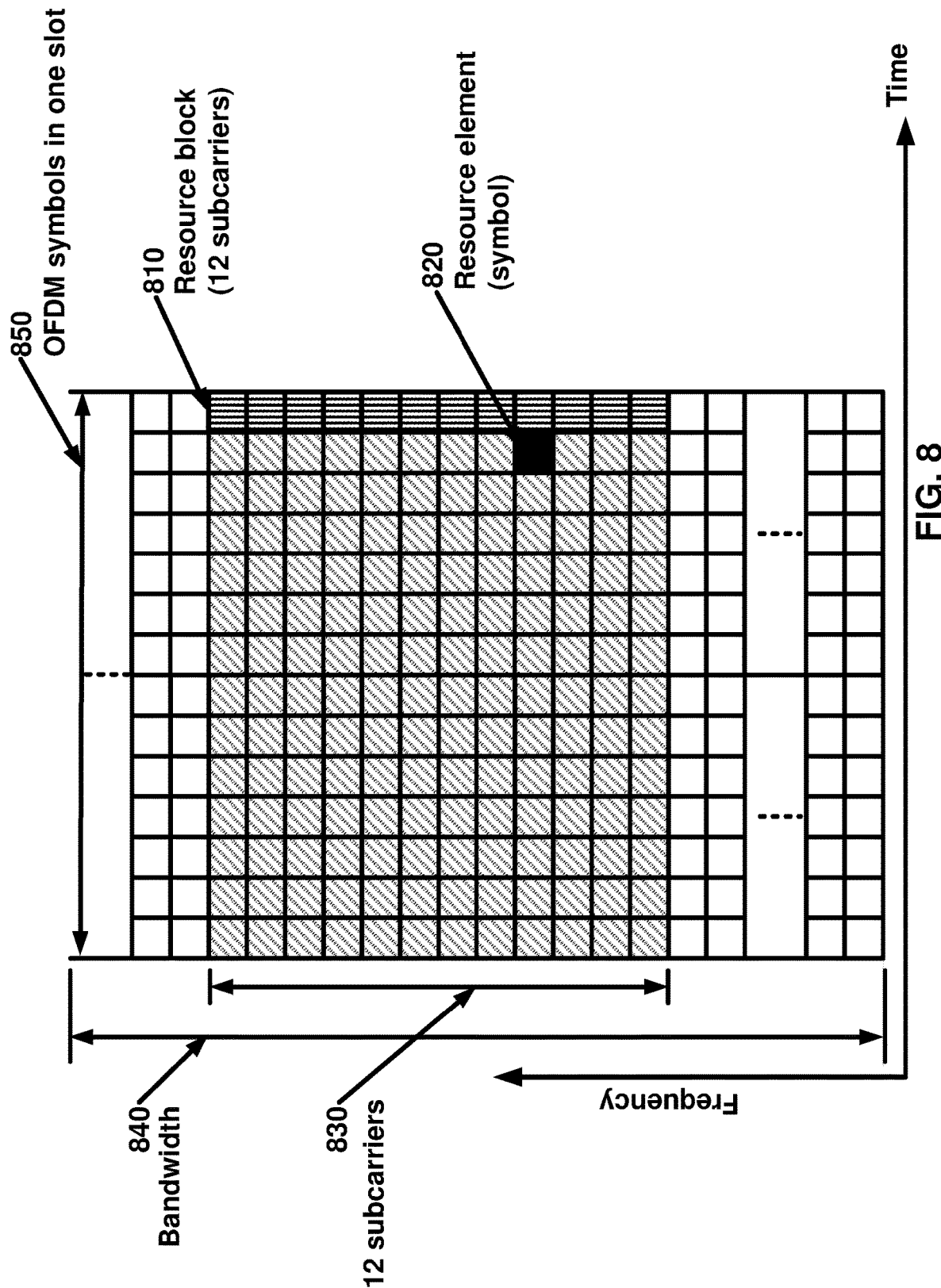
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
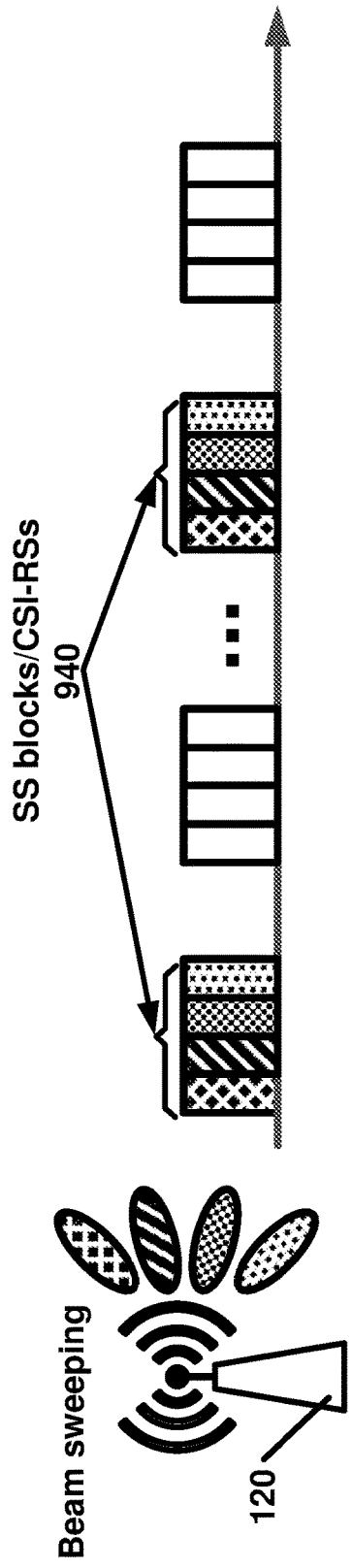
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
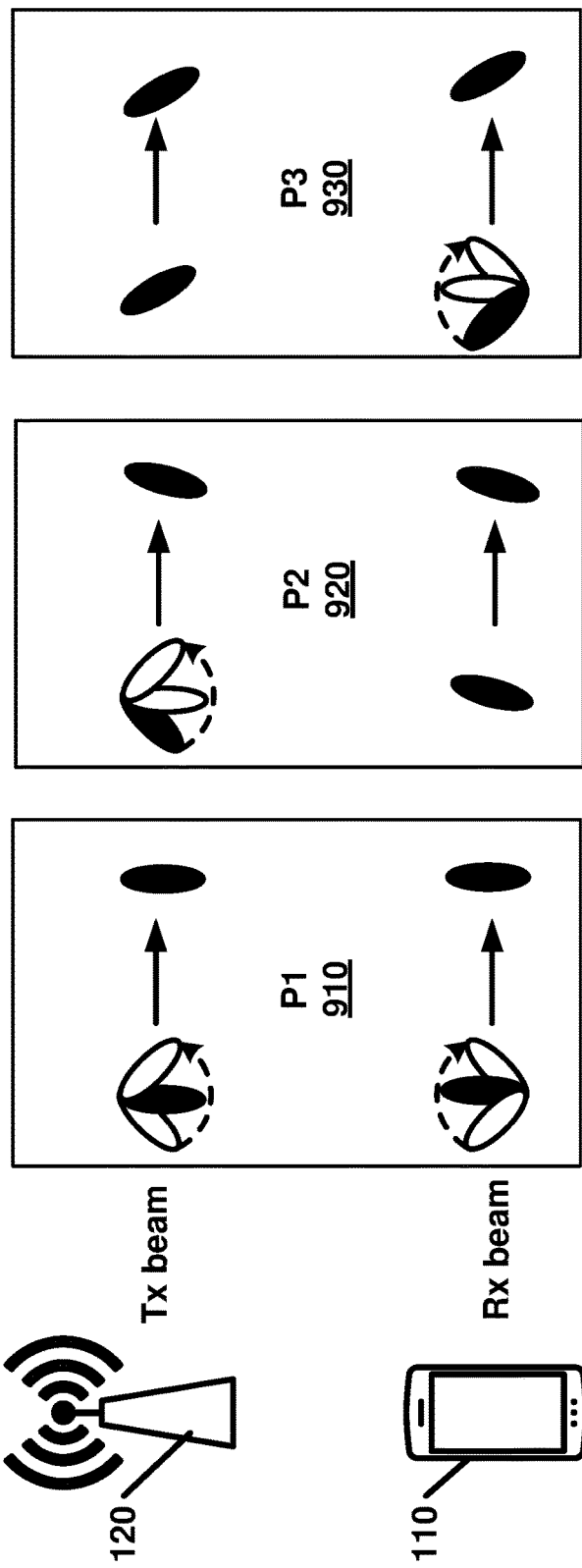
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
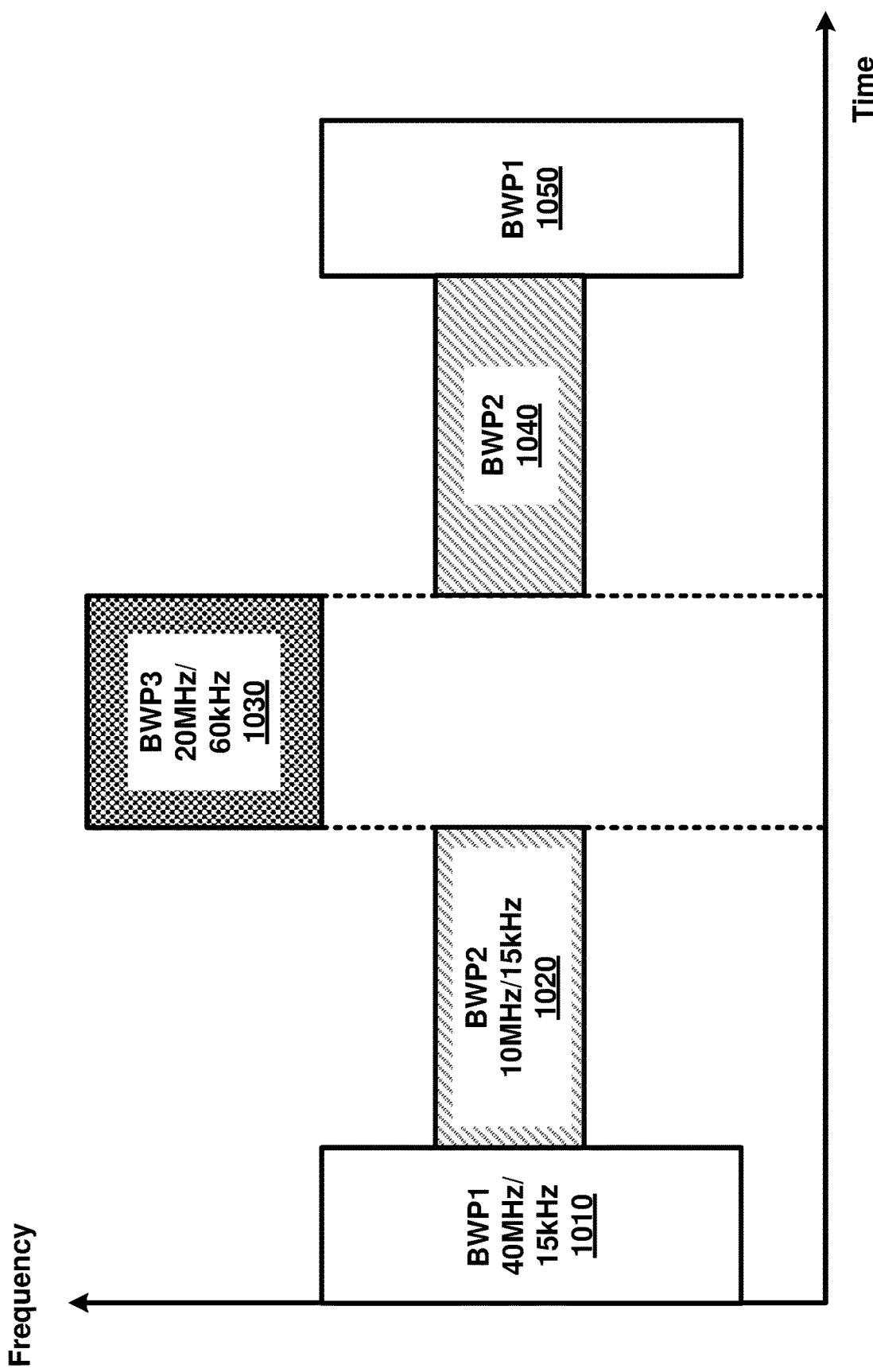
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
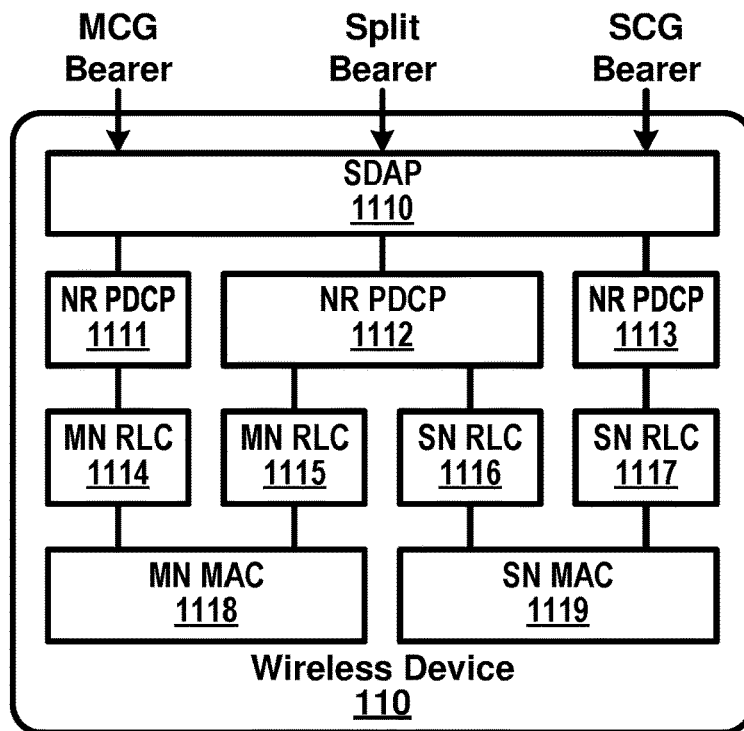
FIG. 11A, and FIG. 11B are diagrams of an example multi connectivity as per an aspect of an embodiment of the present disclosure.
Figure 11B:
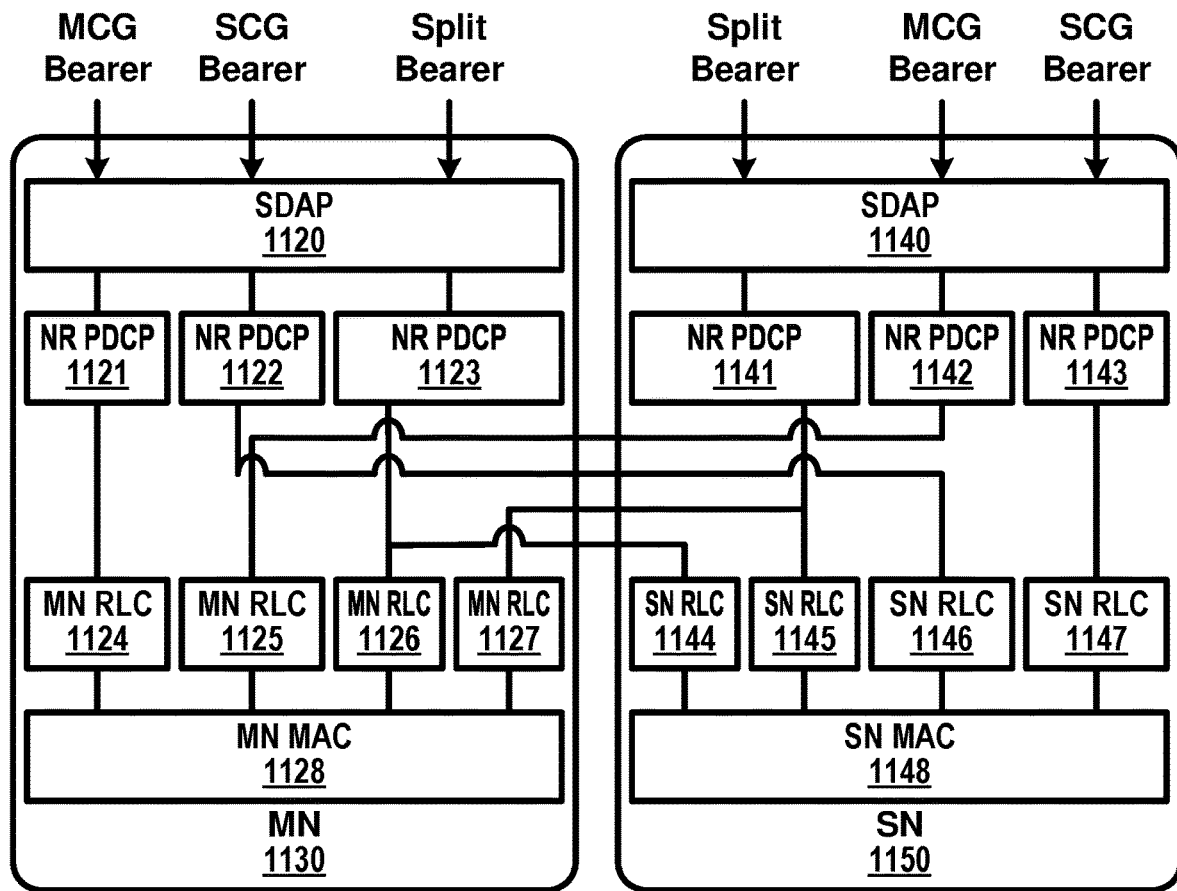

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain Radio Resource Management (RRM) measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
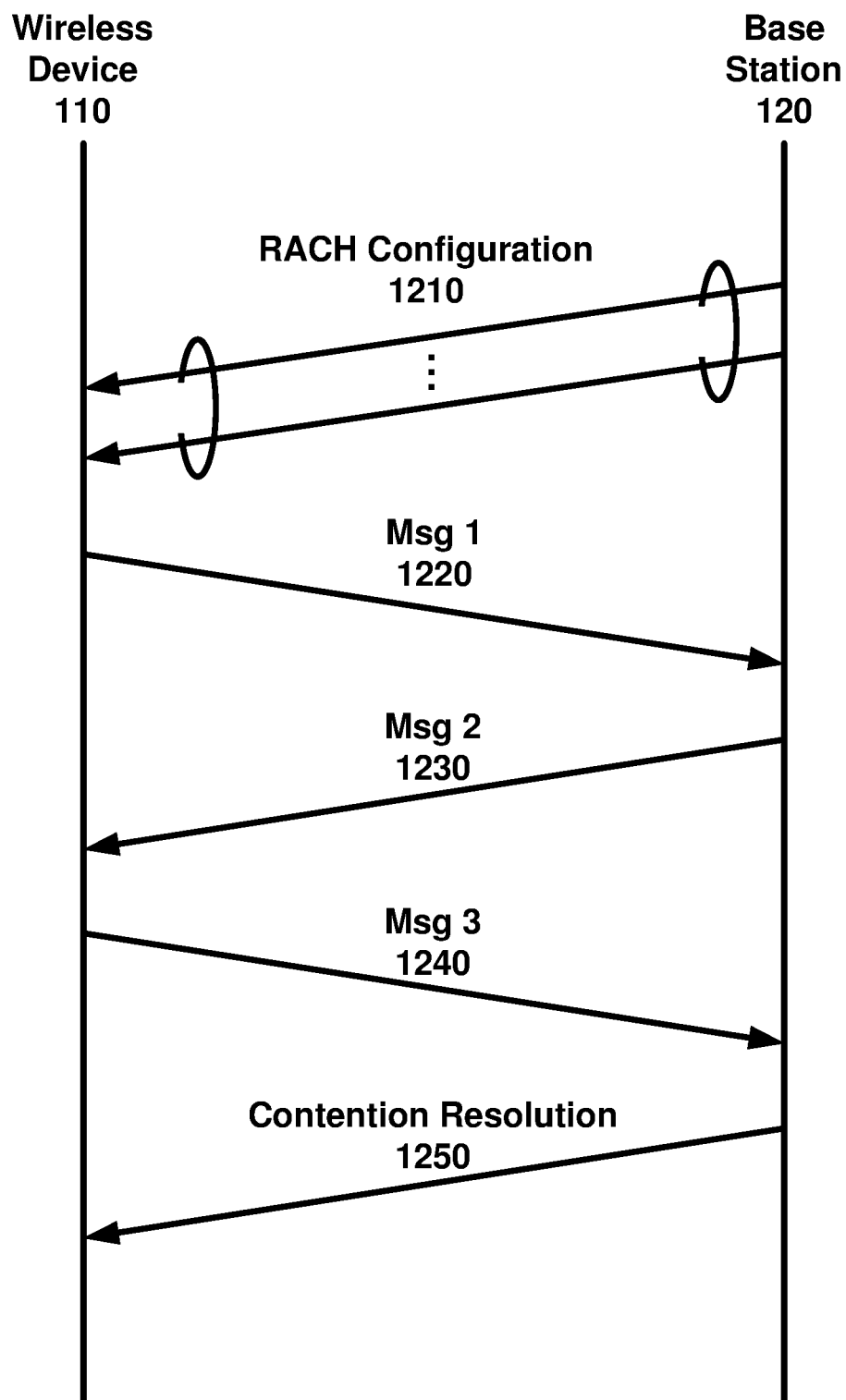
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
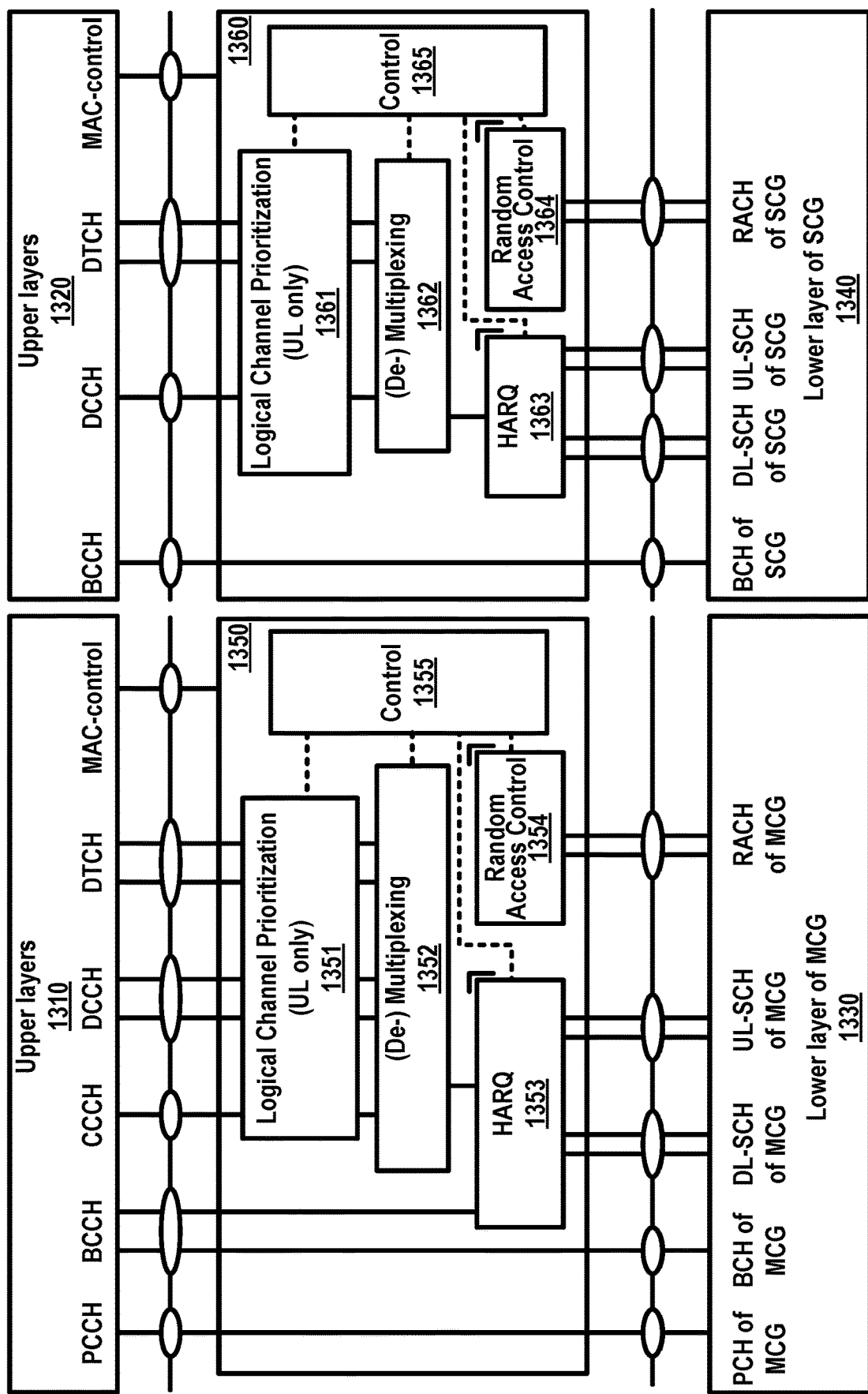
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
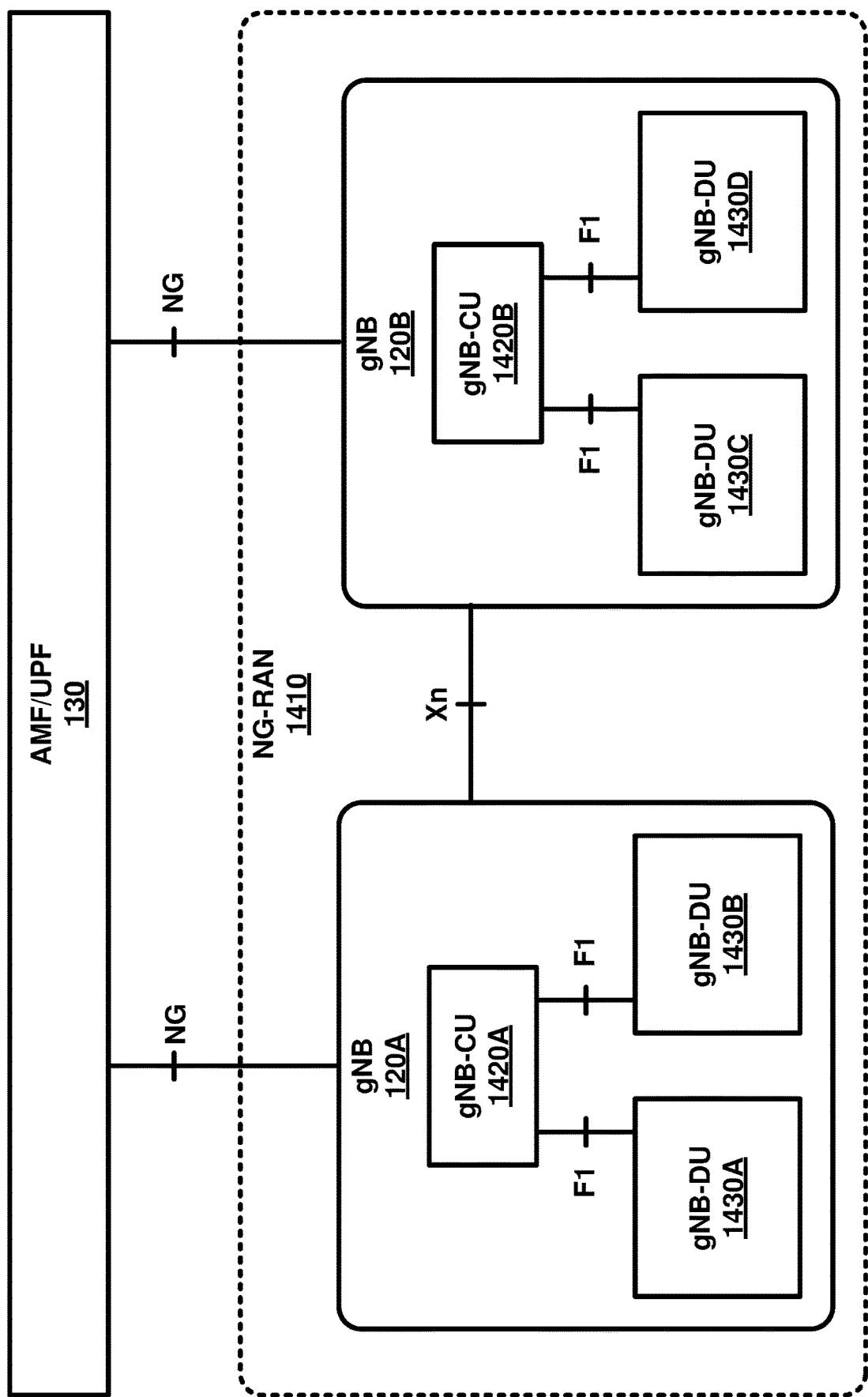
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
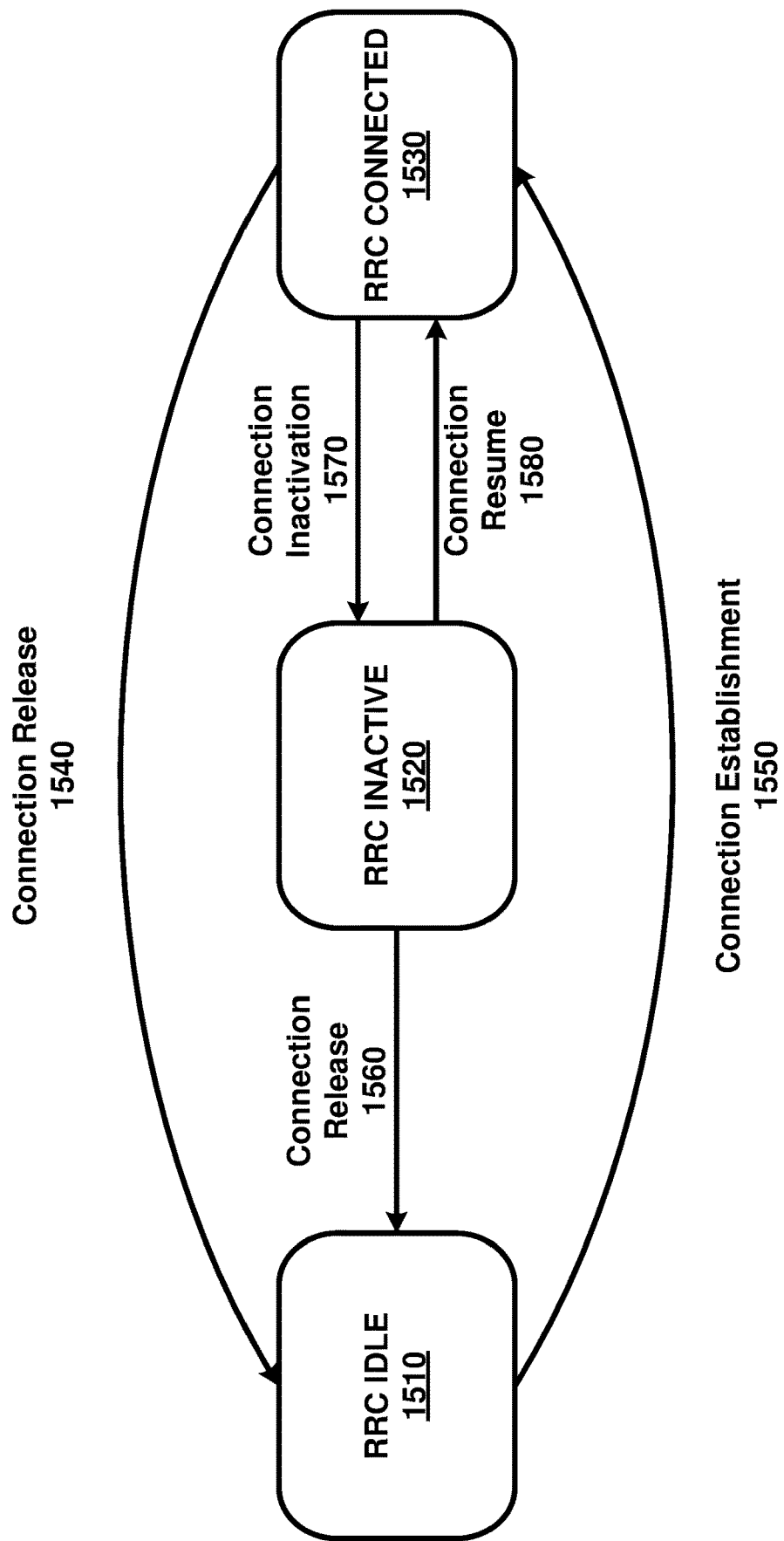
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example, a gNB may transmit a DCI via a PDCCH for at least one of: a scheduling assignment/grant; a slot format notification; a pre-emption indication; and/or a power-control command(s). More specifically, the DCI may comprise at least one of: an identifier of a DCI format; a downlink scheduling assignment(s); an uplink scheduling grant(s); a slot format indicator; a pre-emption indication; a power-control for PUCCH/PUSCH; and/or a power-control for SRS.

In an example, a downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH.

In an example, an uplink scheduling grant DCI may comprise parameters indicating at least one of: an identifier of a DCI format; a PUSCH resource indication; a transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message in comparison with an uplink grant allowing for frequency-contiguous allocation. DCI may be categorized into different DCI formats, where a format corresponds to a certain message size and/or usage.

In an example, a wireless device may monitor one or more PDCCHs for detecting one or more DCI with one or more DCI formats in a common search space or a wireless device-specific search space. In an example, a wireless device may monitor a PDCCH with a limited set of DCI formats to save power consumption. In general, the wireless device consumes more power for each additional DCI format the wireless device is to detect.

In an example, the information in a DCI with a DCI format used for downlink scheduling may comprise at least one of: an identifier of a DCI format; a carrier indicator; frequency domain resource assignment; time domain resource assignment; a bandwidth part indicator; a HARQ process number; one or more MCSs; one or more NDIs; one or more RVs; MIMO related information; a Downlink Assignment Index (DAI); a PUCCH resource indicator; a PDSCH-to-HARQ_feedback timing indicator; a TPC for PUCCH; an SRS request; and padding if necessary. In an example, the MIMO related information may comprise at least one of: a PMI; precoding information; a transport block swap flag; a power offset between PDSCH and a reference signal; a reference-signal scrambling sequence; a number of layers; and/or antenna ports for downlink transmissions; and/or a Transmission Configuration Indication (TCI).

In an example, the information in a DCI with a DCI format used for uplink scheduling may comprise at least one of: an identifier of a DCI format; a carrier indicator; a bandwidth part indication; a resource allocation type; a frequency domain resource assignment; a time domain resource assignment; an MCS; an NDI; a phase rotation of the uplink DMRS; precoding information; a CSI request; an SRS request; an uplink index/DAI; a TPC for PUSCH; and/or padding if necessary.

In an example, a gNB may perform CRC scrambling for a DCI before transmitting the DCI via a PDCCH. The gNB may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) and the CRC bits of the DCI. The wireless device may check the CRC bits of the DCI when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCHs in different control resource sets ("coresets"). In an example, a gNB may transmit one or more RRC messages comprising configuration parameters of one or more coresets. A coreset of the one or more coresets may comprise at least one of: a first OFDM symbol; a number of consecutive OFDM symbols; a set of resource blocks; and/or a CCE-to-REG mapping. In an example, a gNB may transmit a PDCCH in a dedicated coreset for a particular purpose, including, for example, beam failure recovery confirmation.

In an example, a wireless device may monitor PDCCH for detecting DCI in one or more configured coresets, to reduce the power consumption.

A gNB may transmit one or more MAC PDUs to a wireless device. In an example, a MAC PDU may be a bit string that is byte aligned (e.g., a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., a multiple of eight bits) in length. In an example, a MAC SDU may be included in a MAC PDU from the first bit onward.

In an example, a MAC CE may be a bit string that is byte aligned (e.g., a multiple of eight bits) in length.

In an example, a MAC subheader may be a bit string that is byte aligned (e.g., a multiple of eight bits) in length. In an example, a MAC subheader may be placed immediately in front of a corresponding MAC SDU, MAC CE, or padding.

In an example, a MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; and/or a MAC subheader and padding. In an example, the MAC SDU may be of variable size. In an example, a MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one bit length; an LCID field with a multi-bit length; and/or an L field with a multi-bit length.

Figure 16A:
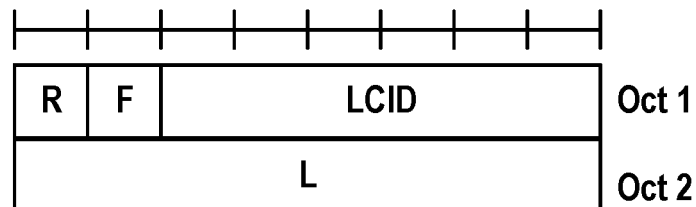
FIG. 16A, FIG. 16B and FIG. 16C are examples of MAC subheaders as per an aspect of an embodiment of the present disclosure.
Figure 16B:
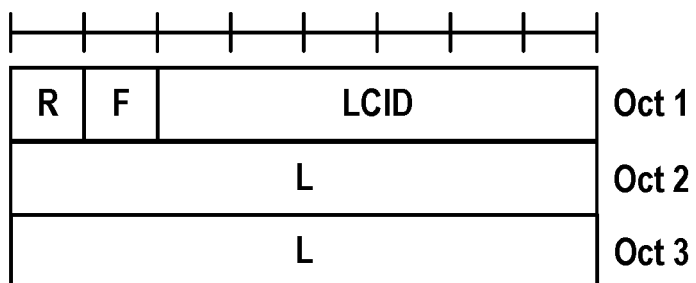

FIG. 16A shows an example of a MAC subheader with an R field, an F field, an LCID field, and an L field. In the example MAC subheader of FIG. 16A, the LCID field may be six bits in length, and the L field may be eight bits in length. FIG. 16B shows example of a MAC subheader with an R field, a F field, an LCID field, and an L field. In the example MAC subheader of FIG. 16B, the LCID field may be six bits in length, and the L field may be sixteen bits in length.

Figure 16C:
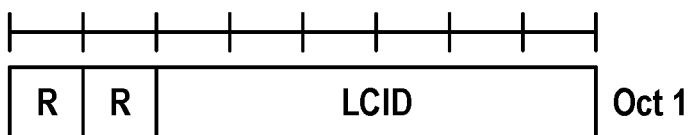

In an example, when a MAC subheader corresponds to a fixed sized MAC CE or padding, the MAC subheader may comprise: an R field with a two bit length and an LCID field with a multi-bit length. FIG. 16C shows an example of a MAC subheader with an R field and an LCID field. In the example MAC subheader of FIG. 16C, the LCID field may be six bits in length, and the R field may be two bits in length.

Figure 17A:
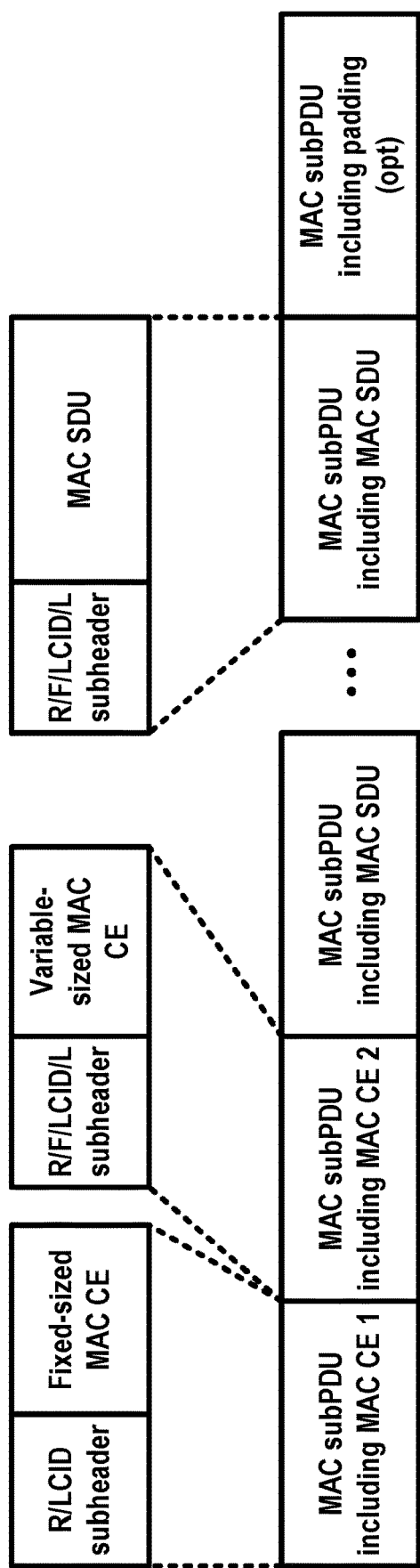
FIG. 17A and FIG. 17B are examples of MAC PDUs as per an aspect of an embodiment of the present disclosure.

FIG. 17A shows an example of a DL MAC PDU. In the example of FIG. 17A, multiple MAC CEs, such as MAC CE 1 and 2, may be placed together. A MAC subPDU comprising a MAC CE may be placed before any MAC subPDU comprising a MAC SDU or a MAC subPDU comprising padding.

Figure 17B:
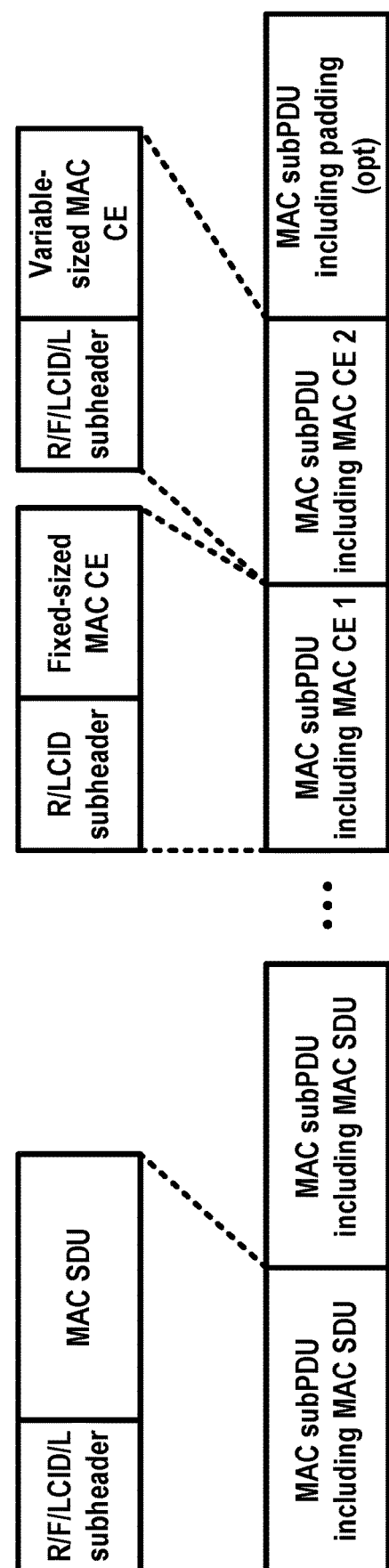

FIG. 17B shows an example of a UL MAC PDU. In the example of FIG. 17B, multiple MAC CEs, such as MAC CE 1 and 2, may be placed together. A MAC subPDU comprising a MAC CE may be placed after all MAC subPDUs comprising a MAC SDU. In addition, the MAC subPDU may be placed before a MAC subPDU comprising padding.

In an example, a MAC entity of a gNB may transmit one or more MAC CEs to a MAC entity of a wireless device. FIG. 18 shows an example of multiple LCIDs that may be associated with the one or more MAC CEs. In the example of FIG. 18, the one or more MAC CEs comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; an SCell activation/deactivation MAC CE (1 Octet); an SCell activation/deactivation MAC CE (4 Octet); and/or a duplication activation/deactivation MAC CE. In an example, a MAC CE, such as a MAC CE transmitted by a MAC entity of a gNB to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the gNB one or more MAC CEs. FIG. 19 shows an example of the one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

Figure 20A:
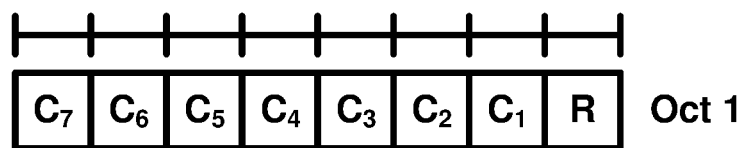
FIG. 20A is an example of an SCell Activation/Deactivation MAC CE of one octet as per an aspect of an embodiment of the present disclosure.

FIG. 20A shows an example of an SCell Activation/Deactivation MAC CE of one octet. A first MAC PDU subheader with a first LCID (e.g., '111010' as shown in FIG. 18) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

Figure 20B:
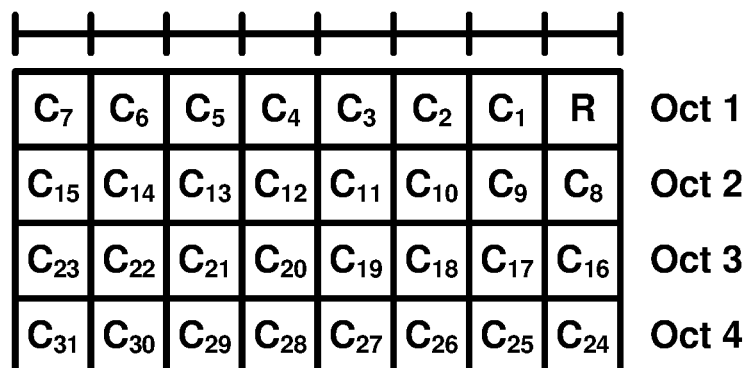
FIG. 20B is an example of an SCell Activation/Deactivation MAC CE of four octets as per an aspect of an embodiment of the present disclosure.

FIG. 20B shows an example of an SCell Activation/Deactivation MAC CE of four octets. A second MAC PDU subheader with a second LCID (e.g., '111001' as shown in FIG. 18) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 20A and/or FIG. 20B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 20A and FIG. 20B, an R field may indicate a reserved bit. The R field may be set to zero.

When configured with CA, a base station and/or a wireless device may employ a hibernation mechanism for an SCell to improve battery or power consumption of the wireless device and/or to improve latency of SCell activation/addition. When the wireless device hibernates the SCell, the SCell may be transitioned into a dormant state. In response to the SCell being transitioned into a dormant state, the wireless device may: stop transmitting SRS on the SCell; report CQI/PMI/RI/PTI/CRI for the SCell according to a periodicity configured for the SCell in a dormant state; not transmit on UL-SCH on the SCell; not transmit on RACH on the SCell; not monitor the PDCCH on the SCell; not monitor the PDCCH for the SCell; and/or not transmit PUCCH on the SCell. In an example, reporting CSI for an SCell and not monitoring the PDCCH on/for the SCell, when the SCell is in a dormant state, may provide the base station an always-updated CSI for the SCell. With the always-updated CSI, the base station may employ a quick and/or accurate channel adaptive scheduling on the SCell once the SCell is transitioned back into active state, thereby speeding up the activation procedure of the SCell. In an example, reporting CSI for the SCell and not monitoring the PDCCH on/for the SCell, when the SCell is in dormant state, may improve battery or power consumption of the wireless device, while still providing the base station timely and/or accurate channel information feedback. In an example, a PCell/PSCell and/or a PUCCH secondary cell may not be configured or transitioned into dormant state.

When configured with one or more SCells, a gNB may activate, hibernate, or deactivate at least one of the one or more SCells. In an example, a gNB may transmit one or more RRC messages comprising parameters indicating at least one SCell being set to an active state, a dormant state, or an inactive state, to a wireless device.

In an example, when an SCell is in an active state, the wireless device may perform: SRS transmissions on the SCell; CQI/PMI/RI/CRI reporting for the SCell; PDCCH monitoring on the SCell; PDCCH monitoring for the SCell; and/or PUCCH/SPUCCH transmissions on the SCell.

In an example, when an SCell is in an inactive state, the wireless device may: not transmit SRS on the SCell; not report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell.

In an example, when an SCell is in a dormant state, the wireless device may: not transmit SRS on the SCell; report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell.

When configured with one or more SCells, a gNB may activate, hibernate, or deactivate at least one of the one or more SCells. In an example, a gNB may transmit one or more MAC control elements comprising parameters indicating activation, deactivation, or hibernation of at least one SCell to a wireless device.

In an example, a gNB may transmit a first MAC CE (e.g., activation/deactivation MAC CE, as shown in FIG. 20A or FIG. 20B) indicating activation or deactivation of at least one SCell to a wireless device. In FIG. 20A and/or FIG. 20B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 20A and FIG. 20B, an R field may indicate a reserved bit. In an example, the R field may be set to zero.

In an example, a gNB may transmit a second MAC CE (e.g., hibernation MAC CE) indicating activation or hibernation of at least one SCell to a wireless device. In an example, the second MAC CE may be associated with a second LCID different from a first LCID of the first MAC CE (e.g., activation/deactivation MAC CE). In an example, the second MAC CE may have a fixed size. In an example, the second MAC CE may consist of a single octet containing seven C-fields and one R-field. FIG. 21A shows an example of the second MAC CE with a single octet. In another example, the second MAC CE may consist of four octets containing 31 C-fields and one R-field. FIG. 21B shows an example of the second MAC CE with four octets. In an example, the second MAC CE with four octets may be associated with a third LCID different from the second LCID for the second MAC CE with a single octet, and/or the first LCID for activation/deactivation MAC CE. In an example, when there is no SCell with a serving cell index greater than 7, the second MAC CE of one octet may be applied, otherwise the second MAC CE of four octets may be applied.

In an example, when the second MAC CE is received, and the first MAC CE is not received, $C_i$ may indicate a dormant/activated status of an SCell with SCell index i if there is an SCell configured with SCell index i, otherwise the MAC entity may ignore the $C_i$ field. In an example, when $C_i$ is set to "1", the wireless device may transition an SCell associated with SCell index i into a dormant state. In an example, when $C_i$ is set to "0", the wireless device may activate an SCell associated with SCell index i. In an example, when $C_i$ is set to "0" and the SCell with SCell index i is in a dormant state, the wireless device may activate the SCell with SCell index i. In an example, when $C_i$ is set to "0" and the SCell with SCell index i is not in a dormant state, the wireless device may ignore the $C_i$ field.

Figure 22:
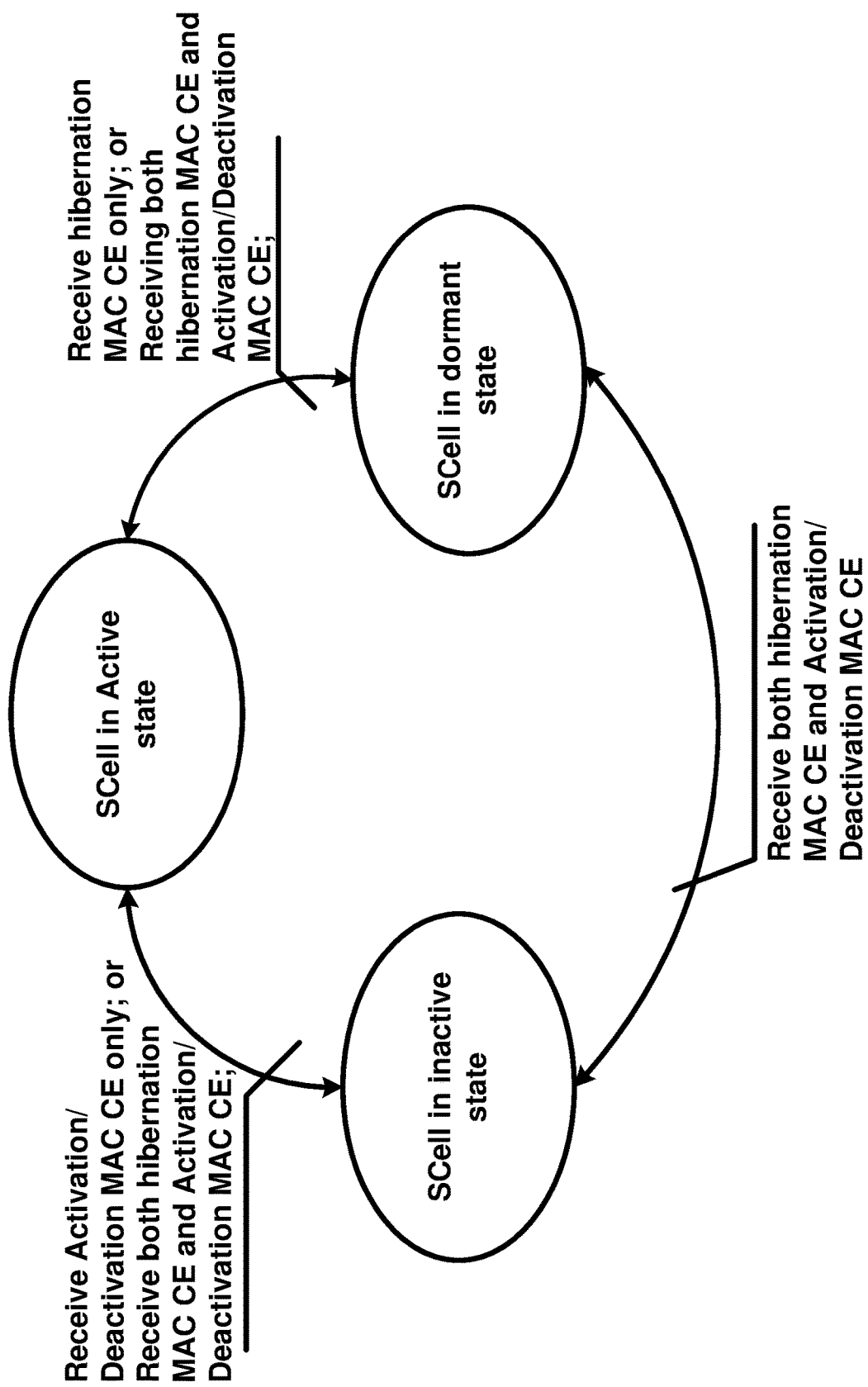
FIG. 22 is an example of a signaling-based SCell state transition as per an aspect of an embodiment of the present disclosure.

In an example, when both the first MAC CE (activation/deactivation MAC CE) and the second MAC CE (hibernation MAC CE) are received, two $C_i$ fields of the two MAC CEs may indicate possible state transitions of the SCell with SCell index i if there is an SCell configured with SCell index i, otherwise the MAC entity may ignore the $C_i$ fields. In an example, the $C_i$ fields of the two MAC CEs may be interpreted according to FIG. 21C. FIG. 22 shows an example of SCell state transitions based on activation/deactivation MAC CE and/or hibernation MAC CE.

When configured with one or more SCells, a gNB may activate, hibernate, or deactivate at least one of the one or more SCells. In an example, a MAC entity of a gNB and/or a wireless device may maintain an SCell deactivation timer (e.g., sCellDeactivationTimer) per configured SCell (except the SCell configured with PUCCH/SPUCCH, if any) and deactivate the associated SCell upon its expiry.

In an example, a MAC entity of a gNB and/or a wireless device may maintain an SCell hibernation timer (e.g., sCellHibernationTimer) per configured SCell (except the SCell configured with PUCCH/SPUCCH, if any) and hibernate the associated SCell upon the SCell hibernation timer expiry if the SCell is in active state. In an example, when both the SCell deactivation timer and the SCell hibernation timer are configured, the SCell hibernation timer may take priority over the SCell deactivation timer. In an example, when both the SCell deactivation timer and the SCell hibernation timer are configured, a gNB and/or a wireless device may ignore the SCell deactivation timer regardless of the SCell deactivation timer expiry.

In an example, a MAC entity of a gNB and/or a wireless device may maintain a dormant SCell deactivation timer (e.g., dormantSCellDeactivationTimer) per configured SCell (except the SCell configured with PUCCH/SPUCCH, if any), and deactivate the associated SCell upon the dormant SCell deactivation timer expiry if the SCell is in dormant state.

Figure 23:
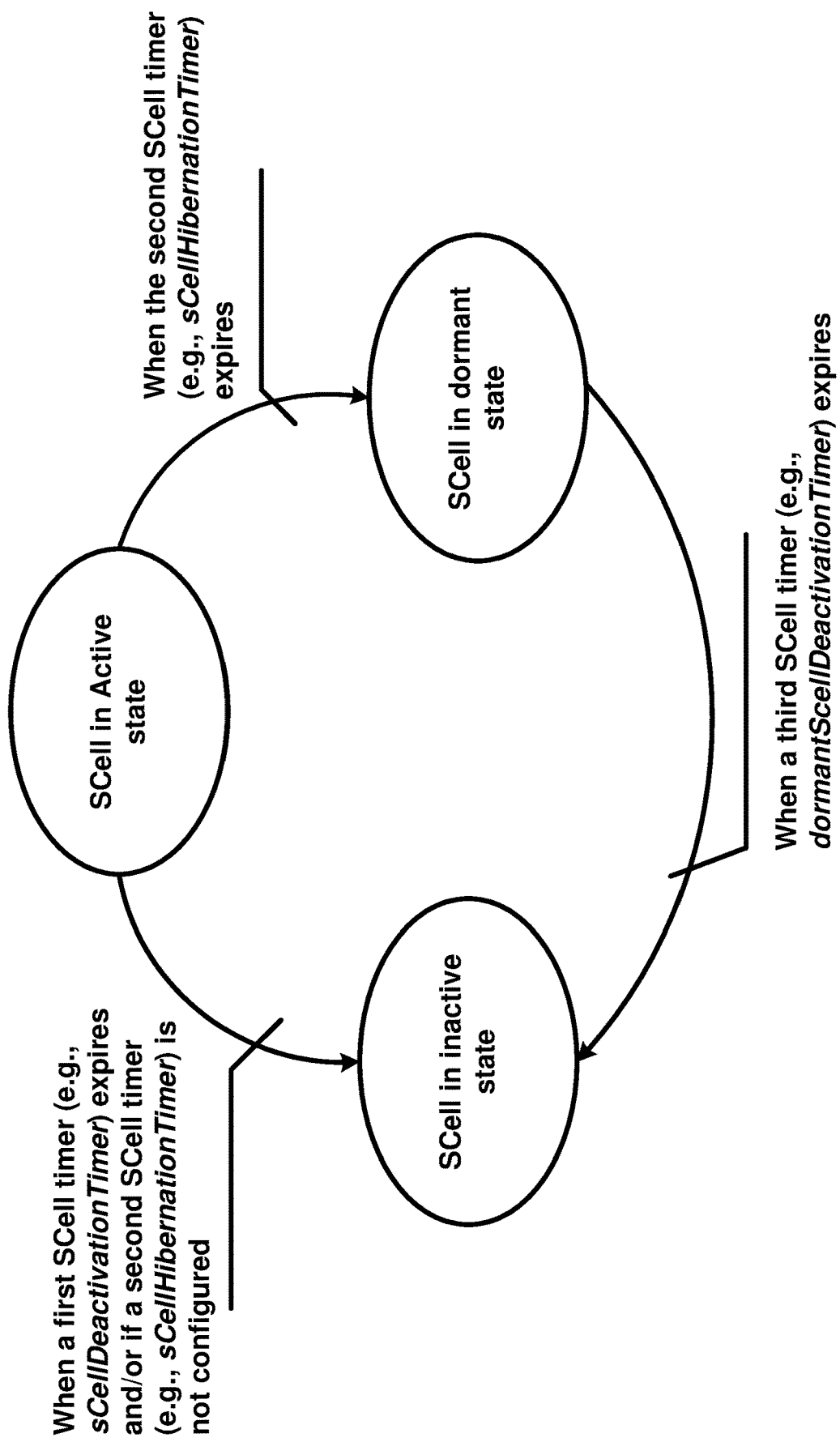
FIG. 23 is an example of a timer-based SCell state transition as per an aspect of an embodiment of the present disclosure.

FIG. 23 shows an example of SCell state transitions based on a first SCell timer (e.g., an SCell deactivation timer or sCellDeactivationTimer), a second SCell timer (e.g., an SCell hibernation timer or sCellHibernationTimer), and/or a third SCell timer (e.g., a dormant SCell deactivation timer or dormantSCellDeactivationTimer).

In an example, when a MAC entity of a wireless device is configured with an activated SCell upon SCell configuration, the MAC entity may activate the SCell. In an example, when a MAC entity of a wireless device receives a MAC CE(s) activating an SCell, the MAC entity may activate the SCell. In an example, the MAC entity may start or restart the SCell deactivation timer associated with the SCell in response to activating the SCell. In an example, the MAC entity may start or restart the SCell hibernation timer (if configured) associated with the SCell in response to activating the SCell. In an example, the MAC entity may trigger PHR procedure in response to activating the SCell.

In an example, when a MAC entity of a wireless device receives a MAC CE(s) indicating deactivating an SCell, the MAC entity may deactivate the SCell. In an example, in response to receiving the MAC CE(s), the MAC entity may: deactivate the SCell; stop an SCell deactivation timer associated with the SCell; and/or flush all HARQ buffers associated with the SCell.

In an example, when an SCell deactivation timer associated with an activated SCell expires and an SCell hibernation timer is not configured, the MAC entity may: deactivate the SCell; stop the SCell deactivation timer associated with the SCell; and/or flush all HARQ buffers associated with the SCell.

In an example, when a first PDCCH on an activated SCell indicates an uplink grant or downlink assignment, or a second PDCCH on a serving cell scheduling an activated SCell indicates an uplink grant or a downlink assignment for the activated SCell, or a MAC PDU is transmitted in a configured uplink grant or received in a configured downlink assignment, the MAC entity may: restart the SCell deactivation timer associated with the SCell; and/or restart the SCell hibernation timer associated with the SCell if configured. In an example, when an SCell is deactivated, an ongoing random access procedure on the SCell may be aborted.

In an example, when a MAC entity is configured with an SCell associated with an SCell state set to dormant state upon the SCell configuration, or when the MAC entity receives MAC CE(s) indicating transitioning the SCell into a dormant state, the MAC entity may: transition the SCell into a dormant state; transmit one or more CSI reports for the SCell; stop an SCell deactivation timer associated with the SCell; stop an SCell hibernation timer associated with the SCell if configured; start or restart a dormant SCell deactivation timer associated with the SCell; and/or flush all HARQ buffers associated with the SCell. In an example, when the SCell hibernation timer associated with the activated SCell expires, the MAC entity may: hibernate the SCell; stop the SCell deactivation timer associated with the SCell; stop the SCell hibernation timer associated with the SCell; and/or flush all HARQ buffers associated with the SCell. In an example, when a dormant SCell deactivation timer associated with a dormant SCell expires, the MAC entity may: deactivate the SCell; and/or stop the dormant SCell deactivation timer associated with the SCell. In an example, when an SCell is in dormant state, ongoing random access procedure on the SCell may be aborted.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may further configure the UE with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the UE to operate on the SCell upon the SCell being activated.

In paired spectrum (e.g. FDD), a gNB and/or a UE may independently switch a DL BWP and an UL BWP. In unpaired spectrum (e.g. TDD), a gNB and/or a UE may simultaneously switch a DL BWP and an UL BWP.

In an example, a gNB and/or a UE may switch a BWP between configured BWPs by means of a DCI or a BWP inactivity timer. When the BWP inactivity timer is configured for a serving cell, the gNB and/or the UE may switch an active BWP to a default BWP in response to an expiry of the BWP inactivity timer associated with the serving cell. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve UE battery consumption. BWPs other than the one active UL BWP and the one active DL BWP that the UE may work on may be deactivated. On deactivated BWPs, the UE may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time.

Figure 24:
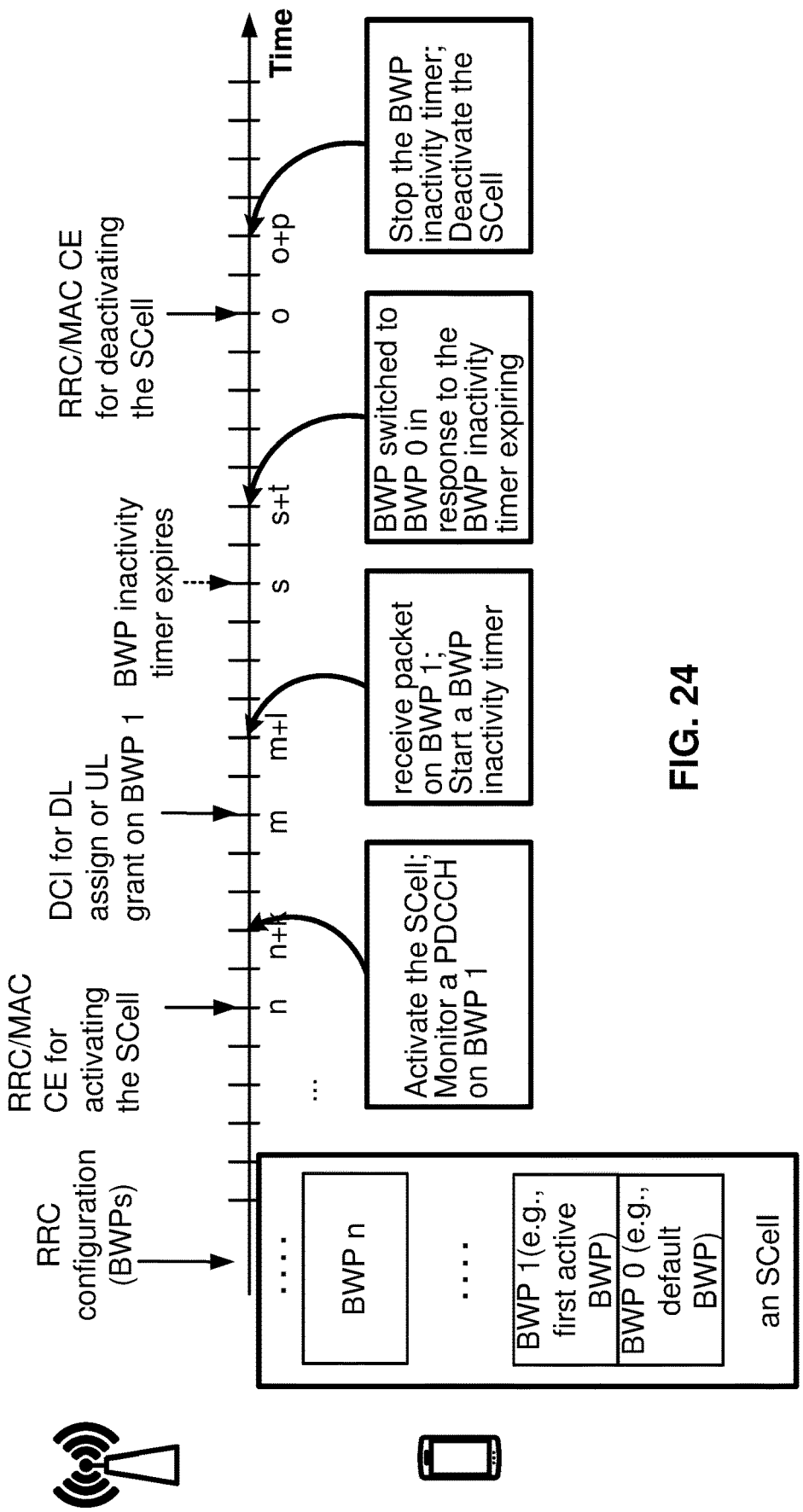
FIG. 24 is an example of BWP switching on an SCell as per an aspect of an embodiment of the present disclosure.

In an example, a BWP switching for a serving cell may be used to activate an inactive BWP and deactivate an active BWP at a time. In an example, the BWP switching may be controlled by a PDCCH indicating a downlink assignment or an uplink grant. The BWP switching may be controlled by a BWP inactivity timer (e.g., bwp-Inactivity-Timer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL. FIG. 24 shows an example of BWP switching on an SCell.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter bwp-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, DRX operation may be used by a wireless device (UE) to improve UE battery lifetime. In an example, in DRX, UE may discontinuously monitor downlink control channel, e.g., PDCCH or EPDCCH. In an example, the base station may configure DRX operation with a set of DRX parameters, e.g., using RRC configuration. The set of DRX parameters may be selected based on the application type such that the wireless device may reduce power and resource consumption. In an example, in response to DRX being configured/activated, a UE may receive data packets with an extended delay, since the UE may be in DRX Sleep/Off state at the time of data arrival at the UE and the base station may wait until the UE transitions to the DRX ON state. The base station may select the DRX parameters for a tradeoff between the packet delay and power saving.

Figure 25:
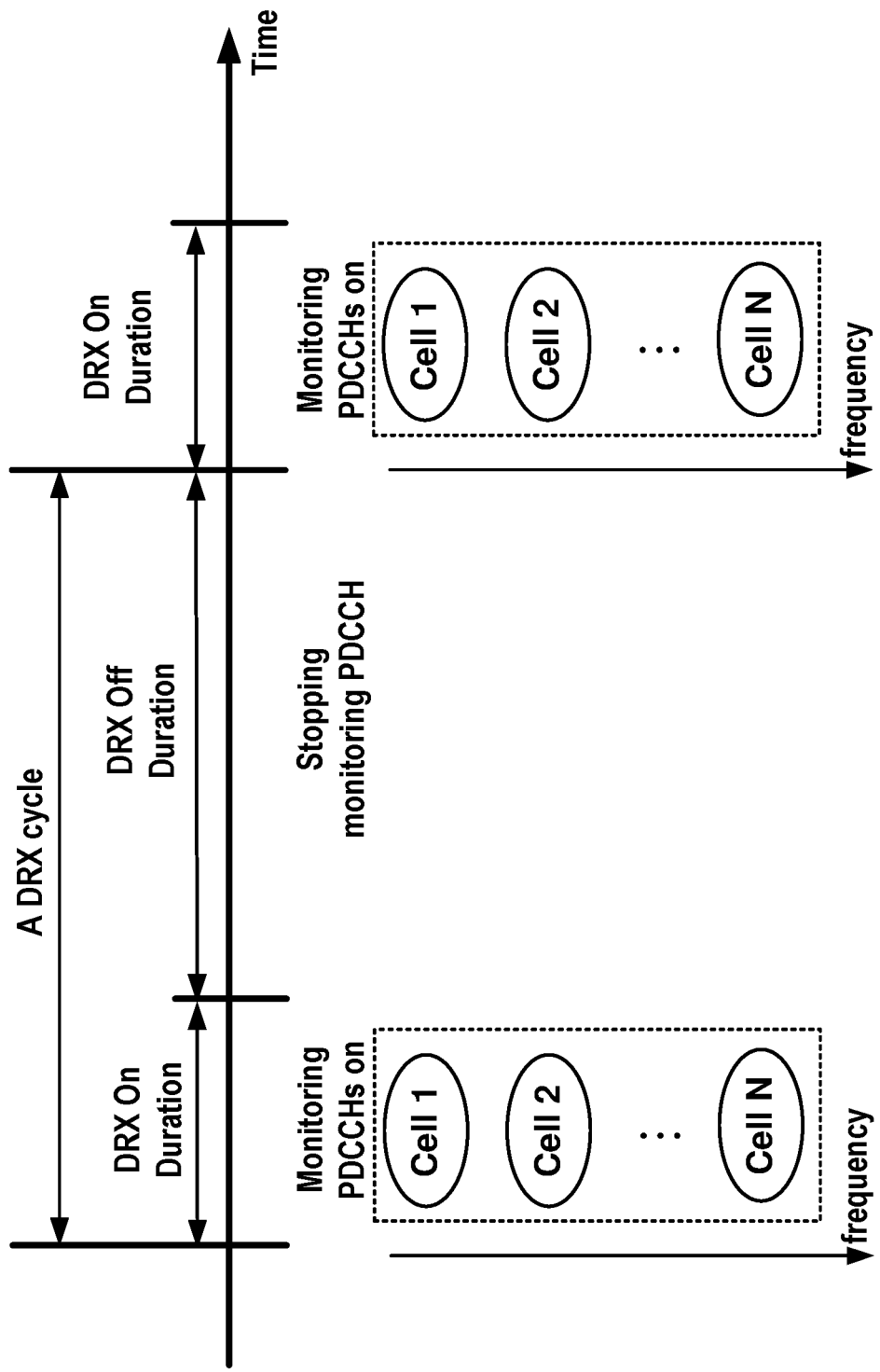
FIG. 25 is an example of discontinuous reception (DRX) operation as per an aspect of an embodiment of the present disclosure.

In an example, during a DRX mode, the UE may power down most of its circuitry when there are no packets to be received. During this time the UE listens to the downlink (DL) (or monitors PDCCHs) which is called DRX Active state. In a DRX mode, a time during which UE doesn't listen/monitor PDCCH is called DRX Sleep state. FIG. 25 shows an example of the embodiment. A gNB may transmit an RRC message comprising one or more DRX parameters of a DRX cycle. The one or more parameters may comprise a first parameter and/or a second parameter. The first parameter may indicate a first time value of the DRX Active state (e.g., DRX On duration) of the DRX cycle. The second parameter may indicate a second time of the DRX Sleep state (e.g., DRX Off duration) of the DRX cycle. The one or more parameters may further comprise a time duration of the DRX cycle. During the DRX Active state, the UE may monitor PDCCHs for detecting one or more DCIs on a serving cell. During the DRX Sleep state, the UE may stop monitoring PDCCHs on the serving cell. When multiple cells are in active state, the UE may monitor all PDCCHs on (or for) the multiple cells during the DRX Active state. During the DRX off duration, the UE may stop monitoring all PDCCH on (or for) the multiple cells. The UE may repeat the DRX operations according to the one or more DRX parameters.

In an example, DRX may be beneficial to the base station. In an example, if DRX is not configured, the wireless device may be transmitting periodic CSI and/or SRS frequently (e.g., based on the configuration). With DRX, during DRX OFF periods, the UE may not transmit periodic CSI and/or SRS. The base station may assign these resources to the other UEs to improve resource utilization efficiency.

In an example, the MAC entity may be configured by RRC with a DRX functionality that controls the UE's downlink control channel (e.g., PDCCH) monitoring activity for a plurality of RNTIs for the MAC entity. The plurality of RNTIs may comprise at least one of: C-RNTI; CS-RNTI; INT-RNTI; SP-CSI-RNTI; SFI-RNTI; TPC-PUCCH-RNTI; TPC-PUSCH-RNTI; Semi-Persistent Scheduling C-RNTI; eIMTA-RNTI; SL-RNTI; SL-V-RNTI; CC-RNTI; or SRS-TPC-RNTI. In an example, in response to being in RRC-_CONNECTED, if DRX is configured, the MAC entity may monitor the PDCCH discontinuously using the DRX operation; otherwise the MAC entity may monitor the PDCCH continuously.

In an example, RRC may control DRX operation by configuring a plurality of timers. The plurality of timers may comprise: a DRX On duration timer (e.g., drx-onDuration-Timer); a DRX inactivity timer (e.g., drx-InactivityTimer); a downlink DRX HARQ RTT timer (e.g., drx-HARQ-RTT-TimerDL); an uplink DRX HARQ RTT Timer (e.g., drx-HARQ-RTT-TimerUL); a downlink retransmission timer (e.g., drx-RetransmissionTimerDL); an uplink retransmission timer (e.g., drx-RetransmissionTimerUL); one or more parameters of a short DRX configuration (e.g., drx-Short-Cycle and/or drx-ShortCycleTimer)) and one or more parameters of a long DRX configuration (e.g., drx-Long-Cycle). In an example, time granularity for DRX timers may be in terms of PDCCH subframes (e.g., indicated as psf in the DRX configurations), or in terms of milliseconds.

In an example, in response to a DRX cycle being configured, the Active Time may include the time while at least one timer is running. The at least one timer may comprise drx-onDurationTimer, drx-InactivityTimer, drx-RetransmissionTimerDL, drx-RetransmissionTimerUL, or mac-ContentionResolutionTimer.

In an example, drx-Inactivity-Timer may specify a time duration for which the UE may be active after successfully decoding a PDCCH indicating a new transmission (UL or DL or SL). In an example, this timer may be restarted upon receiving PDCCH for a new transmission (UL or DL or SL). In an example, the UE may transition to a DRX mode (e.g., using a short DRX cycle or a long DRX cycle) in response to the expiry of this timer.

In an example, drx-ShortCycle may be a first type of DRX cycle (e.g., if configured) that needs to be followed when UE enters DRX mode. In an example, a DRX-Config IE indicates the length of the short cycle.

In an example, drx-ShortCycleTimer may be expressed as multiples of shortDRX-Cycle. The timer may indicate the number of initial DRX cycles to follow the short DRX cycle before entering the long DRX cycle.

In an example, drx-onDurationTimer may specify the time duration at the beginning of a DRX Cycle (e.g., DRX ON). In an example, drx-onDurationTimer may indicate the time duration before entering the sleep mode (DRX OFF).

In an example, drx-HARQ-RTT-TimerDL may specify a minimum duration from the time new transmission is received and before the UE may expect a retransmission of a same packet. In an example, this timer may be fixed and may not be configured by RRC.

In an example, drx-RetransmissionTimerDL may indicate a maximum duration for which UE may be monitoring PDCCH when a retransmission from the eNodeB is expected by the UE.

In an example, in response to a DRX cycle being configured, the Active Time may comprise the time while a Scheduling Request is sent on PUCCH and is pending.

In an example, in response to a DRX cycle being configured, the Active Time may comprise the time while an uplink grant for a pending HARQ retransmission can occur and there is data in the corresponding HARQ buffer for synchronous HARQ process.

In an example, in response to a DRX cycle being configured, the Active Time may comprise the time while a PDCCH indicating a new transmission addressed to the C-RNTI of the MAC entity has not been received after successful reception of a Random Access Response for the preamble not selected by the MAC entity.

In an example, DRX may be configured for a wireless device. A DL HARQ RTT Timer may expire in a subframe and the data of the corresponding HARQ process may not be successfully decoded. The MAC entity may start the drx-RetransmissionTimerDL for the corresponding HARQ process.

In an example, DRX may be configured for a wireless device. An UL HARQ RTT Timer may expire in a subframe. The MAC entity may start the drx-RetransmissionTimerUL for the corresponding HARQ process.

In an example, DRX may be configured for a wireless device. A DRX Command MAC control element or a Long DRX Command MAC control element may be received. The MAC entity may stop drx-onDurationTimer and stop drx-InactivityTimer.

In an example, DRX may be configured for a wireless device. In an example, drx-InactivityTimer may expire or a DRX Command MAC control element may be received in a subframe. In an example, in response to Short DRX cycle being configured, the MAC entity may start or restart drx-ShortCycleTimer and may use Short DRX Cycle. Otherwise, the MAC entity may use the Long DRX cycle.

In an example, DRX may be configured for a wireless device. In an example, drx-ShortCycleTimer may expire in a subframe. The MAC entity may use the Long DRX cycle.

In an example, DRX may be configured for a wireless device. In an example, a Long DRX Command MAC control element may be received. The MAC entity may stop drx-ShortCycleTimer and may use the Long DRX cycle.

In an example, DRX may be configured for a wireless device. In an example, if the Short DRX Cycle is used and [(SFN*10)+subframe number] modulo (drx-ShortCycle)= (drxStartOffset) modulo (drx-ShortCycle), the wireless device may start drx-onDurationTimer.

In an example, DRX may be configured for a wireless device. In an example, if the Long DRX Cycle is used and [(SFN*10)+subframe number] modulo (drx-longCycle) =drxStartOffset, the wireless device may start drx-onDurationTimer.

Figure 26:
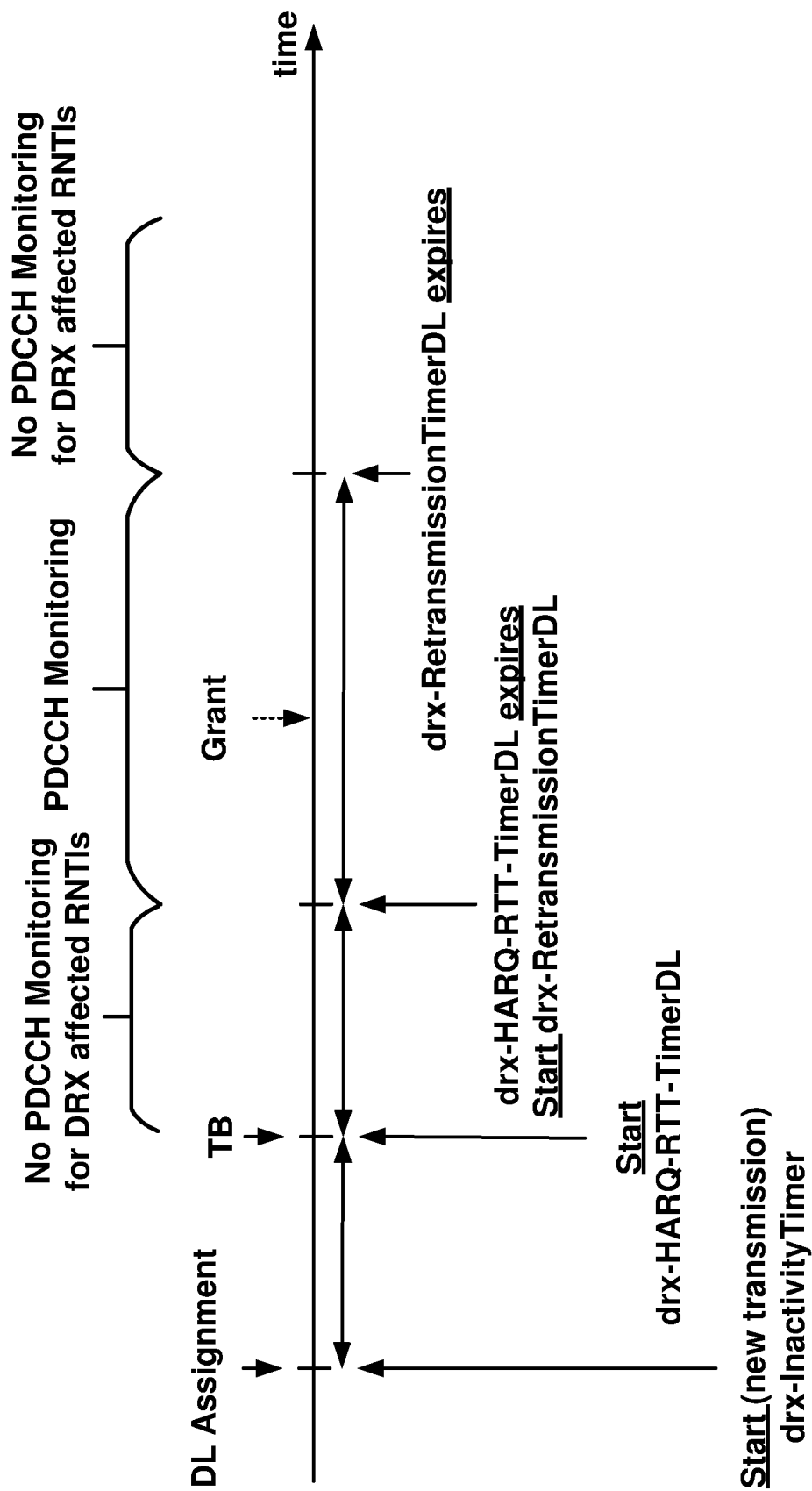
FIG. 26 is an example of DRX operation as per an aspect of an embodiment of the present disclosure.

FIG. 26 shows example of DRX operation in a legacy system. A base station may transmit a RRC message comprising configuration parameters of DRX operation. A base station may transmit a DCI for downlink resource allocation via a PDCCH, to a UE. the UE may start the drx-InactivityTimer during which, the UE may monitor the PDCCH. After receiving a transmission block (TB) when the drx-InactivityTimer is running, the UE may start a HARQ RTT Timer (e.g., drx-HARQ-RTT-TimerDL), during which, the UE may stop monitoring the PDCCH. The UE may transmit a NACK to the base station upon unsuccessful receiving the TB. When the HARQ RTT Timer expires, the UE may monitor the PDCCH and start a HARQ retransmission timer (e.g., drx-RetransmissionTimerDL). When the HARQ retransmission timer is running, the UE may receive a second DCI indicating a DL grant for the retransmission of the TB. If not receiving the second DCI before the HARQ retransmission timer expires, the UE may stop monitoring the PDCCH.

Figure 27A:
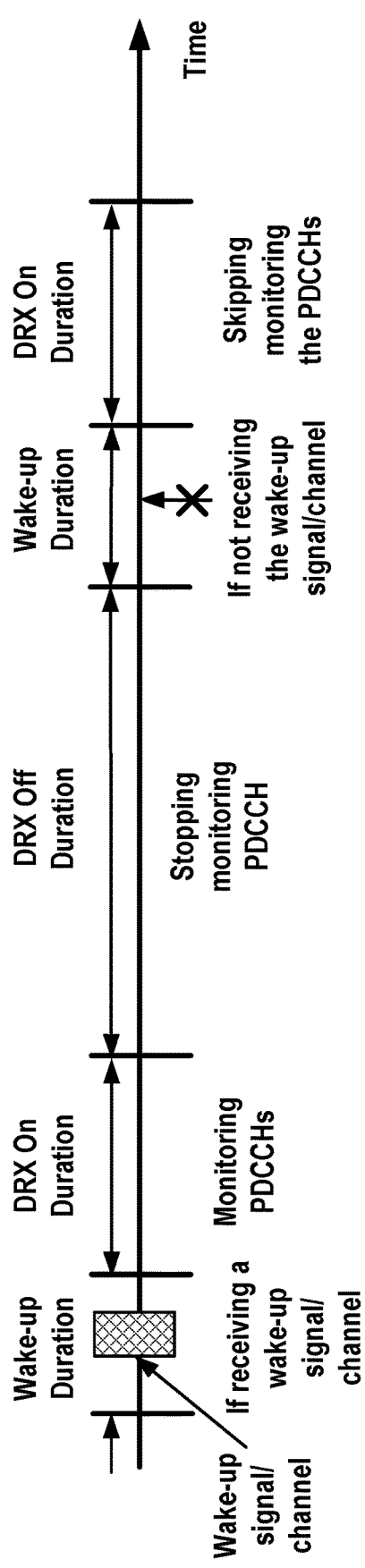
FIG. 27A is an example of a wake-up signal/channel based power saving operation as per an aspect of an embodiment of the present disclosure.
Figure 27B:
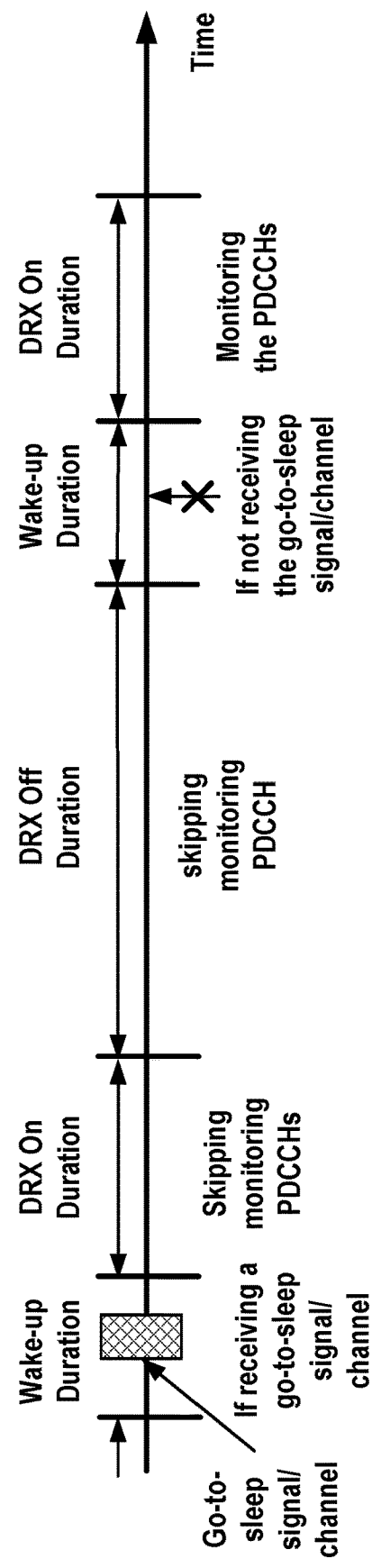
FIG. 27B is an example of a go-to-sleep signal/channel based power saving operation as per an aspect of an embodiment of the present disclosure.

In an LTE/LTE-A or 5G system, when configured with DRX operation, a UE may monitor PDCCH for detecting one or more DCIs during the DRX Active time of a DRX cycle. The UE may stop monitoring PDCCH during the DRX sleep/Off time of the DRX cycle, to save power consumption. In some cases, the UE may fail to detect the one or more DCIs during the DRX Active time, since the one or more DCIs are not addressed to the UE. For example, a UE may be an URLLC UE, or a NB-IoT UE, or an MTC UE. The UE may not always have data to be received from a gNB, in which case, waking up to monitor PDCCH in the DRX active time may waste power consumption. A wake-up mechanism combined with DRX operation may be used to further reduce power consumption specifically in a DRX active time. FIG. 27A and FIG. 27B show examples of the wake-up mechanism.

In FIG. 27A, a gNB may transmit one or more messages comprising parameters of a wake-up duration (or a power saving duration), to a UE. The wake-up duration may be located a number of slots (or symbols) before a DRX On duration of a DRX cycle. The number of slots (or symbols) may be configured in the one or more RRC messages or predefined as a fixed value. In an example, the wake-up mechanism may be based on a wake-up signal. The parameters of the wake-up duration may comprise at least one of: a wake-up signal format (e.g., numerology, sequence length, sequence code, etc.); a periodicity of the wake-up signal; a time duration value of the wake-up duration; a frequency location of the wake-up signal. In an example, the wake-up mechanism may be based on a wake-up channel (e.g., a PDCCH, or a DCI). The parameters of the wake-up duration may comprise at least one of: a wake-up channel format (e.g., numerology, DCI format, PDCCH format); a periodicity of the wake-up channel; a control resource set and/or a search space of the wake-up channel. When configured with the parameters of the wake-up duration, the UE may monitor the wake-up signal or the wake-up channel during the wake-up duration. In response to receiving the wake-up signal/channel, the UE may wake-up to monitor PDCCHs as expected according to the DRX configuration. In an example, in response to receiving the wake-up signal/channel, the UE may monitor PDCCHs in the DRX active time (e.g., when drx-onDurationTimer is running). The UE may go back to sleep if not receiving PDCCHs in the DRX active time. The UE may keep in sleep during the DRX off duration of the DRX cycle. In an example, if the UE doesn't receive the wake-up signal/channel during the wake-up duration, the UE may skip monitoring PDCCHs during the DRX active time. This mechanism may reduce power consumption for PDCCH monitoring during the DRX active time. In the example, during the wake-up duration, a UE may monitor the wake-up signal/channel only. During the DRX off duration, the UE may stop monitoring PDCCHs and the wake-up signal/channel. During the DRX active duration, the UE may monitor PDCCHs except of the wake-up signal/channel, if receiving the wake-up signal/channel in the wake-up duration. In an example, the gNB and/or the UE may apply the wake-up mechanism in paging operation when the UE is in an RRC_idle state or an RRC_inactive state, or in a connected DRX operation (C-DRX) when the UE is in an RRC_CONNECTED state.

In an example, a wake-up mechanism may be based on a go-to-sleep signal/channel. FIG. 27B shows an example. A gNB may transmit one or more messages comprising parameters of a wake-up duration (or a power saving duration), to a UE. The wake-up duration may be located a number of slots (or symbols) before a DRX On duration of a DRX cycle. The number of slots (or symbols) may be configured in the one or more RRC messages or predefined as a fixed value. In an example, the wake-up mechanism may be based on a go-to-sleep signal. The parameters of the wake-up duration may comprise at least one of: a go-to-sleep signal format (e.g., numerology, sequence length, sequence code, etc.); a periodicity of the go-to-sleep signal; a time duration value of the wake-up duration; a frequency location of the go-to-sleep signal. In an example, the wake-up mechanism may be based on a go-to-sleep channel (e.g., a PDCCH, or a DCI). The parameters of the wake-up duration may comprise at least one of: a go-to-sleep channel format (e.g., numerology, DCI format, PDCCH format); a periodicity of the go-to-sleep channel; a control resource set and/or a search space of the go-to-sleep channel. When configured with the parameters of the wake-up duration, the UE may monitor the go-to-sleep signal or the go-to-sleep channel during the wake-up duration. In response to receiving the go-to-sleep signal/channel, the UE may go back to sleep and skip monitoring PDCCHs during the DRX active time. In an example, if the UE doesn't receive the go-to-sleep signal/channel during the wake-up duration, the UE may monitor PDCCHs during the DRX active time. This mechanism may reduce power consumption for PDCCH monitoring during the DRX active time.

In an example, transitioning an SCell into a dormant state may reduce power consumption of a wireless device. Transitioning an SCell into a dormant state may provide up-to-date channel information feedback of an SCell to a base station. The up-to-date channel information feedback of the SCell may allow the base station to have a quick and accurate channel adaptive scheduling for the SCell once the SCell is activated. Existing CA and BWP management may not allow uplink transmission when the SCell is in a dormant state except for a periodic CSI report. The periodic CSI report may not be power efficient compared with SRS transmission. For example, in TDD case, measuring CSI-RS for a CSI report and transmitting the CSI report via a PUCCH or PUSCH may consume more power than directly transmitting an SRS.

In an example, a UE and a base station may transition an SCell into a dormant state (or a power saving state) to reduce power consumption for a wireless device. In the dormant state, a UE may stop monitoring downlink control channel and may stop transmitting transport blocks via the SCell to reduce battery power consumption. In existing technologies, the UE may transmit one or more SRS to enable the base station to perform SRS-based beam management for the UE and a base station. The UE may transition to a power saving state (or a dormant state). The UE may stop transmission of SRS signals in the power saving state to reduce power consumption. Implementation of existing technology may reduce the power consumption, however it reduces uplink transmission efficiency, for example, may cause a beam pair link broken and/or increase beam recovery latency for an SRS-based beam management.

In an example implementation of existing technologies, a base station may configure SRSs configuration for a cell.

The UE may transmit the SRSs configured for the SCell in both active state and power saving state to enable beam management for maintaining beam pair link. This implementation may increase battery power consumption in the UE and may reduce uplink spectral efficiency. Example embodiments implement an enhanced SRS configuration for a cell and SRS transmission process when multiple power states (e.g., active state, power saving state, or the like) are implemented in a UE and base station. Example embodiments implement an enhanced signaling method for configuring a new SRS configuration and SRS processes to reduce power consumption and reduce beam failure. Example embodiments implement two SRS configurations for two different power states of a cell. An enhanced process is implemented to transmit a second SRS based on a second SRS configuration when a UE transitions to a second power state. This may increase RRC message overhead, but implementations of the example embodiments increase overall radio link efficiency by introducing a second SRS configuration and process for the power saving state. For example, SRS transmission periodicity may be longer during a power saving state to reduce power consumption while maintaining beam pair link.

In an example, a wireless device may transmit uplink data packet on an active BWP of a multiple BWPs of a cell when the cell is in active state. The wireless device may deactivate the active BWP when the cell is in inactive state. The wireless device may stop uplink transmission of uplink data packet on a BWP of the plurality of BWPs of the cell when the cell is in a power saving state or a dormant state.

In an example implement of existing technologies, the wireless device may transmit SRS(s) for beam management on the active BWP of the cell when the cell is in a power saving state. Existing technologies may increase battery power consumption in the UE. Example embodiments implement an enhanced SRS configuration for a cell comprising multiple BWPs when multiple power states (e.g., active state, power saving state, or the like) are implemented in a UE and base station. Example embodiments implement an enhanced signaling method for configuring an SRS configuration on a BWP of the multiple BWPs of the cell, the SRS configuration being used in a power saving state. For example, the BWP configured with the SRS for the power saving state may be a default BWP, with narrower bandwidth than other non-default BWPs of the cell. An enhanced process is implemented to transmit, on an active BWP of a cell, a first SRS based on a first SRS configuration when the cell is in active state and transmit, on a second BWP of the cell, a second SRS based on a second SRS configuration when the cell is in a power saving state (or in a dormant state). The second BWP may be different from the active BWP of the cell. Example embodiments may improve power consumption of the wireless device for beam management and CSI report in a power saving state when multiple BWPs are configured in a cell.

In an example, a gNB may transmit one or more messages comprising configuration parameters of one or more cells, to a UE (e.g., a wireless device). The one or more messages may comprise one or more RRC messages (e.g., an RRC connection reconfiguration message, an RRC connection reestablishment message, or an RRC connection setup message). A first cell of the one or more cells may be a PCell (or a PSCell). A second cell of the one or more cells may be an SCell when carrier aggregation or dual connectivity is configured. When a second cell is an SCell configured without PUCCH, the second cell may be associated with an SCell state indicator (e.g., sCellState). In an example, an SCell state indicator associated with an SCell may be set to one of an active state (e.g., "activated"), a dormant state (e.g., "dormant"), or an inactive state (e.g., "inactive"). In another example, an SCell state indicator associated with an SCell may be set to one of "activated" or "dormant". In an example, when an SCell is configured without the SCell state indicator (e.g., the SCell state indicator is absent), the SCell may be set to an inactive state. In another example, when an SCell is configured without the SCell state indicator (e.g., the SCell state indicator is absent), the SCell may be set to a dormant state.

In an example, the configuration parameters, associated with at least one of the one or more cells, may indicate a first value of a first scell timer (e.g., sCellDeactivationTimer), a second value of a second scell timer (e.g., sCellHibernationTimer), and/or a third value of a third scell timer (e.g., dormantSCellDeactivationTimer). In an example, the at least one cell may comprise a plurality of downlink BWPs, where each of the plurality of downlink BWPs may be associated with a BWP ID (e.g., a BWP specific ID) and one or more first parameters. In another example, the at least one cell may comprise a plurality of uplink BWPs, where each of the plurality of uplink BWPs may be associated with a BWP ID (e.g., a BWP specific ID) and one or more second parameters.

In an example, each of the plurality of the uplink BWPs may be in one of an active state, an inactive state, or a dormant state, for example, when the wireless device and/or the gNB supports an uplink BWP in a dormant state. The gNB and/or the wireless device may exchange information regarding whether a dormant state is supported on an uplink BWP by RRC messages (e.g., UE-UTRA-Capability IE or UE-NR-Capability IE). The exchanging the one or more RRC messages may comprise: receiving by the UE from the gNB one or more UE capability enquiry messages (e.g., UECapabilityEnquiry) and/or transmitting from the UE to the gNB one or more UE capability information messages (e.g., UECapabilityInformation). The one or more UE capability information messages may comprise UE-UTRA-Capability IE or UE-NR-Capability IE. Based on the one or more UE capability information messages transmitted from the UE, the gNB may transmit one or more RRC messages comprising configuration parameters of the dormant state. Based on the one or more RRC messages, the UE may perform power saving operation by implementing example embodiments of FIG. 28.

In an example, the wireless device may apply operations on an uplink BWP in an active state comprising: transmitting on UL-SCH; transmitting one or more first SRSs; transmitting on RACH; transmitting PUCCH; and/or (re-) initializing any suspended configured uplink grants of configured grant Type 1 according to a stored configuration, if any.

In an example, when an uplink BWP is deactivated (or in an inactive state), the wireless device: may not transmit on UL-SCH on the uplink BWP; may not transmit on RACH on the uplink BWP; may not transmit PUCCH on the uplink BWP; may not transmit SRS on the uplink BWP; may clear any configured uplink grant of configured grant Type 2 on the uplink BWP; and/or may suspend any configured uplink grant of configured Type 1 on the uplink BWP.

In an example, when an uplink BWP of an SCell is in a dormant state, the wireless device: may transmit one or more second SRSs on the uplink BWP of the SCell; may not transmit on UL-SCH on the uplink BWP; may not transmit on RACH, if configured, on the uplink BWP; may clear configured uplink grant of configured grant Type 2; and/or may suspend any configured uplink grant of configured Type 1. In an example, the one or more second SRSs transmitted on the uplink BWP when the uplink BWP is in dormant state may be configured separately from other SRSs (e.g., the one or more first SRSs) configured for the uplink BWP when the uplink BWP is in active state. In an example, a gNB may transmit one or more messages of an uplink BWP of a cell, the one or more messages comprising first parameters of one or more first SRSs and second parameters of one or more second SRSs, to a UE. The UE may transmit the one or more first SRSs via the uplink BWP when the uplink BWP is in active state. The UE may transmit the one or more second SRSs via the uplink BWP when the uplink BWP is in dormant state. Allowing a UE to transmit SRSs when an uplink BWP is in dormant state may provide a gNB up-to-date channel state information for the uplink BWP and/or an downlink BWP associated with the uplink BWP (e.g., in TDD case or massive MIMO case). It may improve scheduling delay when the gNB transitions the uplink BWP from the dormant state to an active state. Allowing a UE to transmit SRSs when an uplink BWP is in dormant state may provide a gNB one or more available beams, which the base station may use for downlink transmission after a downlink BWP is activated.

In an example, configuration parameters of an SCell may indicate at least one of: an initial active UL BWP; a default UL BWP; a first active UL BWP, of a plurality of UL BWPs of the SCell. In an example, each of a plurality of UL BWPs may be associated with an UL BWP ID. In an example, the initial active UL BWP may be same as or different from the default UL BWP. In an example, the first active UL BWP may be same as or different from the initial active UL BWP.

In an example, a gNB may transmit, to a wireless device, an RRC message comprising parameters indicating configuration of an SCell with an SCell state indicator set to "activated". When configured with a first active UL BWP for the SCell, the wireless device may perform a random access procedure on the first active UL BWP of the SCell. In an example, a gNB may transmit an RRC message comprising parameters indicating addition of an SCell or reconfiguration of an SCell. When configured with a first active UL BWP for the SCell, the wireless device may perform a random access procedure on the first active UL BWP of the SCell, when the SCell is transitioned into active state, for example, by an activation/deactivation MAC CE and/or a hibernation MAC CE.

In an example, configuration parameters of an SCell may indicate one or more designated UL BWPs of a plurality of BWPs of the SCell. In an example, one of the one or more designated UL BWPs may be the same as or different from an initial active UL BWP or a first active UL BWP. In an example, the one or more designated UL BWPs may be predefined or fixed (e.g., without RRC message indication). In an example, the one or more designated UL BWPs may be at least one of: the default UL BWP; the initial active UL BWP; and/or the first active UL BWP.

In an example, in response to receiving one or more MAC CEs indicating transition of an SCell into a dormant state, or in response to an expiry of an SCell hibernation timer (e.g., sCellHibernationTimer) associated with the SCell, a wireless device may: may transmit one or more second SRSs (or one or more uplink positioning RSs) on the one or more designated uplink BWPs of the SCell; may not transmit on UL-SCH on the one or more designated uplink BWPs; may not transmit on RACH, if configured, on the one or more designated uplink BWPs; may clear any configured uplink grant of configured grant Type 2; and/or may suspend any configured uplink grant of configured Type 1. In an example, transmitting the one or more uplink positioning RSs may be helpful for the gNB to locate the UE when the SCell is in a dormant state. The one or more uplink positioning RSs may be transmitted by the UE for positioning operation at the gNB. The one or more uplink positioning RSs may be different from or same as other uplink RSs (e.g., SRSs, DMRSs, or phase tracking RSs). The one or more MAC CEs may comprise at least one of an activation/deactivation MAC CE and/or a hibernation MAC CE.

Figure 28:
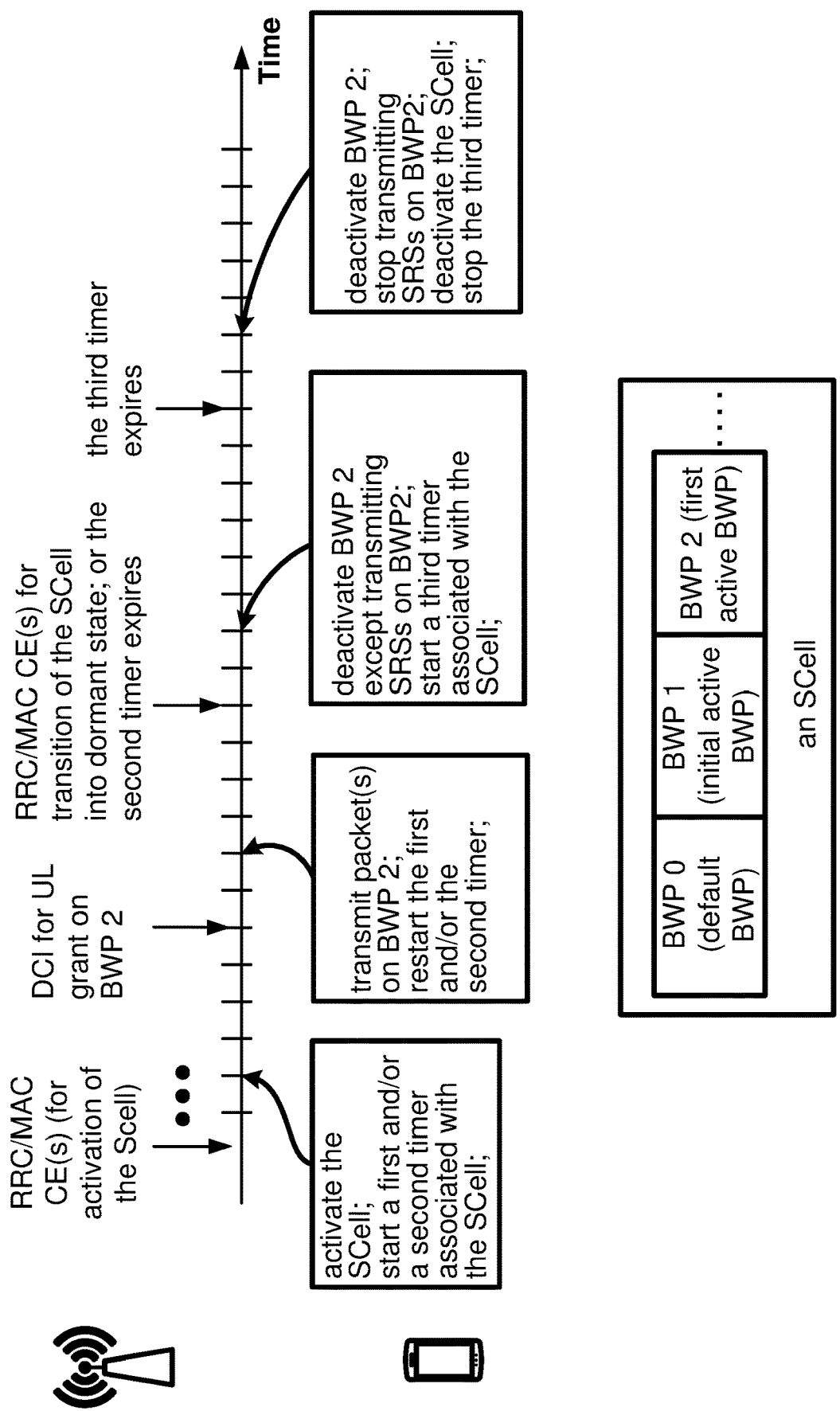
FIG. 28 is an example of SRS transmission in a dormant cell as per an aspect of an embodiment of the present disclosure.

FIG. 28 shows an example of BWP operations in one or more SCell states. In an example, when configured with multiple UL BWPs for an SCell, a gNB may transmit one or more RRC messages comprising parameters indicating a default BWP (e.g., BWP 0), an initial active BWP (e.g., BWP 1), a first active BWP (e.g., BWP 2), and/or designated BWP(s) for the SCell in dormant state. The designated BWP(s) may be the same as the default BWP, the initial active BWP, and/or the first active BWP.

In an example, a gNB may transmit, to a wireless device, one or more first RRC messages or first MAC CE(s) indicating activation of the SCell. In response to receiving the one or more first RRC messages or the first MAC CE(s), the wireless device may: activate the SCell; activate the first active BWP if configured; start a first scell timer (e.g., sCellDeactivationTimer) with a first timer value; and/or start a second scell timer (e.g., sCellHibernationTimer) with a second timer value, where the first scell timer and the second scell timer may be associated with the SCell.

In an example, a gNB may transmit, to a wireless device, a DCI comprising parameters indicating an UL grant on the first active BWP or a second BWP of the SCell. In an example, in response to receiving the DCI, the wireless device may: (re)start a first scell timer (e.g., sCellDeactivationTimer) associated with the SCell; and/or (re)start a second scell timer (e.g., sCellHibernationTimer) associated with the SCell.

In an example, the gNB may transmit, to the wireless device, one or more second RRC messages or second MAC CE(s) indicating transition of the SCell into a dormant state. In an example, in response to receiving the one or second RRC messages or the second MAC CE(s), or in response to an expiry of the second scell timer, the wireless device may: deactivate the first active BWP or the second BWP of the SCell; transmit SRSs on the first active BWP or the second BWP of the SCell; stop the first scell timer; stop the second scell timer; and/or start a third scell timer (e.g., dormantScellDeactivationTimer).

In an example, a third scell timer (e.g., dormantScellDeactivationTimer) associated with an SCell may keep running, while the SCell is in the dormant state, until a wireless device receives commands indicating transition of the SCell into an active state or an inactive state, or the third scell timer expires. In response to an expiry of the third scell timer, a wireless device may: deactivate the first active BWP (e.g., BWP 2 in FIG. 28); stop transmitting the SRSs on the first active BWP; deactivate the SCell; and/or stop the third scell timer.

Figure 29:
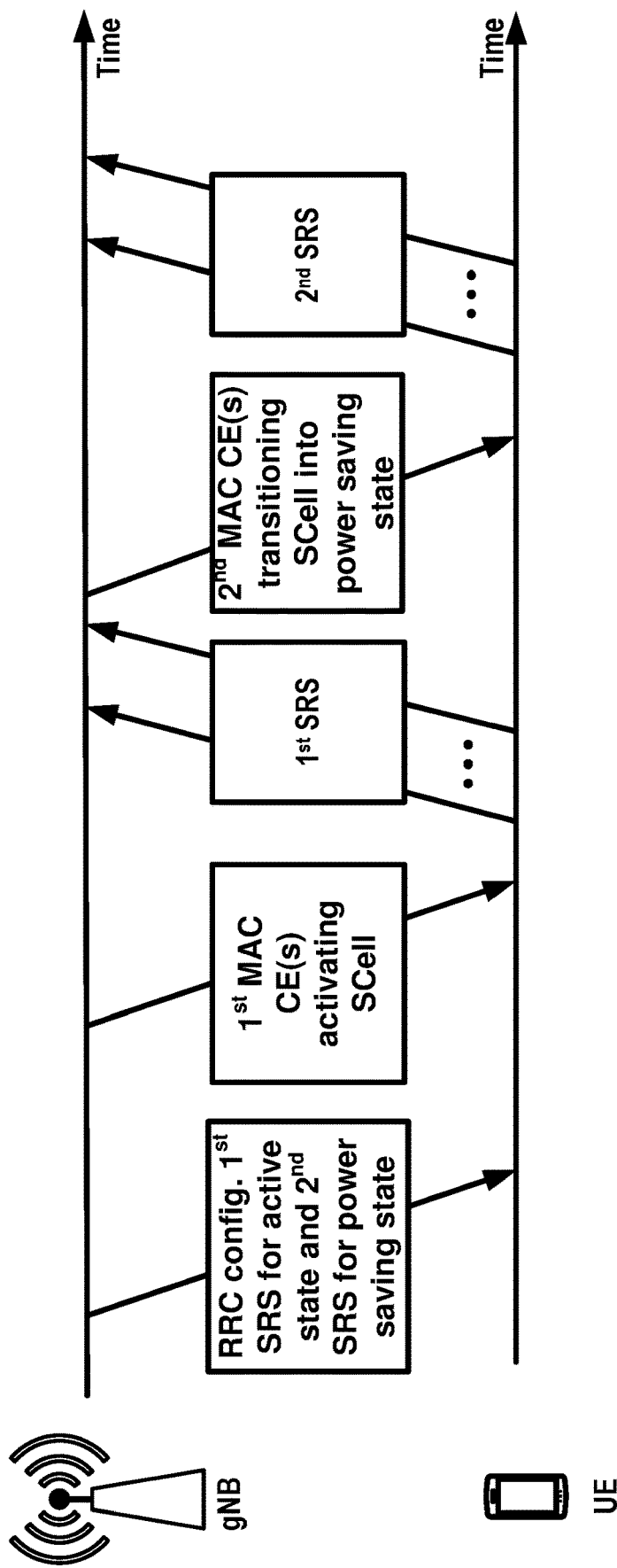
FIG. 29 is an example of SRS transmission in a cell in a power saving state as per an aspect of an embodiment of the present disclosure.

FIG. 29 shows an example SRS transmission in power saving (or dormant state). In an example, a base station may transmit one or more RRC messages of a cell, the one or more RRC messages comprising configuration parameters of first SRS configuration for an active state and second SRS configuration for a power saving state. Second SRSs of the second SRS configuration for the power saving state may be configured separately from first SRSs of the first SRS configuration for the active state. The second SRSs of the second SRS configuration for the power saving state may be configured with a longer periodicity, a smaller number of ports, and/or a smaller number of SRS resources than the first SRS for the active state. In the example of FIG. 29, the wireless device receives a first command (e.g., $1^{st}$ MAC CE) indicating an activation of the cell. In response to the first command, the wireless device transmits the first SRSs on the cell. The base station, based on the first SRSs, may determine downlink transmission format (e.g., MCS, precoding, and/or beam) for downlink data transmission on the cell. The wireless device receives a second command (e.g., $2^{nd}$ MAC CE) indicating switching the cell into a dormant state (e.g., power saving state). In response to the second command, the wireless device transmits the second SRSs on the cell which is in dormant state. The base station, based on the second SRSs, may collect channel quality information, which may be used for determining transmission format on the cell when the cell is reactivated.

Figure 30:
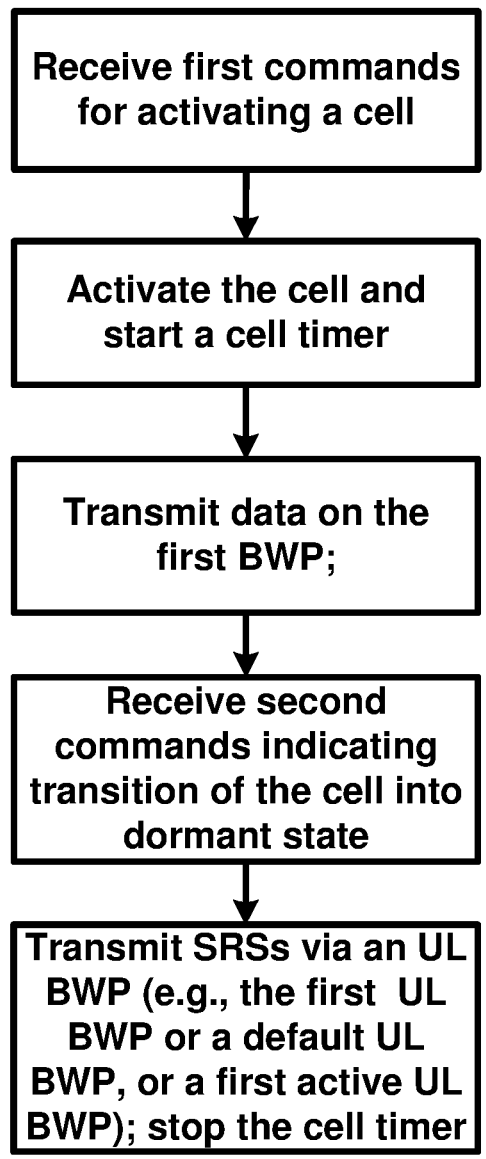
FIG. 30 is an example of flowchart of SRS transmission in a dormant cell as per an aspect of an embodiment of the present disclosure.

FIG. 30 shows an example flowchart of BWP operations. In an example, a wireless device may activate a cell and start a cell timer associated with a first timer value, in response to receiving first commands. The wireless device may activate a first UL BWP and transmit data packets on the first UL BWP in response to receiving a DCI. In an example, the wireless device may receive second command(s) indicating transition of the cell into a dormant state. In an example, the second command(s) may not comprise an SRS indication, or an activation of SRS transmission. In response to the second command(s), the wireless device may stop the cell timer. In an example, the wireless device may transmit SRSs via an UL BWP of the cell in response to receiving the second command(s). In an example, the UL BWP may be the first UL BWP, a default UL BWP configured on the cell, or a first active UL BWP configured on the cell.

Figure 31:
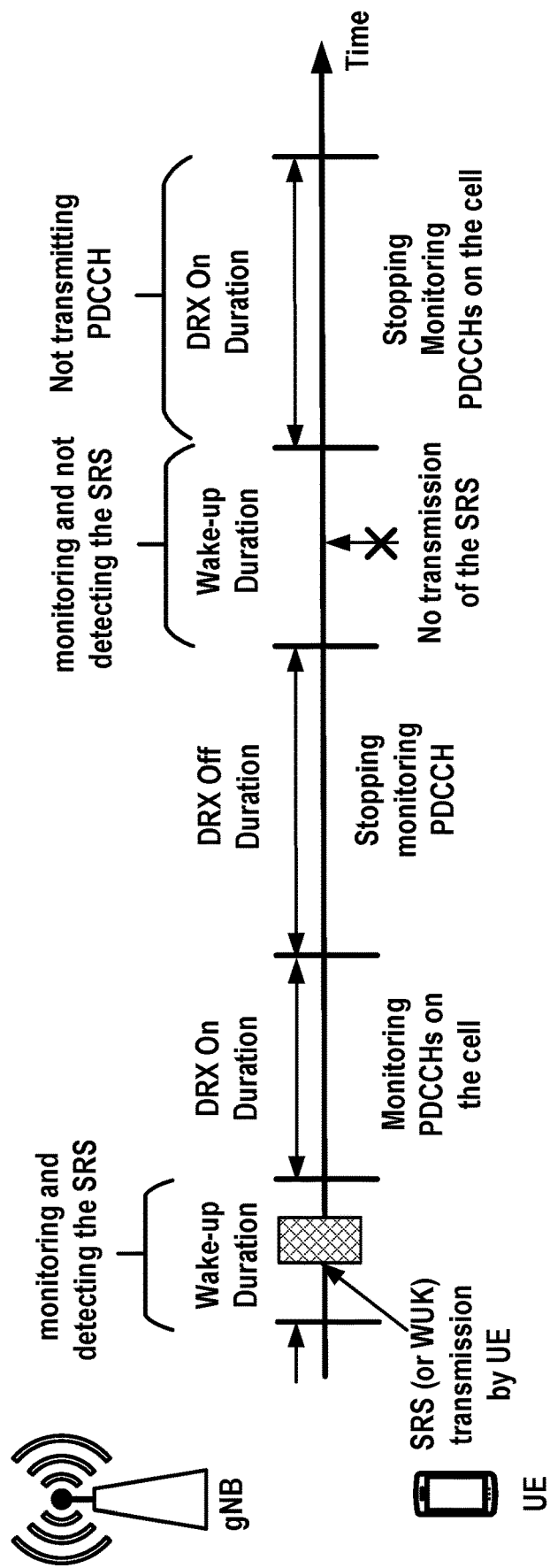
FIG. 31 is an example of an SRS-based power saving operation as per an aspect of an embodiment of the present disclosure.

FIG. 31 shows an example of an uplink signal/channel based power saving operation. In an example, a gNB may transmit one or more messages comprising parameters of a wake-up duration (or a power saving duration) to a UE. The parameters may comprise at least one of: configuration parameters of one or more uplink signals/channels; a time value of the wake-up duration; one or more frequency resources of the one or more uplink signals/channels; one or more time resources of the one or more uplink signals/channels; a periodicity of the wake-up duration; power control parameters of transmission of the one or more uplink signals/channels. In an example, the time value of the wake-up duration may be a first value (e.g., zero) or be absent in the one or more messages. The time value being the first value (e.g., zero) or absent may indicate disabling the power saving operation. In response to the time value being the first value or being absent in the one or more messages, the UE may not perform the power saving operation. The UE may perform a DRX operation according to one or more DRX configuration parameters if the DRX operation is configured or may continuously monitor PDCCHs of one or more active cells if the DRX operation is not configured. The one or more messages may further comprise one or more parameters of a DRX operation. The one or more uplink signals/channels may comprise at least one of: a SRS; a PRACH; a PUCCH; a DMRS; or a PUSCH. The one or more uplink signals/channels may comprise at least one of: a CSI report on PUCCH (e.g., SP-CSI report, or P-CSI report); or a CSI report on PUSCH (e.g., SP-CSI repot, or A-CSI report). The one or more uplink signals/channels may comprise one or more uplink positioning reference signals. The parameters may comprise configuration parameters of at least one of the one or more uplink signals or channels for the power saving operation. In an example, the one or more messages may further comprise one or more parameters indicating a time gap between the wake-up duration and a DRX active duration of the DRX operation. The gap may be determined based on a transmission delay of the wake-up signal and a processing time at the gNB.

In an example, the parameters may further indicate at least one cell of a plurality of cells for transmission of the one or more uplink signals/channels. The UE may transmit the one or more uplink signals/channels via the at least one cell for the uplink signal/channel-based power saving operation.

In an example, the parameters may further indicate at least one uplink BWP of a plurality of uplink BWPs of a cell for transmission of the one or more uplink signals/channels. The UE may transmit the one or more uplink signal/channel via the at least one uplink BWP of the cell for the uplink signal/channel-based power saving operation.

In an example, a UE may transmit at least one of the one or more uplink signals/channels (e.g., SRSs, PRACH, DRMS, PUCCH/PUSCH, or uplink positioning reference signal) via an uplink BWP of a cell during the wake-up duration. The UE may transmit the at least one of the one or more uplink signals/channels based on at least one of: the time value of the wake-up duration; the one or more frequency resources of the one or more uplink signals/channels; the one or more time resources of the one or more uplink signals/channels; the periodicity of the wake-up duration; the power control parameters of transmission of the one or more uplink signals/channels. The uplink BWP may be indicated in the RRC message, or predefined as a default BWP, or a first active BWP, or an initial active BWP. The default BWP, the first active BWP, or the initial active BWP may be configured in one or more RRC messages. The cell may be indicated by the RRC message or predefined as a PCell or a PSCell. The UE may transmit the at least one uplink signal/channel in response to uplink data being available. The UE may transmit the at least one uplink signal/channel in response to facilitating (e.g., periodically or aperiodically) uplink-based positioning of the UE at the gNB. The UE may stay in sleep mode except transmitting the at least one uplink signal/channel during the wake-up duration. Staying in sleep mode may comprise: not monitoring PDCCHs of one or more active BWPs/cells; not transmitting PUCCH/PUSCH via the one or more active BWPs/cells. In an example, in response to transmitting the at least one uplink signal/channel, the UE may monitor PDCCHs of the one or more active BWPs/cells during a DRX Active time (e.g., when drx-onDurationTimer is running). In an example, the UE may transmit data when the UE receive a DCI via the PDCCHs during the DRX Active time. The UE may go to sleep during a DRX off duration. The UE may stop monitoring the PDCCHs in response to going to sleep.

In an example, the UE may not transmit at least one of the one or more uplink signals/channels during the wake-up duration. The UE may not transmit the at least one uplink signal/channel in response to no uplink data packet being available. The UE may not transmit the at least one uplink signal/channel in response to no uplink-based positioning operation being configured. In response to not transmitting the at least one uplink signal/channel, the UE may skip monitoring PDCCHs of one or more active BWPs/cells during the DRX Active time. In an example, depending on whether the UE transmits an uplink signal/channel, the UE may decide whether wake up to monitor PDCCH in a DRX Active time, which may reduce blind decoding complexity and power consumption.

In an example, a gNB may monitor uplink channels for detecting one or more uplink signals/channels transmitted from a UE during a wake-up duration. In response to detecting the one or more uplink signals/channels, the gNB may transmit one or more DCIs via a PDCCH during a DRX On duration (e.g., when drx-onDurationTimer is running). The one or more DCIs may comprise at least one of: uplink grants; or downlink assignments. In an example, in response to not detecting the one or more uplink signals/channels, the gNB may not transmit the one or more DCIs via the PDCCH during the DRX On duration.

Figure 32:
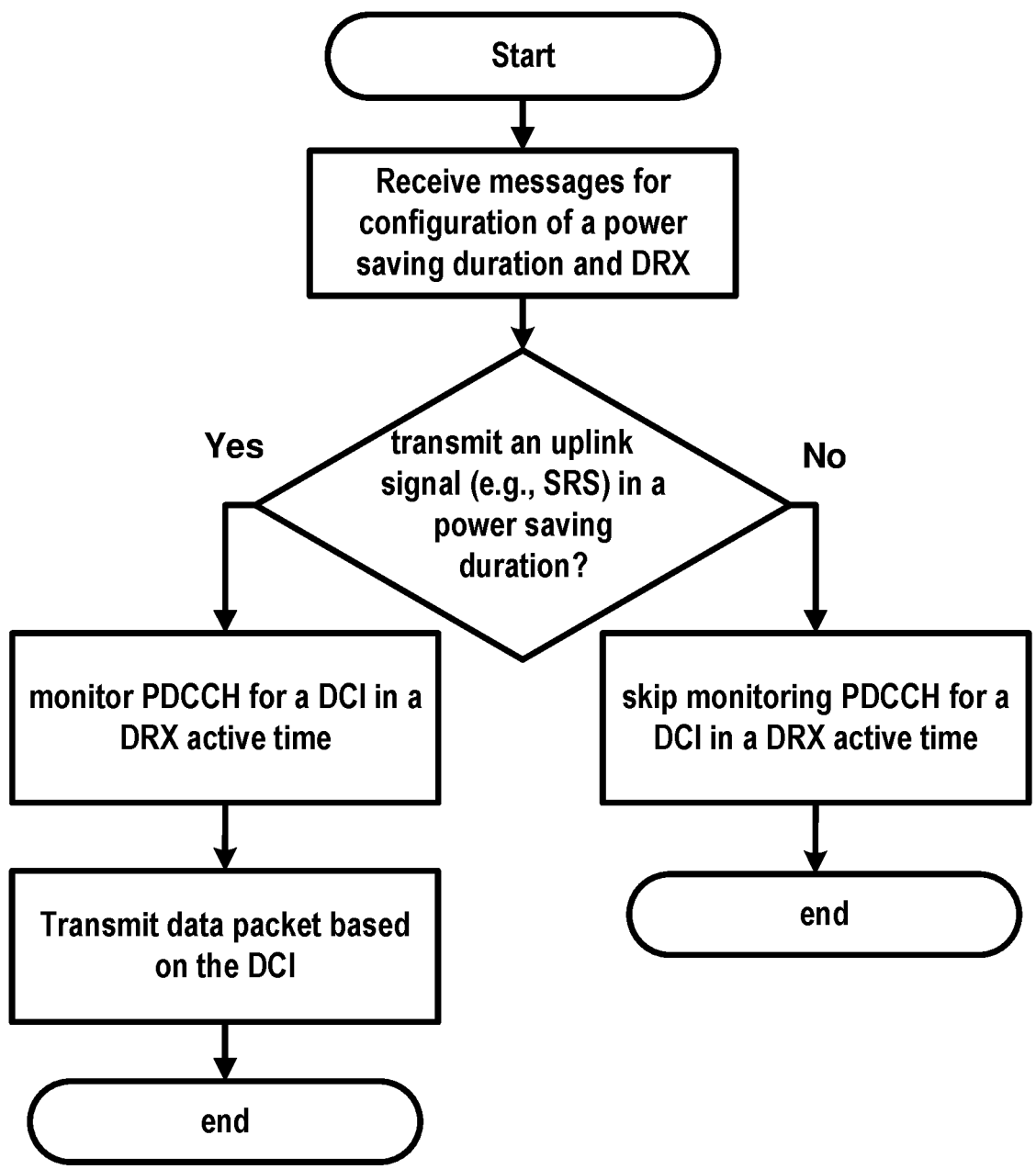
FIG. 32 is an example of flowchart of an SRS-based power saving operation as per an aspect of an embodiment of the present disclosure.

FIG. 32 shows an example flowchart of the embodiment. In the example, a UE may receive one or more messages comprising parameters of a configuration of a power saving duration for a power saving operation. The one or more messages may further comprise parameters of a DRX operation. The UE may decide whether to transmit an uplink signal (e.g., SRS or PUCCH or PRACH or CSI reports or UL positioning RS) in the power saving duration. The UE may transmit the uplink signal for example when uplink data is available. In response to transmitting the uplink signal, the UE may monitor PDCCH for a DCI in a DRX active time. The UE may transmit data packets based on the DCI. In an example, the UE may decide not to transmit the uplink signal in the power saving duration. In response to not transmitting the uplink signal, the UE may skip monitoring the PDCCH for the DCI at least during the DRX active time.

Figure 33:
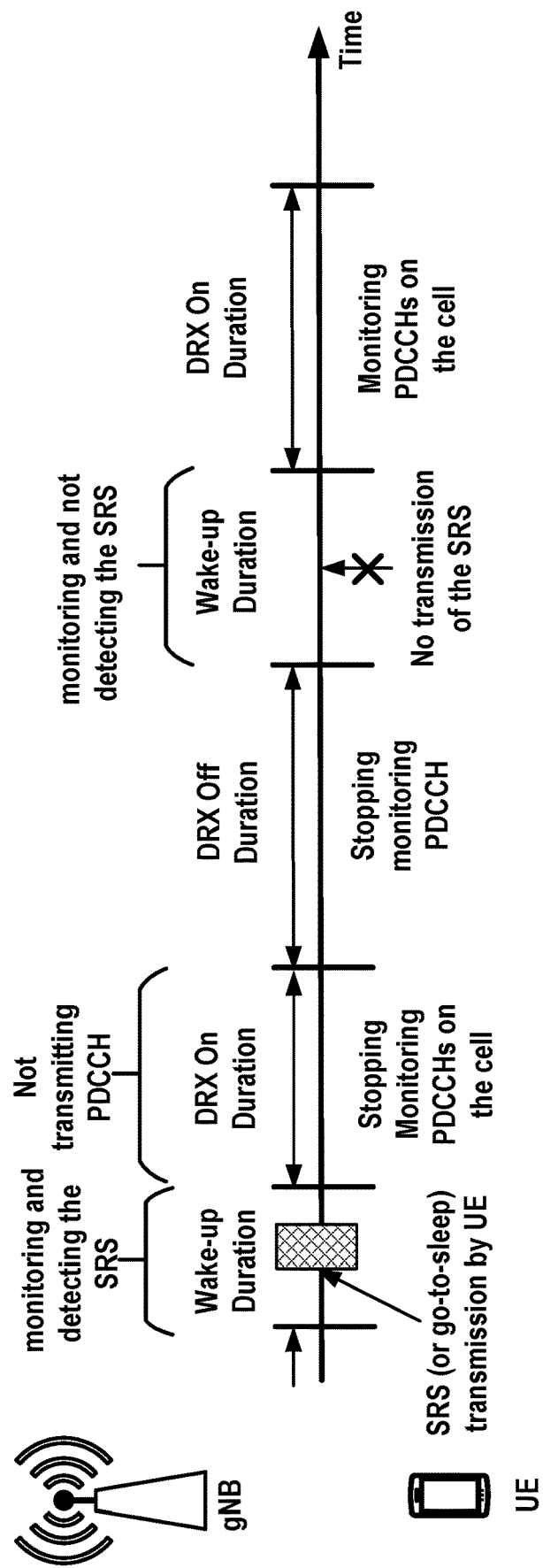
FIG. 33 is an example of an SRS-based power saving operation as per an aspect of an embodiment of the present disclosure.

FIG. 33 shows another example of uplink signal/channel-based power saving operation. In an example, a gNB may transmit one or more messages comprising parameters of a wake-up duration (or a power saving duration) to a UE. The parameters may comprise at least one of: configuration parameters of one or more uplink signals/channels; a time value of the wake-up duration; one or more frequency resources of the one or more uplink signals/channels; one or more time resources of the one or more uplink signals/channels; a periodicity of the wake-up duration; and/or power control parameters of transmission of the one or more uplink signals/channels. The one or more messages may further comprise one or more parameters of a DRX operation. The one or more uplink signals/channels may comprise at least one of: a SRS; a PRACH; a PUCCH; a DMRS; a PUSCH; or an uplink positioning RS. The parameters may comprise configuration parameters of at least one of the one or more uplink signals or channels for the power saving operation.

In an example, a UE may transmit at least one of the one or more uplink signals/channels during the wake-up duration. The UE may transmit the at least one uplink signal/channel in response to uplink data not being available. The UE may transmit the at least one uplink signal/channel in response to delaying a scheduling being allowed. The UE may transmit the at least one uplink signal/channel in response to positioning not being triggered by the gNB. The UE may stay in sleep mode except transmitting the at least one uplink signal/channel during the wake-up duration. Staying in sleep mode may comprise: not monitoring PDCCHs of one or more active BWPs/cells; and/or not transmitting PUCCH/PUSCH via the one or more active BWPs/cells. In an example, in response to transmitting the at least one uplink signal/channel, the UE may skip monitoring PDCCHs of the one or more active BWPs/cells during a DRX Active time (e.g., when drx-onDurationTimer is running). The UE may keep staying in DRX off mode during a DRX off duration. The UE may skip monitoring the PDCCHs in response to staying in the DRX off mode. Transmitting the at least one uplink signal/channel to the gNB may indicate that the UE wants to stay in sleep mode even in the DRX active time, thereby reducing power consumption. A gNB may delay transmitting a PDCCH for scheduling the UE when receiving the at least one uplink signal/channel, for example when the UE allows a delayed scheduling.

In an example, the UE may not transmit at least one of the one or more uplink signals/channels during the wake-up duration. The UE may not transmit the at least one uplink signal/channel in response to an uplink data packet being available. The UE may not transmit the at least one uplink signal/channel in response to delaying a scheduling being not allowed. In response to not transmitting the at least one uplink signal/channel, the UE may monitor PDCCHs of one or more active BWPs/cells during the DRX Active time. In an example, depending on whether the UE transmits an uplink signal/channel, the UE may decide whether to wake up to monitor PDCCH in a DRX Active time, which may reduce blind decoding complexity and power consumption.

Figure 34:
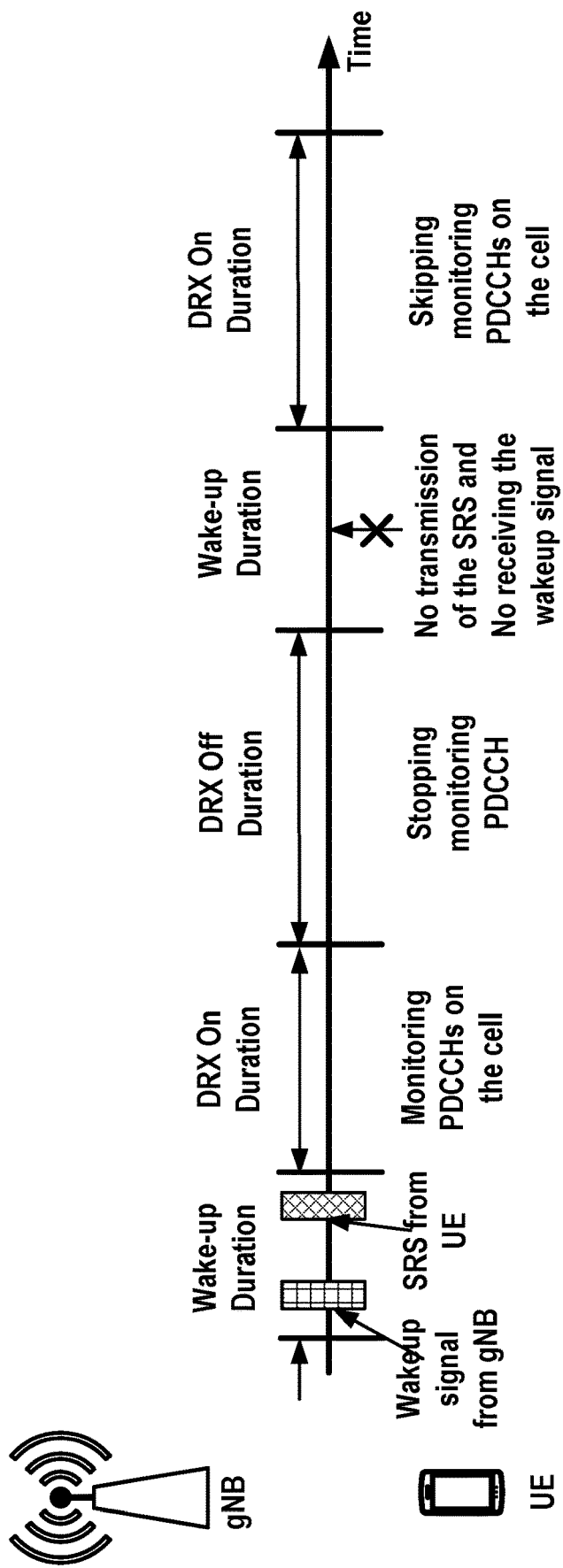
FIG. 34 is an example of a wake-up signal and SRS-based power saving operation as per an aspect of an embodiment of the present disclosure.

FIG. 34 shows another example of an uplink signal/channel-transmission and wake-up signal/channel-reception based power saving operation. A UE may transition from a power saving mode to an active mode based on whether the UE receives a wake-up signal/channel and/or transmits an uplink signal/channel. The active mode may comprise a duration when a UE may discontinuously monitor PDCCHs in a DRX On duration if DRX operation is configured. The active mode may comprise a duration when a UE may continuously monitor PDCCHs if DRX operation is not configured. The power saving mode may comprise a duration when a UE may skip monitoring the PDCCHs. The power saving mode may comprise a duration when a UE may monitor the wake-up signal/channel and/or transmit the uplink signals/channels. In an example, a gNB may transmit one or more messages comprising parameters of a wake-up duration (or a power saving duration) to a UE. The parameters may comprise at least one of: configuration parameters of one or more uplink signals/channels; configuration parameters of a wake-up signal/channel; a time duration of the wake-up duration; one or more frequency resources of the one or more uplink signals/channels; one or more time resources of the one or more uplink signals/channels; one or more frequency resources of the wake-up signal/channel; one or more time resources of the wake-up signal/channel; a periodicity of the wake-up duration; and/or power control parameters of transmission of the one or more uplink signals/channels. The one or more messages may further comprise one or more parameters of a DRX operation. The one or more uplink signals/channels may comprise at least one of: an SRS; a PRACH preamble; a DRMS; a PUCCH/PUSCH; or an uplink positioning RS. The wake-up signal/channel may comprise at least one of: a PSS/SSS; a CSI-RS; a DMRS; a PDCCH; or a signal sequence.

In an example, a UE may receive a wake-up signal/channel or transmit an uplink signal/channel during a wake-up duration. The UE may receive the wake-up signal/channel during the wake-up duration in response to downlink data being available at a gNB. The UE may transmit the uplink signal/channel during the wake-up duration in response to uplink data being available at the UE. In response to the receiving or the transmitting, the UE may monitor PDCCHs of one or more BWPs on one or more cells in a DRX Active time (e.g., when drx-onDurationTimer is running). The UE may stop monitoring the PDCCHs in a DRX off duration. In an example, the UE may not receive the wake-up signal/channel and not transmit the uplink signal/channel during the wake-up duration. The UE may not receive the wake-up signal/channel during the wake-up duration in response to downlink data being not available at the gNB. The UE may not transmit the uplink signal/channel during the wake-up duration in response to uplink data being not available at the UE. In response to not receiving the wake-up signal/channel and not transmitting the uplink signal/channel, the UE may skip monitoring the PDCCHs in the DRX Active time.

In an example, a gNB and a UE may exchange one or more RRC messages comprising parameters of capabilities of the UE. The exchanging the one or more RRC messages may comprise: receiving by the UE from the gNB one or more UE capability enquiry messages (e.g., UECapabilityEnquiry) and/or transmitting from the UE to the gNB one or more UE capability information messages (e.g., UECapabilityInformation). The parameters of capabilities of the UE may comprise parameters of power saving operation. The parameters of power saving operation may comprise whether the UE supports uplink signals/channels (e.g., SRS, preamble, DMRS, PUCCH/PUSCH, or UL positioning RS) transmission in a power saving duration of the power saving operation and/or whether the UE support detecting a wake-up signal/channel in the power saving duration of the power saving operation. The parameters of power saving operation may comprise a number of transmission ports with which the UE may transmit the uplink signals/channels in a power saving duration of the power saving operation. The parameters of power saving operation may comprise a number of BWPs and/or cells on which the UE may transmit the uplink signals/channels in a power saving duration of the power saving operation. In response to receiving the one or more UE capability information messages comprising the parameters of the power saving operation, the gNB may transmit the UE one or more RRC messages comprising configuration parameters of the power saving operation for the UE. Based on the one or more RRC messages, the UE may perform power saving operation by implementing example embodiments of one or more of FIG. 33~FIG. 34.

In an example, a UE may transmit one or more UE assistant messages (e.g., UEAssistanceInformation) to the gNB. The parameters of UE assistant messages of the UE may comprise parameters of power saving operation. The parameters of power saving operation may comprise whether the UE supports uplink signals/channels (e.g., SRS, preamble, DMRS, PUCCH/PUSCH, or UL positioning RS) transmission in a power saving duration of the power saving operation, whether the UE support detecting a wake-up signal/channel in the power saving duration of the power saving operation, and/or how many BWPs or cells the UE support the power saving operation. The parameters of power saving operation may comprise a number of transmission ports with which the UE may transmit the uplink signals/channels in a power saving duration of the power saving operation. The parameters of power saving operation may comprise a number of BWPs and/or cells on which the UE may transmit the uplink signals/channels in a power saving duration of the power saving operation. In response to receiving the one or more UE assistant messages comprising the parameters of the power saving operation, the gNB may transmit the UE one or more RRC messages comprising configuration parameters of the power saving operation for the UE. Based on the one or more RRC messages, the UE may perform power saving operation by implementing example embodiments of one or more of FIG. 33~FIG. 34.

In an example, a wireless device may receive one or more messages comprising configuration parameters of a cell. The configuration parameters may comprise: first parameters of a first SRS configuration; second parameters of a second SRS configuration; and third parameters of one or more BWPs. The wireless device may receive one or more first commands indicating transition of the cell into an active state. In response to the one or more first commands, the wireless device may transmit a first SRS via a first BWP of the one or more BWPs of the cell, based on the first parameters of the first SRS configuration. The wireless device may receive one or more second commands indicating transitioning the cell into a dormant state. In response to the one or more second commands, the wireless device may transmit at least one second SRSs via a second BWP of the one or more BWPs of the cell, based on the second parameters of the second SRS configurations.

In an example, parameters of a SRS configuration may comprise at least one of: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, the one or more first commands may comprise one or more MAC CEs; one or more DCIs; one or more RRC messages. In an example, the one or more second commands may comprise one or more MAC CEs; one or more DCIs; one or more RRC messages. In an example, the first BWP may comprise at least one of: a first active BWP; and an initial active BWP. In an example, the second BWP may comprise at least one of: a default BWP; a first active BWP; an initial active BWP.

In an example, a wireless device may receive one or more messages comprising configuration parameters of a wake-up duration for a cell. The configuration parameters may comprise parameters of uplink radio resources. The one or more messages may further comprise parameters of a DRX operation in the cell. The wireless device may stay in a first mode at a first slot. The wireless device may not monitor PDCCHs of the cell (e.g., from the first slot), in response to being in the first mode. The wireless device may transmit, (e.g., in a second slot within the wake-up duration), the wake-up signal via one of the uplink radio resources of the cell. The wireless device may determine the wireless device is in a DRX On duration (e.g., from a third slot). In response to the transmitting and the determining, the wireless device may transition from the first mode to a second mode (e.g., at the third slot). The third slot may be same as the second slot. In response to the transitioning to the second mode, the wireless device may monitor the PDCCHs of the cell (e.g., from the third slot). The wireless device may transmit data packets in response to detecting a DCI via the PDCCHs. In an example, the wake-up signal may comprise at least one of: an SRS; a PRACH preamble; a PUCCH/SR; or a DMRS. In an example, the first mode may comprise a duration when the wireless device: may not monitor the PDCCHs; may not transmit uplink data/channel/signals; may not receive downlink data/channel/signals. In an example, the second mode may comprise a duration when the wireless device: may monitor the PDCCHs; may transmit uplink data/channel/signals; may receive downlink data/channel/signals.

In an example, a wireless device may receive one or more messages comprising configuration parameters of a wake-up duration for a cell. The configuration parameters may comprise parameters of uplink radio resources. The one or more messages may further comprise parameters of a DRX operation in the cell. The wireless device may stay in a first mode (e.g., at a first slot). The wireless device may not monitor PDCCHs of the cell (e.g., from the first slot), in response to being in the first mode. The wireless device may not transmit, (e.g., within the wake-up duration), the wake-up signal via one of the uplink radio resources of the cell. The wireless device may determine the wireless device is in a DRX On duration (e.g., from a second slot). In response to not transmitting of the wake-up signal and the determining, the wireless device may keep staying in the first mode (e.g., at the second slot). In response to keeping staying in the first mode, the wireless device may not monitor (or skip monitoring) the PDCCHs of the cell (e.g., from the second slot) in the DRX On duration.

In an example, a wireless device may receive one or more messages comprising configuration parameters of a wake-up duration for a cell. The configuration parameters may comprise parameters of uplink radio resources. The one or more messages may further comprise parameters of a DRX operation in the cell. The wireless device may stay in a first mode at a first slot. The wireless device may transmit, (e.g., in a second slot within the wake-up duration), the wake-up signal via one of the uplink radio resources of the cell. The wireless device may determine the wireless device is in a DRX On duration (e.g., from a third slot). In response to the transmitting and the determining, the wireless device may transition from the first mode to a second mode (e.g., at the third slot). In response to the transitioning to the second mode, the wireless device may monitor the PDCCHs of the cell (e.g., from the third slot). The wireless device may transmit data packets in response to detecting a DCI via the PDCCHs. In an example, the wake-up signal may comprise at least one of: an SRS; a PRACH preamble; a PUCCH/SR; or a DMRS. In an example, the first mode may comprise a duration when the wireless device: may not monitor the PDCCHs; may not transmit uplink data/channels/signals; may not receive downlink data/channels/signals. In an example, the second mode may comprise a duration when the wireless device: may monitor the PDCCHs; may transmit uplink data/channels/signals; may receive downlink data/channels/signals.

In an example, a wireless device may trigger a SR for requesting UL-SCH resource when the wireless device has new transmission. A gNB may transmit to a wireless device at least one message comprising parameters indicating zero, one or more SR configurations. A SR configuration may comprise a set of PUCCH resources for SR on one or more BWPs, and/or one or more cells. On a BWP, at most one PUCCH resource for SR may be configured. Each SR configuration may correspond to one or more logical channels. Each logical channel may be mapped to zero or one SR configuration configured by the at least one message. A SR configuration of a logical channel (LCH) that triggers a buffer status report (BSR) may be considered as a corresponding SR configuration for a triggered SR.

In an example, for each SR configuration, the at least one message may further comprise one or more parameters indicating at least one of: a SR prohibit timer; a maximum number of SR transmission; a parameter indicating a periodicity and offset of SR transmission; and/or a PUCCH resource. In an example, the SR prohibit timer may be a duration during which the wireless device may be not allowed to transmit the SR. In an example, the maximum number of SR transmission may be a transmission number for which the wireless device may be allowed to transmit the SR at most.

In an example, a PUCCH resource may be identified by at least: frequency location (e.g., starting PRB); a PUCCH format associated with initial cyclic shift of a base sequence and time domain location (e.g., starting symbol index). In an example, a PUCCH format may be PUCCH format 0, or PUCCH format 1, or PUCCH format 2, or PUCCH format 3, or PUCCH format 4. A PUCCH format 0 may has a length of 1 or 2 OFDM symbols and is less than or equal to 2 bits. A PUCCH format 1 may occupy a number between 4 and 14 of OFDM symbols and is less than or equal to 2 bits. A PUCCH format 2 may occupy 1 or 2 OFDM symbols and is greater than 2 bits. A PUCCH format 3 may occupy a number between 4 and 14 of OFDM symbols and is greater than 2 bits. A PUCCH format 4 may occupy a number between 4 and 14 of OFDM symbols and is greater than 2 bits.

In an example, a PUCCH format for SR transmission may be a PUCCH format 0, or PUCCH format 1. A wireless device may transmit a PUCCH in a PUCCH resource for a corresponding SR configuration only when the wireless device transmits a positive SR. For a positive SR transmission using PUCCH format 0, a wireless device may transmit a PUCCH by setting the cyclic shift to a first value (e.g., 0). For a positive SR transmission using PUCCH format 1, a wireless device may transmit a PUCCH by setting a first bit, before BPSK modulated on a sequence, to a first value (e.g., 0).

In an example, a SR may be multiplexed with HARQ-ACK or CSI on a PUCCH format. When a positive SR multiplexed with HARQ-ACK, a wireless device may decide a cyclic shift of the base sequence based on the initial cyclic shift and a first cyclic shift based on one or more values of one or more HARQ-ACK bits. When a negative SR multiplexed with HARQ-ACK, a wireless device may decide a cyclic shift of the base sequence based on the initial cyclic shift and a second cyclic shift based on one or more value of the one or more HARQ-ACK bits. The first cyclic shift is different from the second cyclic shift.

In an example, a wireless device may maintain a SR transmission counter (e.g., SR_COUNTER) associated with a SR configuration.

In an example, if an SR of a SR configuration is triggered, and there are no other SRs pending corresponding to the same SR configuration, a wireless device may set the SR_COUNTER of the SR configuration to a first value (e.g., 0).

In an example, when an SR is triggered, a wireless device may consider the SR pending until it is cancelled. In an example, when one or more UL grants accommodate all pending data available for transmission, all pending SR(s) may be cancelled.

In an example, a wireless device may determine one or more PUCCH resources on an active BWP as valid PUCCH resources at a time of SR transmission occasion.

In an example, a wireless device may transmit a PUCCH in a PUCCH resource associated with a SR configuration when the wireless device transmits a positive SR. In an example, a wireless device may transmit the PUCCH using PUCCH format 0, or PUCCH format 1, according to the PUCCH configuration.

Figure 35:
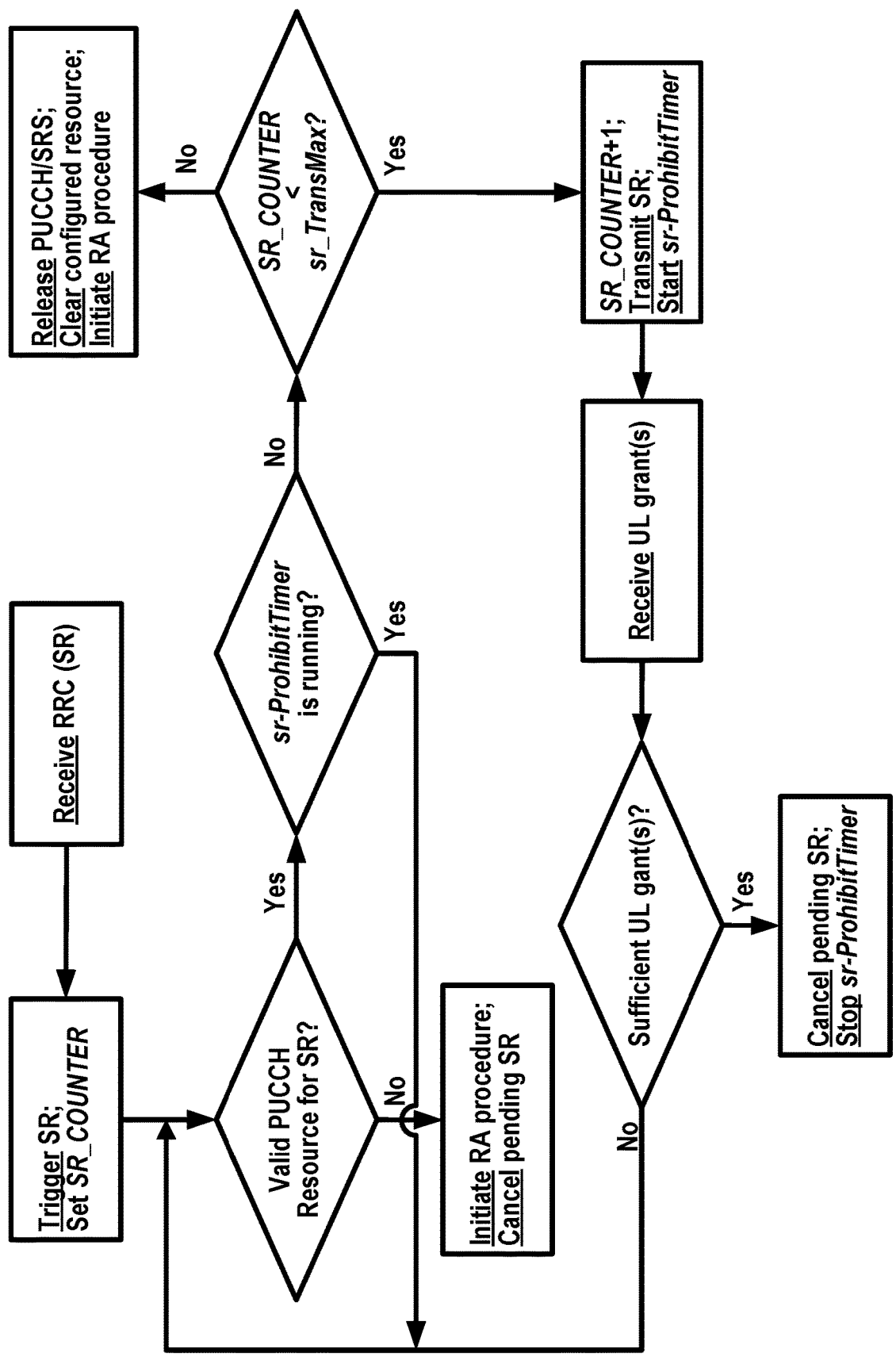
FIG. 35 is an example of scheduling request transmission flowchart as per an aspect of an embodiment of the present disclosure.

FIG. 35 shows example of a SR operation. In the example, a wireless device may receive one or more RRC message comprising parameters of one or more SR configurations. In an example, for each of the one or more SR configurations, the parameters may indicate at least one of: a SR prohibit timer; a maximum number of SR transmission; a parameter indicating a periodicity and offset of SR transmission; and/or a PUCCH resource identified by a PUCCH resource index. In an example, when a SR of a SR configuration triggered (therefore in pending now) in response to a BSR being triggered on an LCH corresponding to the SR configuration, a wireless device may set a SR_COUNTER to a first value (e.g., 0), if there is no other pending SRs corresponding to the SR configuration.

In an example, a wireless device may determine whether there is at least one valid PUCCH resource for the pending SR at the time of SR transmission occasion. If there is no valid PUCCH resource for the pending SR, the wireless device may initiate a random access procedure on a PCell. The wireless device may cancel the pending SR in response to no valid PUCCH resource for the pending SR.

In an example, if there is at least one valid PUCCH resource for the pending SR, a wireless device may determine an SR transmission occasion on the at least one valid PUCCH resource based on the periodicity and the offset of SR transmission. In an example, if the SR prohibit timer is running, the wireless device may wait for another SR transmission occasion. In an example, if the SR prohibit timer is not running and the SR_COUNTER is less than the maximum number of SR transmission, the wireless device may increment the SR_COUNTER (e.g., by one), instruct the physical layer of the wireless device to signal the SR on the at least one valid PUCCH resource for the SR. The physical layer of the wireless device may transmit a PUCCH on the at least one valid PUCCH resource for the SR. The wireless device may monitor a PDCCH for detecting a DCI for uplink grant in response to transmitting the PUCCH.

In an example, if a wireless device receives one or more uplink grants which may accommodate all pending data available for transmission, the wireless device may cancel the pending SR, and/or stop the SR prohibit timer.

In an example, if the wireless device does not receive one or more uplink grants which may accommodate all pending data available for transmission, the wireless device may repeat one or more actions comprising: determining the at least one valid PUCCH resource; checking whether the SR prohibit timer is running; whether the SR_COUNTER is equal or greater than the maximum number of SR transmission; incrementing the SR_COUNTER, transmitting the SR and starting the SR prohibit timer; monitoring a PDCCH for uplink grant.

In an example, if the SR_COUNTER indicates a number equal to or greater than the maximum number of SR transmission, a wireless device may release PUCCH for one or more serving cells, and/or release SRS for the one or more serving cells, and/or clear one or more configured downlink assignments and uplink grants, and/or initiate a random access procedure on a PCell, and/or cancel the pending SR.

In an example, a gNB may indicate a UE transmit one or more SRS for channel quality estimation (e.g., CSI acquisition, or uplink beam management) to enable frequency-selective scheduling on the uplink. Transmission of SRS may be used for other purposes, such as to enhance power control or to support various startup functions for UEs not recently scheduled. Some examples include initial MCS (Modulation and Coding Scheme) selection, initial power control for data transmissions, timing advance, and frequency semi-selective scheduling.

Figure 36A:
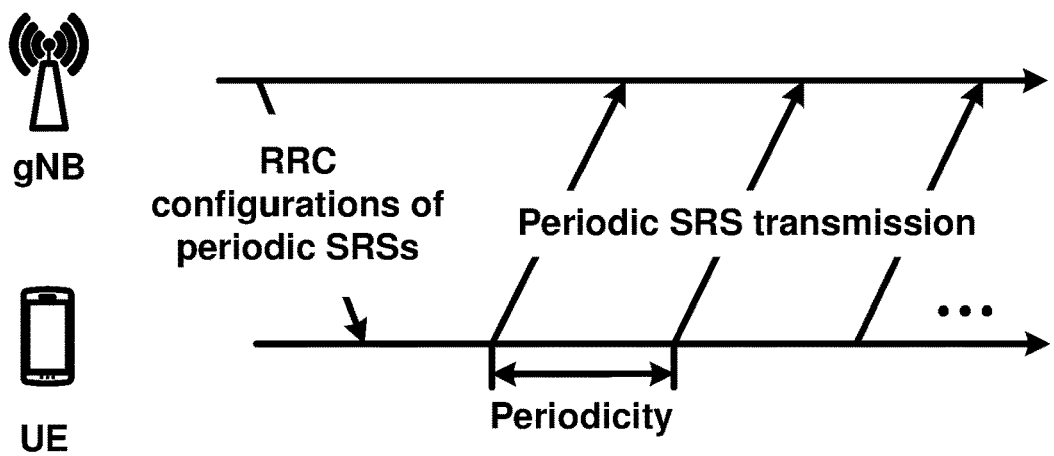
FIG. 36A is an example of a periodic SRS transmission as per an aspect of an embodiment of the present disclosure.
Figure 36B:
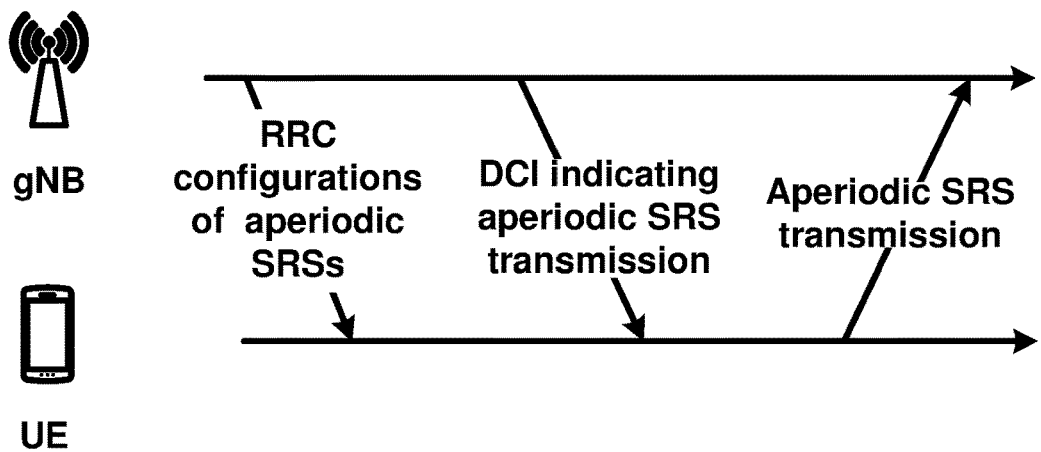
FIG. 36B is an example of aperiodic SRS transmission as per an aspect of an embodiment of the present disclosure.
Figure 36C:
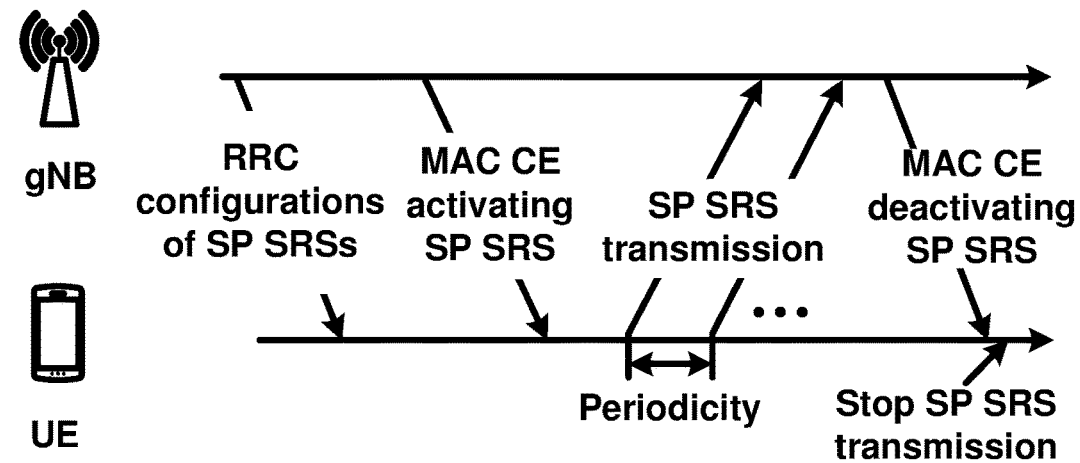
FIG. 36C is an example of a semi-persistent SRS transmission as per an aspect of an embodiment of the present disclosure.

In an example, a gNB may indicate a UE to transmit at least one of three types of SRS: periodic SRS transmission (type 0); aperiodic SRS transmission (type 1); semi-persistent SRS transmission. for the periodic SRS transmission, subframes in which SRSs may be transmitted may be indicated by cell-specific broadcast signaling, and/or UE-specific signaling. FIG. 36A shows an example of periodic SRS transmission. Periodicity of the periodic SRS transmission may be a value from as often as once every 2 ms to as infrequently as once every 160 ms. A UE may transmit SRSs in SC-FDMA or OFDM symbols (e.g., last 1-3 symbols in a subframe) in the configured subframes. FIG. 36B shows an example of aperiodic SRS transmission. A UE may transmit SRS aperiodically in response to receiving a DCI indicating the aperiodic SRS transmission. FIG. 36C shows an example of SP SRS transmission. A UE may receive configuration parameters of SP SRS transmission. The configuration parameters may comprise at least one of: a periodicity of the SP SRS transmission; a time/frequency radio resource; cyclic shift parameters; and/or other radio parameters (e.g., bandwidth, frequency hopping, transmission comb and offset, frequency-domain position). The UE may transmit the SP SRS in response to receiving a first MAC CE activating the SP SRS. The UE may repeat the SP SRS transmission with the periodicity until receiving a second MAC CE deactivating the SP SRS. The UE may deactivate the SP SRS and stop the SP SRS transmission in response to receiving the second MAC CE deactivating the SP SRS.

In an example, a gNB may transmit one or more RRC message comprising one or more CSI configuration parameters comprising at least one of: one or more CSI-RS resource settings; one or more CSI reporting settings; and/or one CSI measurement setting.

In an example, a CSI-RS resource setting may comprise one or more CSI-RS resource sets. In an example, there may be one CSI-RS resource set for periodic CSI-RS, or SP CSI-RS.

In an example, a CSI-RS resource set may comprise at least one of: one CSI-RS type (e.g., periodic, aperiodic, semi-persistent); one or more CSI-RS resources comprising at least one of: CSI-RS resource configuration identity; number of CSI-RS ports; CSI RS configuration (symbol and RE locations in a subframe); CSI RS subframe configuration (subframe location, offset and periodicity in radio frame); CSI-RS power parameter; CSI-RS sequence parameter; CDM type parameter; frequency density; transmission comb; and/or QCL parameters.

In an example, one or more CSI-RS resources may be transmitted periodically, or using aperiodic transmission, or using a semi-persistent transmission.

In a periodic transmission, the configured CSI-RS resource may be transmitted using a configured periodicity in time domain.

In an aperiodic transmission, the configured CSI-RS resource may be transmitted in a dedicated time slot or subframe.

In a semi-persistent transmission, one or more configured CSI-RS resources may be transmitted when triggered by a CSI activation MAC CE or DCI. The transmission of the one or more configured CSI-RS resources may be stopped when triggered by a CSI deactivation MAC CE or DCI. The transmission of the one or more configured CSI-RS resources may be stopped when the transmission duration (if configured) expires. In an example, a UE may transmit a SP-CSI report on PUSCH in response to receiving a first DCI indicating an activation of the SP-CSI report on PUSCH. The UE may stop the SP-CSI report transmission on PUSCH in response to receiving a second DCI indicating a deactivation/release of the SP-CSI report on PUSCH. In an example, the UE may transmit a SP-CSI on PUCCH in response to receiving a first MAC CE indicating an activation of the SP-CSI report on PUCCH. The UE may deactivate and stop the SP-CSI report on PUCCH in response to receiving a second MAC CE indicating a deactivation of the SP-CSI report on PUCCH.

In an example, a CSI reporting setting may comprise at least one of: one report configuration identifier; one report type; one or more reported CSI parameter(s); one or more CSI Type (I or II); one or more codebook configuration parameters; a report quantity indicator indicating CSI-related or L1-RSRP-related quantities to report; one or more parameters indicating time-domain behavior; frequency granularity for CQI and PMI; and/or measurement restriction configurations. The report type may indicate a time domain behavior of the report (aperiodic, semi-persistent, or periodic). The one of the one or more CSI reporting settings may further comprise at least one of: one periodicity parameter; one duration parameter; and/or one offset (e.g., in unit of slots), if the report type is a periodic or semi-persistent report. The periodicity parameter may indicate the periodicity of a CSI report. The duration parameter may indicate the duration of CSI report transmission. The offset parameter may indicate value of timing offset of CSI report from a reference time.

In an example, a CSI measurement setting may comprise one or more links comprising one or more link parameters. The one or more link parameters may comprise at least one of: one CSI reporting setting indication; CSI-RS resource setting indication; and/or one or more measurement parameters.

In an example, a gNB may trigger a CSI reporting by transmitting a RRC message, or a MAC CE, or a DCI. In an example, a UE may transmit one or more SP CSI report on a PUCCH, with a transmission periodicity, triggered by receiving a MAC CE activating a SP CSI reporting. In an example, a UE may transmit one or more SP CSI report on a PUSCH, triggered by receiving a DCI activating a SP CSI reporting.

Figure 37:
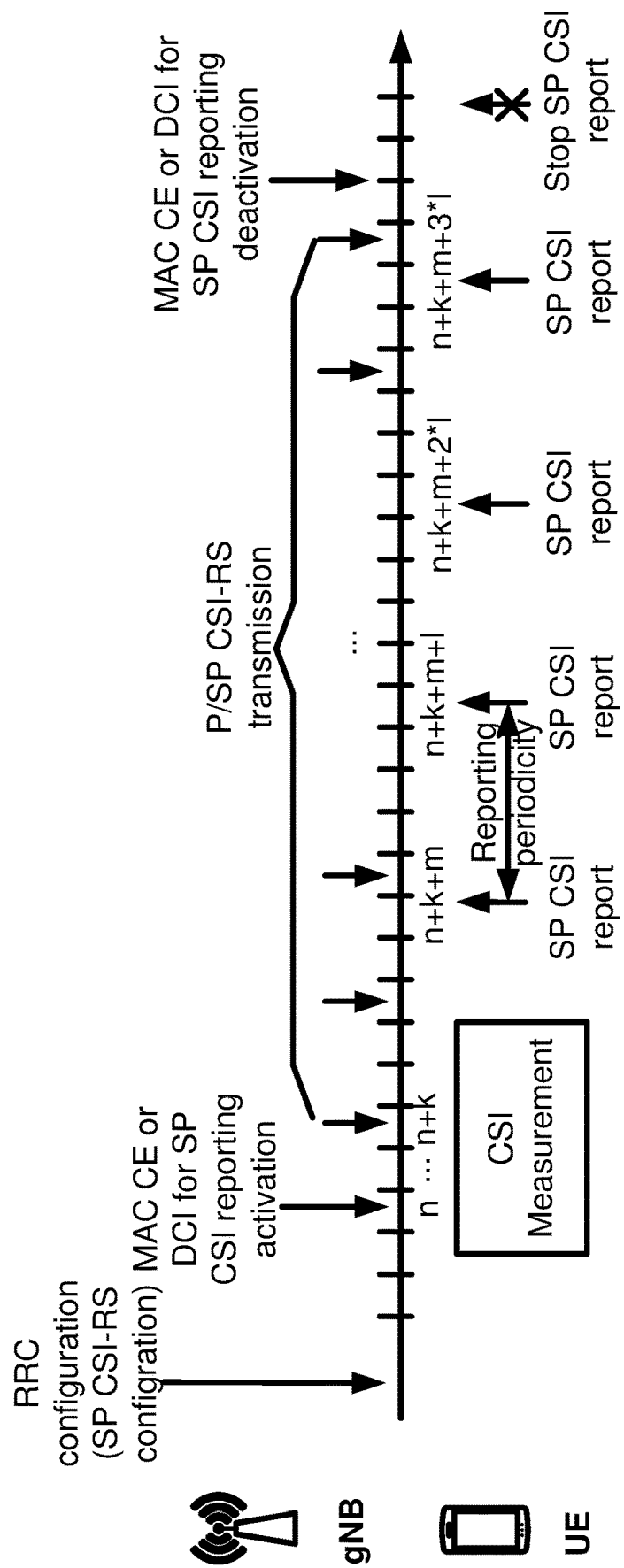
FIG. 37 is an example of semi-persistent CSI report transmission as per an aspect of an embodiment of the present disclosure.

FIG. 37 shows an example of the embodiment. In response to transmitting a MAC CE or DCI for triggering a SP CSI reporting at subframe n, a gNB may start transmitting one or more P/SP CSI-RS at subframe n+k. The value "k" may be zero, or an integer greater than zero, configured by a RRC message. The value "k" may be predefined as a fixed value.

For example, in response to receiving the MAC CE or the DCI triggering the SP CSI reporting, a UE may transmit SP CSI report at subframe n+k+m, n+k+m+l, n+k+m+2*l, n+k+m+3*l, etc., with a periodicity of l subframes. The value "m" may be zero, or an integer greater than zero, configured by an RRC message. The value "m" may be predefined as a fixed value. The UE may stop transmitting SP CSI reporting in response to receiving a MAC CE or DCI deactivating the SP CSI reporting.

In an LTE or NR system, a wireless device may apply a timing advance command indicated in a timing advance command MAC CE. The wireless device may (re-)start a time alignment timer (e.g., timeAlignmentTimer) in response to receiving the timing advance command MAC CE. In response to the time alignment timer expiring, the wireless device may: flush HARQ buffers for one or more serving cells; notify RRC to release PUCCH for the one or more serving cells; notify RRC to release SRS for the one or more serving cells; clear configured downlink assignments and configured uplink grants; consider all running time alignment timers expired; and/or maintain a current timing value (e.g., $N_{TA}$). A MAC entity of the wireless device may not perform uplink transmission on a serving cell except a random access preamble transmission in response to a time alignment timer associated with a TAG to which the serving cell belongs to is not running.

In an LTE or NR system, a wireless device may trigger a scheduling request in response to a buffer status report being triggered. As shown in FIG. 35, the wireless device may perform the scheduling request procedure. The wireless device may repeat a scheduling request transmission on PUCCH until receiving one or more UL grants accommodating pending data available for transmission or reaching a maximum number (e.g., sr-TransMax, configured by RRC message) of the scheduling request transmission. In response to reaching the maximum number of the scheduling request transmission, the wireless device may: notify RRC to release PUCCH for all serving cells; notify RRC to release SRS for all serving cells; clear configured downlink assignments and configured uplink grants; initiate a random access procedure on a PCell/PSCell; and/or cancel all pending SRs.

In an LTE or NR system, in response to receiving a PUCCH release request from lower layers (e.g., MAC layer or PHY layer), an RRC layer of a wireless device may release PUCCH resources (e.g., PUCCH-CSI-Resources) configured in one or more CSI report configuration parameters (e.g., CSI-ReportConfig) and scheduling request resource configurations in PUCCH resources (e.g., PUCCH-Config). In response to receiving an SRS release request from lower layers (e.g., MAC layer or PHY layer), the RRC layer of the wireless device may release SRS resources (e.g., SRS-ResourceSet) configured in SRS configurations (e.g., SRS-Config).

In an LTE or NR system, a wireless device may activate a configured SP SRS resource sets of a serving cell in response to receiving an SP SRS activation/deactivation MAC CE indicating the activation of the configured SP SRS resource sets. The wireless device may transmit SP SRSs based on the activated configured SP SRS resources sets. In an example, the transmissions of the SP SRSs may be performed in a duration when the wireless device is in a scheduling request procedure. In existing technologies, in response to the scheduling request procedure failure (e.g., reaching a maximum number of scheduling request transmission as shown in FIG. 35), an RRC layer of the wireless device may release the configured SP SRS resources. A physical layer of the wireless device may stop the SP SRS transmissions in response to the scheduling request procedure failure.

Existing technologies may misalign between a base station and a wireless device regarding how to deal with the activated SP SRSs in a MAC entity of the wireless device. In an example, the MAC entity of the wireless device may automatically deactivate the activated SP SRSs in response to the scheduling request procedure failure. The base station may assume that the activated SP SRSs at the wireless device remain active since a deactivation of the activated SP SRSs is supposed to be triggered by a deactivation command transmitted from the base station. Consequently, the base station may monitor uplink resources for receiving the activated SP SRSs, however the wireless device has already deactivated the activated SP SRSs. This misaligned behavior may cause extra power consumption of a base station for monitoring the SP SRSs.

In an example, the MAC entity of the wireless device may keep the activated SP SRSs active in response to the scheduling request procedure failure, since the activated SP SRSs is supposed to be deactivated upon receiving a deactivation command. Since the RRC layer has already released SP SRS resource sets, the MAC entity of the wireless device may be confused on how to deal with the activated SP SRS transmission when the SP SRS resource sets has been released. In an example, when receiving a RRC message for reconfiguring the SP SRS resource sets in a later stage, the MAC entity of the wireless device may automatically instruct the physical layer of the wireless device to transmit the activated SP SRS based on the new configured SP SRS resource sets, which may not be a correct/expected action from the base station point of view (e.g., after transmitting the reconfiguration RRC messages).

When a scheduling request procedure fails, misalignment between the base station and the wireless device regarding the activated SP SRSs may cause extra power consumption of the wireless device, unnecessary SRS detection at the base station, and/or unexpected SP SRS transmission behavior of the wireless device after receiving messages for SP SRS resource set reconfiguration. Example embodiments provide methods to solve the misalignment between the base station and the wireless device regarding the activated SP SRS transmission when a scheduling request procedure fails. Similarly, when a time alignment timer expires, an RRC entity of a wireless device may release configured SP SRS resources sets and a physical layer of the wireless device may stop transmissions of an activated SP SRS. However, existing LTE/NR technologies may not provide methods on how to deal with the activated SP SRS in a MAC entity of the wireless device when a time alignment timer expires. Example embodiments provide methods to solve the misalignment between the base station and the wireless device regarding the activated SP SRS transmission when a time alignment timer expires.

In an LTE or NR system, a wireless device may activate a configured SP CSI report of a serving cell in response to receiving an SP CSI reporting on PUCCH activation/deactivation MAC CE indicating the activation of the configured SP CSI report. The wireless device may transmit SP CSI report on PUCCH resources based on configuration parameters of the activated SP CSI report. In an example, the transmissions of the SP CSI report on the PUCCH resources may be performed in a duration when the wireless device is in a scheduling request procedure. According to the LTE or NR specification, in response to the scheduling request procedure failure (e.g., reaching a maximum number of scheduling request transmission as shown in FIG. 35), an RRC layer of the wireless device may release the configured PUCCH resources for the SP CSI report. A physical layer of the wireless device may stop the transmissions of SP CSI report on PUCCH in response to the scheduling request procedure failure.

Existing technologies may not provide methods on how to deal with the activated SP CSI report on PUCCH in a MAC entity of the wireless device. No specified actions regarding the activated SP CSI report in the MAC entity may cause misalignment between a base station and the wireless device.

In an example, the MAC entity of the wireless device may deactivate the activated SP CSI report in response to the scheduling request procedure failure. Before receiving the scheduling request, the base station may assume that the activated SP CSI report at the wireless device remains active since a deactivation of the activated SP CSI report is supposed to be triggered by a deactivation command transmitted by the base station. Consequently, the base station may monitor PUCCH resources for receiving the activated SP CSI report, however the wireless device has already deactivated the activated SP CSI reports.

In an example, the MAC entity of the wireless device may keep the activated SP CSI report active in response to the scheduling request procedure failure, since the activated SP CSI report is supposed to be deactivated upon receiving a deactivation command. Since the RRC layer has already released PUCCH resources for the SP CSI report, the MAC entity of the wireless device may be confused on how to deal with the activated SP CSI report transmission when the associated PUCCH resources have been released. In an example, when receiving a RRC message for reconfiguring SP CSI report configuration parameters and associated PUCCH resources for the activated SP CSI report in a later stage, the MAC entity of the wireless device may automatically instruct the physical layer of the wireless device to transmit the activated SP CSI report based on the new SP CSI report configuration parameters and associated PUCCH resources, which may not be a correct/expected action from the base station point of view (e.g., after transmitting the reconfiguration RRC messages).

When a scheduling request procedure fails, misalignment between the base station and the wireless device regarding the activated SP CSI report may cause extra power consumption of the wireless device, unnecessary PUCCH detection at the base station, and/or unexpected SP CSI report transmission from the wireless device after receiving messages for a SP CSI report reconfiguration. Example embodiments provide methods to solve the misalignment between the base station and the wireless device regarding the activated SP CSI report when a scheduling request procedure fails. Similarly, when a time alignment timer expires, an RRC layer of a wireless device may release configured PUCCH resources for a SP CSI report and a physical layer of the wireless device may stop transmissions of an activated SP CSI report on PUCCH. However, existing LTE/NR technologies may not provide methods on how to deal with the activated SP CSI report in a MAC entity of the wireless device. Example embodiments provide methods to solve the misalignment between the base station and the wireless device regarding the activated SP CSI report transmission when a time alignment timer expires.

Similarly, existing LTE/NR technologies may not provide methods on how to deal with activated SP SRS or activated SP CSI report on PUCCH in a MAC entity of a wireless device for a secondary cell, in response to the secondary cell being deactivated. In an example, a wireless device may transmit SP SRSs (or SP CSI report on PUCCH) on an activated secondary cell. The MAC entity of the wireless device may deactivate the activated secondary cell in response to receiving a secondary cell deactivation MAC CE or a secondary cell deactivation timer (e.g., sCellDeactivationTimer) being expiring. The SP SRS (or the SP CSI report) may be in active state before receiving the secondary cell deactivation MAC CE or the secondary cell deactivation timer expires. In response to deactivating the activated secondary cell, the MAC entity of the wireless device may decide by itself whether deactivate or not deactivate the SP SRSs (or the SP CSI report on PUCCH). Deactivation or not deactivation of the SP SRSs (or the SP CSI report on PUCCH) determined by the wireless device may cause misalignment between the wireless device and the base station regarding the state of the SP SRSs (or the SP CSI report on PUCCH). Example embodiments may provide method to avoid misalignment between the base station and the wireless device regarding a state of an activated SP SRSs (or an activated SP CSI reporting on PUCCH) on a secondary cell, in response to the secondary cell being deactivated.

Figure 38:
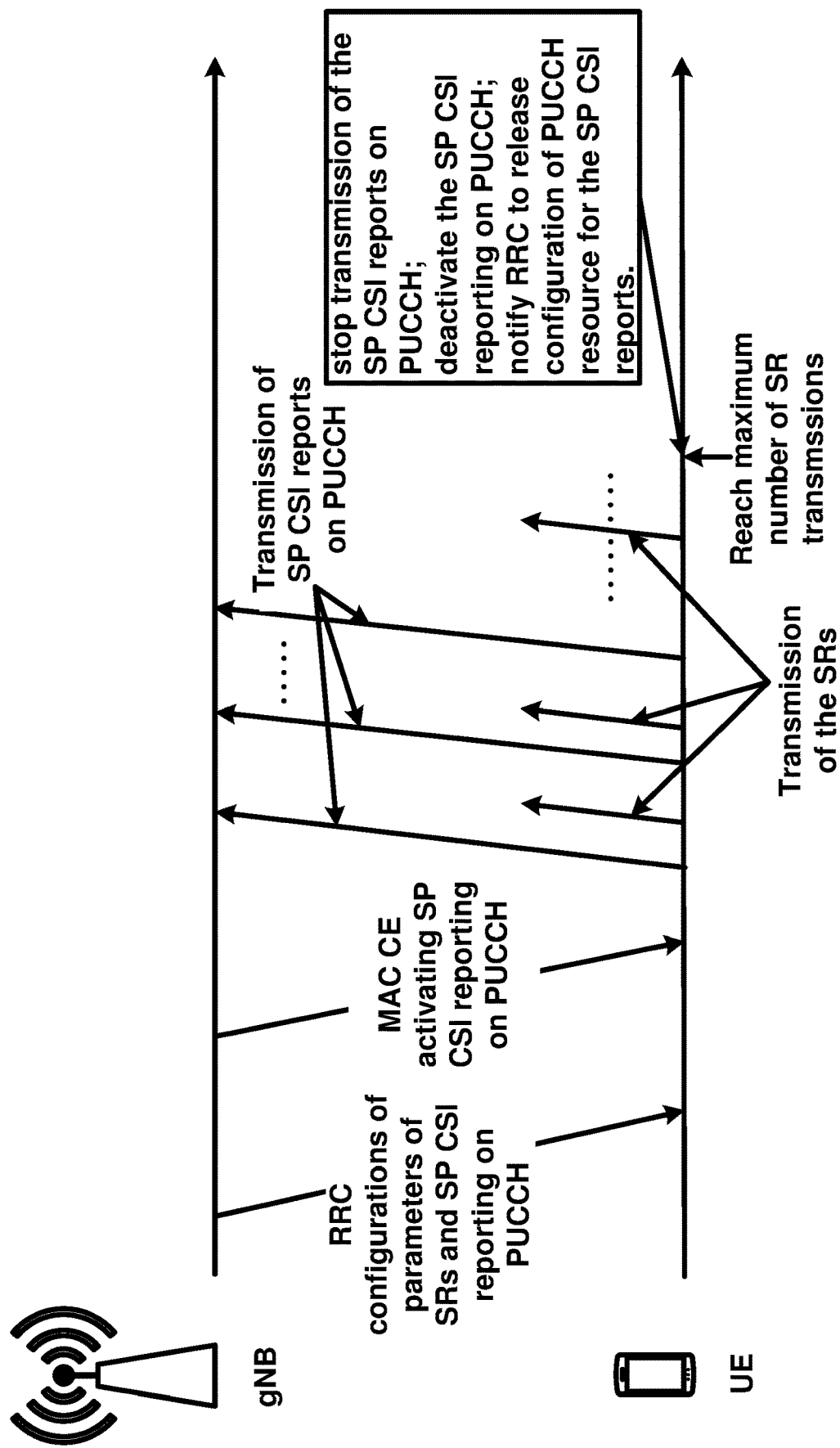
FIG. 38 is an example of SP CSI report transmission when SR is triggered as per an aspect of an embodiment of the present disclosure.

FIG. 38 shows an example embodiment of activation and deactivation of a SP CSI reporting on PUCCH while performing a scheduling request procedure. In an example, a base station (e.g., gNB in FIG. 38) may transmit one or more RRC messages comprising first configuration parameters of scheduling requests and second configuration parameters of SP CSI reporting on PUCCH. The first configuration parameters may comprise parameters of one or more scheduling request configurations. For each of the one or more scheduling request configurations, the first configuration parameters may indicate at least one of: a scheduling request prohibit timer; a first transmission number indicating a maximum number of scheduling request transmission; a parameter indicating a periodicity and offset of scheduling request transmission; and/or a PUCCH resource identified by a PUCCH resource index. The second configuration parameters comprise at least one of: one reference signal (RS) resource setting; and/or one or more SP CSI reporting settings. The RS resource setting may comprise a set of RS resources, each RS resource being associated with radio resource configuration (e.g., number of ports; time and frequency resource allocation; frequency density; etc.) of a RS, each RS being associated with a RS resource configuration identifier. In an example, the RS may comprise a CSI-RS and/or a SS block. In an example, one SP CSI report setting may comprise a set of SP CSI report parameters comprising at least one of: a SP CSI report configuration identifier; and/or one or more parameters for SP CSI reporting, where the one or more parameters may comprise at least one of: a CSI type (e.g., Type I or Type II); a report quantity indicator (e.g., indicating a CSI-related quantity to report, or a L1-RSRP related quantity to report, etc.); a report configuration type (e.g., indicating the time domain behavior of the report—either aperiodic, semi-persistent, or periodic); a value indicating frequency granularity for CSI report; parameters indicating periodicity; slot offset of CSI report; and/or a PUCCH resource.

In an example, when a scheduling request of a scheduling request configuration triggered (therefore in pending now) in response to a buffer status report being triggered on an LCH corresponding to the scheduling request configuration, a wireless device may set a sr counter (e.g., SR_COUNTER) to a first value (e.g., 0), if there is no other pending scheduling requests corresponding to the scheduling request configuration. As shown in FIG. 35, the wireless device may repeat one or more actions comprising at least one of: determining at least one valid PUCCH resource; checking whether a scheduling request prohibit timer is running; checking whether the sr counter is equal to or greater than the maximum number of scheduling request transmission; incrementing the sr counter (e.g., by one) in response to the sr counter being less than the maximum number of scheduling request transmission; transmitting the scheduling request and starting the scheduling request prohibit timer; monitoring a PDCCH for uplink grant. In an example, the wireless device may receive a SP CSI reporting on PUCCH activation/deactivation MAC CE indicating an activation of a SP CSI report configuration of the one or more SP CSI reporting settings. In response to receiving the SP CSI reporting on PUCCH activation/deactivation MAC CE, the wireless device may transmit one or more SP CSI report on PUCCH, based on parameters of the SP CSI report configuration. In an example, the wireless device may receive the SP CSI reporting on PUCCH activation/deactivation MAC CE before or after the wireless device triggers the scheduling request procedure.

As shown in FIG. 38, the wireless device may perform the one or more SP CSI report transmissions in at least a time duration when the scheduling request procedure is ongoing. The transmissions of the one or more SP CSI report may overlap (e.g., fully or partially) in time with a plurality of transmissions of the scheduling request. The transmissions of the one or more SP CSI report may interleave in time with a plurality of transmissions of the scheduling request. The wireless device may repeat a scheduling request transmission on PUCCH until receiving one or more UL grants accommodating pending data available for transmission or the sr counter reaching the maximum number of scheduling request transmission. In an example, the sr counter may reach to the maximum number of scheduling request transmission in response to not receiving the uplink grant or the received uplink grant not accommodating pending data available for transmission. In response to the sr counter reaching the maximum number of scheduling request transmission, a MAC entity of the wireless device may notify an RRC layer (or entity) of the wireless device to release PUCCH/SRS resources for one or more serving cells. In response to the sr counter reaching the maximum number of scheduling request transmission, the MAC entity may clear one or more configured downlink assignments and uplink grants, initiate a random access procedure on a PCell/PSCell, and/or cancel the pending SR. In response to the sr counter reaching the maximum number of scheduling request transmission, the MAC entity of the wireless device may deactivate the activated SP CSI report configuration. The MAC entity of the wireless device may deactivate the activated SP CSI report configuration in response to the sr counter reaching the maximum number of scheduling request transmission and in response to not receiving an SP CSI reporting on PUCCH activation/deactivation MAC CE indicating a deactivation of the SP CSI report configuration. The MAC entity of the wireless device may stop the transmissions of the SP CSI report in response to the sr counter reaching the maximum number of scheduling request transmission. In an example, the wireless device may receive one or more second RRC messages reconfiguring SP CSI report parameters, the wireless device may not transmit SP CSI report unless receiving an activation/deactivation MAC CE indicating an activation of the SP CSI report. In an example, by the embodiment, the wireless device may avoid transmitting unexpected (or useless) SP CSI reports to the base station when receiving the SP CSI report reconfiguration RRC messages, therefore reducing power consumption.

Figure 39:
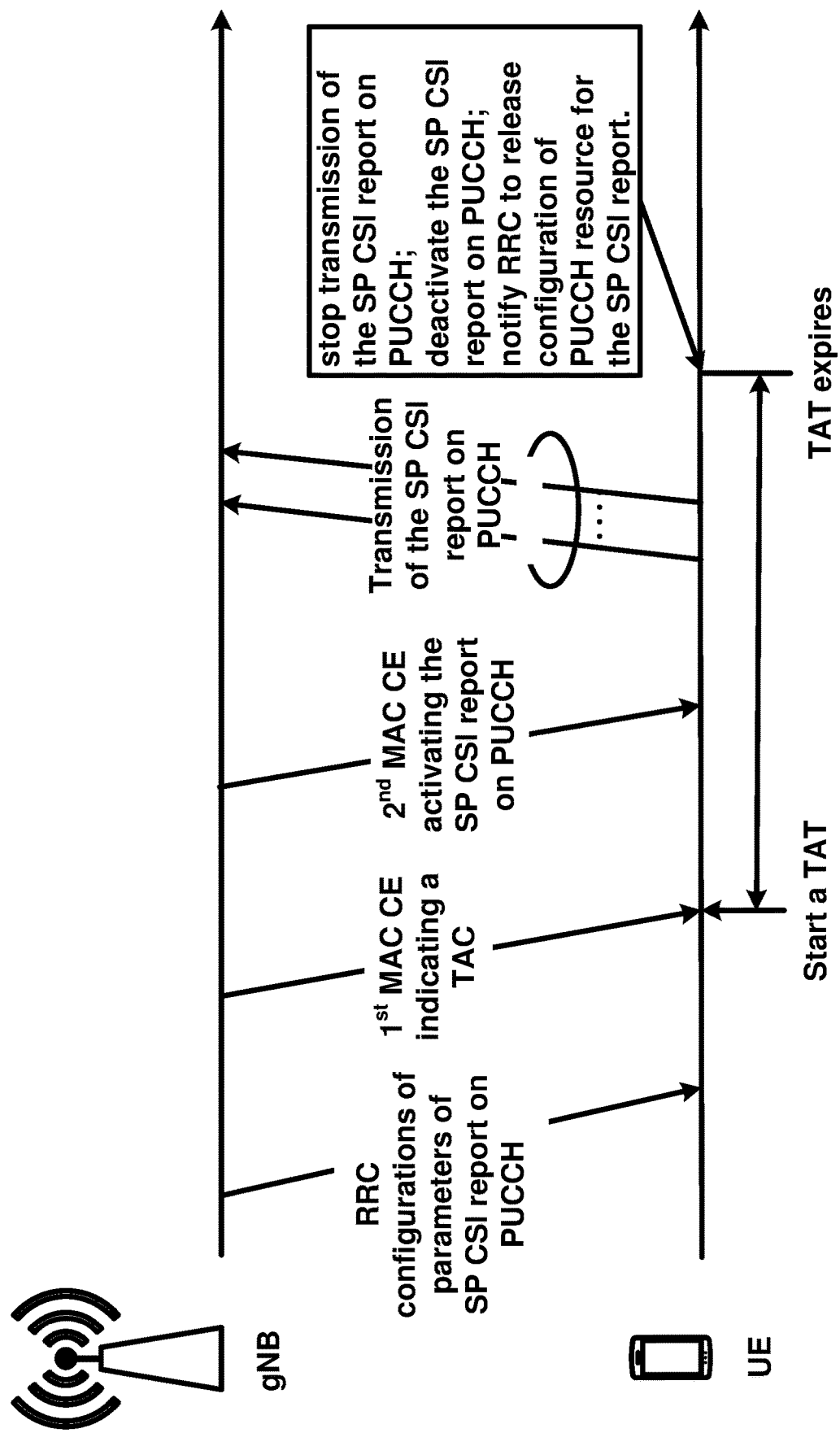
FIG. 39 is an example of SP CSI report transmission when TAT expires as per an aspect of an embodiment of the present disclosure.

FIG. 39 shows an example of embodiment of activation and deactivation of a SP CSI reporting on PUCCH while in a process of maintenance of uplink time alignment. In an example, a base station (e.g., gNB in FIG. 39) may transmit to a wireless device (e.g., UE in FIG. 39) one or more RRC messages comprising configuration parameters of SP CSI reporting on PUCCH. The configuration parameters may comprise at least one of: one RS resource setting; and/or one or more SP CSI reporting settings. In an example, a SP CSI report setting may comprise a set of SP CSI report parameters comprising at least one of: a SP CSI report configuration identifier; and/or one or more parameters for SP CSI reporting. The one or more parameters may comprise at least one of: a CSI type (e.g., Type I or Type II); a report quantity indicator (e.g., indicating a CSI-related quantity to report, or a L1-RSRP related quantity to report, etc.); a report configuration type (e.g., indicating the time domain behavior of the report—either aperiodic, semi-persistent, or periodic); a value indicating frequency granularity for CSI report; parameters indicating periodicity; slot offset of CSI report; and/or a PUCCH resource.

As shown in FIG. 39, the wireless device may receive a timing advance command MAC CE (e.g., $1^{st}$ MAC CE in FIG. 39) from the base station. The timing advance command MAC CE may be identified by a MAC PDU subheader with a LCID value set to a first value (e.g., "111101" as shown in FIG. 18). In response to receiving the timing advance command MAC CE, the wireless device may apply a timing advance command indicated by the timing advance command MAC CE and start a time alignment timer (e.g., TAT in FIG. 39) based on an RRC configured time alignment timer value. In an example, the wireless device may receive a SP CSI reporting on PUCCH activation/deactivation MAC CE (e.g., $2^{nd}$ MAC CE in FIG. 39) indicating an activation of a SP CSI report configuration of the one or more SP CSI reporting settings. The SP CSI reporting on PUCCH activation/deactivation MAC CE may be identified by a MAC PDU subheader with a LCID value set to a second value (e.g., "110011" as shown in FIG. 18). In response to receiving the SP CSI reporting on PUCCH activation/deactivation MAC CE, the wireless device may transmit one or more SP CSI report on PUCCH, based on parameters of the SP CSI report configuration. In an example, the wireless device may receive the timing advance command MAC CE before or after the SP CSI reporting on PUCCH activation/deactivation MAC CE.

As shown in FIG. 39, the time alignment timer may expire. The time alignment timer may expire in response to not receiving a timing advance command MAC CE during the time alignment timer being running. In response to the time alignment timer expiring, a MAC entity of the wireless device may flush HARQ buffers for all serving cells and notify an RRC layer (or entity) of the wireless device to release PUCCH/SRS resources for one or more serving cells. In response to the time alignment timer expiring, the MAC entity may clear one or more configured downlink assignments and uplink grants, consider all running time alignment timers as expired if a cell associated with the time alignment timer belong to a first cell group (e.g., primary timing advance group, PTAG), and/or maintain a current time value (e.g., $N_{TA}$). In response to the time alignment timer expiring, the MAC entity of the wireless device may deactivate the activated SP CSI report configuration. The MAC entity of the wireless device may deactivate the activated SP CSI report configuration in response to the time alignment timer expiring and in response to not receiving an SP CSI reporting on PUCCH activation/deactivation MAC CE indicating a deactivation of the SP CSI report configuration. The MAC entity of the wireless device may stop the transmissions of the SP CSI report in response to the time alignment timer expiring. In an example, the wireless device may receive one or more second RRC messages reconfiguring SP CSI report parameters, the wireless device may not transmit SP CSI report unless receiving an activation/deactivation MAC CE indicating an activation of the SP CSI report. In an example, by the embodiment, the wireless device may avoid transmitting unexpected (or useless) SP CSI reports to the base station when receiving the SP CSI report reconfiguration RRC messages, therefore reducing power consumption.

Figure 40:
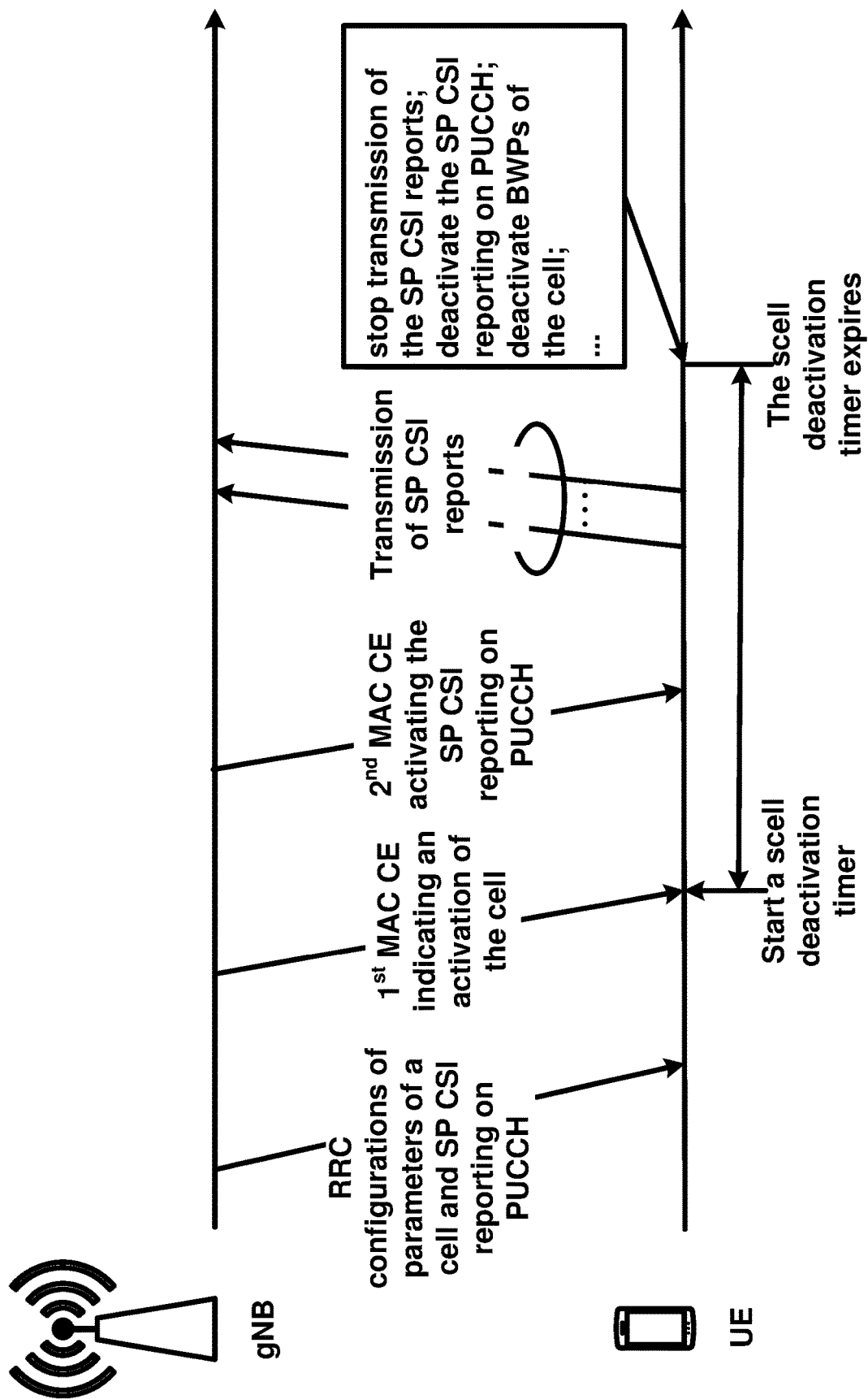
FIG. 40 is an example of SP CSI report transmission when a SCell deactivation timer expires as per an aspect of an embodiment of the present disclosure.

FIG. 40 shows an example of embodiment of activation and deactivation of a SP CSI reporting on PUCCH on a secondary cell. In an example, a base station (e.g., gNB in FIG. 40) may transmit to a wireless device (e.g., UE in FIG. 40) one or more RRC messages comprising first configuration parameters of a secondary cell and second configuration parameters of SP-CSI reporting on PUCCH. The first configuration parameters may comprise a sell deactivation timer value of a scell deactivation timer (e.g., sCellDeactivation-Timer) and one or more radio resource parameters of the secondary cell. The second configuration parameters may comprise at least one of: one RS resource setting; and/or one or more SP CSI reporting settings. In an example, a SP CSI report setting may comprise a set of SP CSI report parameters. The set of SP CSI report parameters may comprise at least one of: a SP CSI report configuration identifier; and/or one or more parameters for SP CSI reporting. The one or more parameters may comprise at least one of: a CSI type (e.g., Type I or Type II); a report quantity indicator (e.g., indicating a CSI-related quantity to report, or a L1-RSRP related quantity to report, etc.); a report configuration type (e.g., indicating the time domain behavior of the report—either aperiodic, semi-persistent, or periodic); a value indicating frequency granularity for CSI report; parameters indicating periodicity; slot offset of CSI report; and/or a PUCCH resource.

As shown in FIG. 40, the wireless device may receive a scell activation/deactivation MAC CE (e.g., $1^{st}$ MAC CE in FIG. 40) from the base station. The scell activation/deactivation MAC CE may be identified by a MAC PDU subheader with a LCID value set to a first value (e.g., "111001" or "111010" as shown in FIG. 18). In response to receiving the scell activation/deactivation MAC CE, the wireless device may activate the secondary cell and start the scell deactivation timer (e.g., scell deactivation timer in FIG. 40) based on the scell deactivation timer value. In an example, the wireless device may receive a SP CSI reporting on PUCCH activation/deactivation MAC CE (e.g., $2^{nd}$ MAC CE in FIG. 40) indicating an activation of a SP CSI report configuration of the one or more SP CSI reporting settings. The SP CSI reporting on PUCCH activation/deactivation MAC CE may be identified by a MAC PDU subheader with a LCID value set to a second value (e.g., "110011" as shown in FIG. 18). In response to receiving the SP CSI reporting on PUCCH activation/deactivation MAC CE, the wireless device may transmit one or more SP CSI report on PUCCH, based on parameters of the SP CSI report configuration. In an example, the wireless device may receive the scell activation/deactivation MAC CE before or after receives the SP CSI reporting on PUCCH activation/deactivation MAC CE.

As shown in FIG. 40, the scell deactivation timer may expire. The scell deactivation timer may expire in response to not receiving one or more DCIs or MAC PDUs on the secondary cell during the scell deactivation timer being running. In response to the scell deactivation timer expiring, a MAC entity of the wireless device may flush HARQ buffers for the secondary cell, clear one or more configured downlink assignments and uplink grants associated with the secondary cell, and/or deactivate the secondary cell. In response to the scell deactivation timer expiring, the MAC entity of the wireless device may deactivate the activated SP CSI report configuration. The MAC entity of the wireless device may deactivate the activated SP CSI report configuration in response to the scell deactivation timer expiring and in response to not receiving an SP CSI reporting on PUCCH activation/deactivation MAC CE indicating a deactivation of the SP CSI report configuration. The MAC entity of the wireless device may stop the transmissions of the SP CSI report in response to the scell deactivation timer expiring. In an example, the wireless device may receive one or more second RRC messages reconfiguring SP CSI report parameters, the wireless device may not transmit SP CSI report unless receiving an activation/deactivation MAC CE indicating an activation of the SP CSI report. In an example, by the embodiment, the wireless device may avoid transmitting unexpected (or useless) SP CSI reports to the base station when receiving the SP CSI report reconfiguration RRC messages, therefore reducing power consumption.

In an example, embodiment of FIG. 40 may similarly apply to the case of a secondary cell being transitioned to a dormant state. In an example, before the secondary cell is transitioned to a dormant state, a wireless device may perform a SP CSI report transmission on the secondary cell, based on an SP CSI reporting on PUCCH activation/deactivation MAC CE. The wireless device may transition the secondary cell into a dormant state in response to receiving one or more MAC CEs indicating a transitioning of the secondary cell into the dormant state (e.g., as shown in 21A, 21B, and/or 21C), or in response to a scell hibernation timer (e.g., sCellHibernationTimer) expiring. In response to the scell hibernation timer expiring, a MAC layer of the wireless device may deactivate the activated SP CSI report. A physical layer of the wireless device may stop the transmissions of the SP CSI report. In an example, in response to the scell hibernation timer expiring, the wireless device may: keep PUCCH resources associated with the SP CSI report; keep the activated SP CSI report in active state; transmitting the SP CSI report.

In an example, by the embodiments (e.g., FIGS. 38, 39, and/or 40), the wireless device may deactivate an activated SP CSI reporting on PUCCH in response to a scheduling request procedure failure or a time alignment timer expiring or a scell deactivation timer expiring. Deactivating the activated SP CSI reporting may avoid misalignment between a base station and the wireless device regarding a state of SP CSI reporting on PUCCH. In an example, the embodiments may reduce power consumption of CSI report transmission from the wireless device, and/or avoid unexpected behavior of CSI report after reconfiguring SP CSI report parameters.

Figure 41:
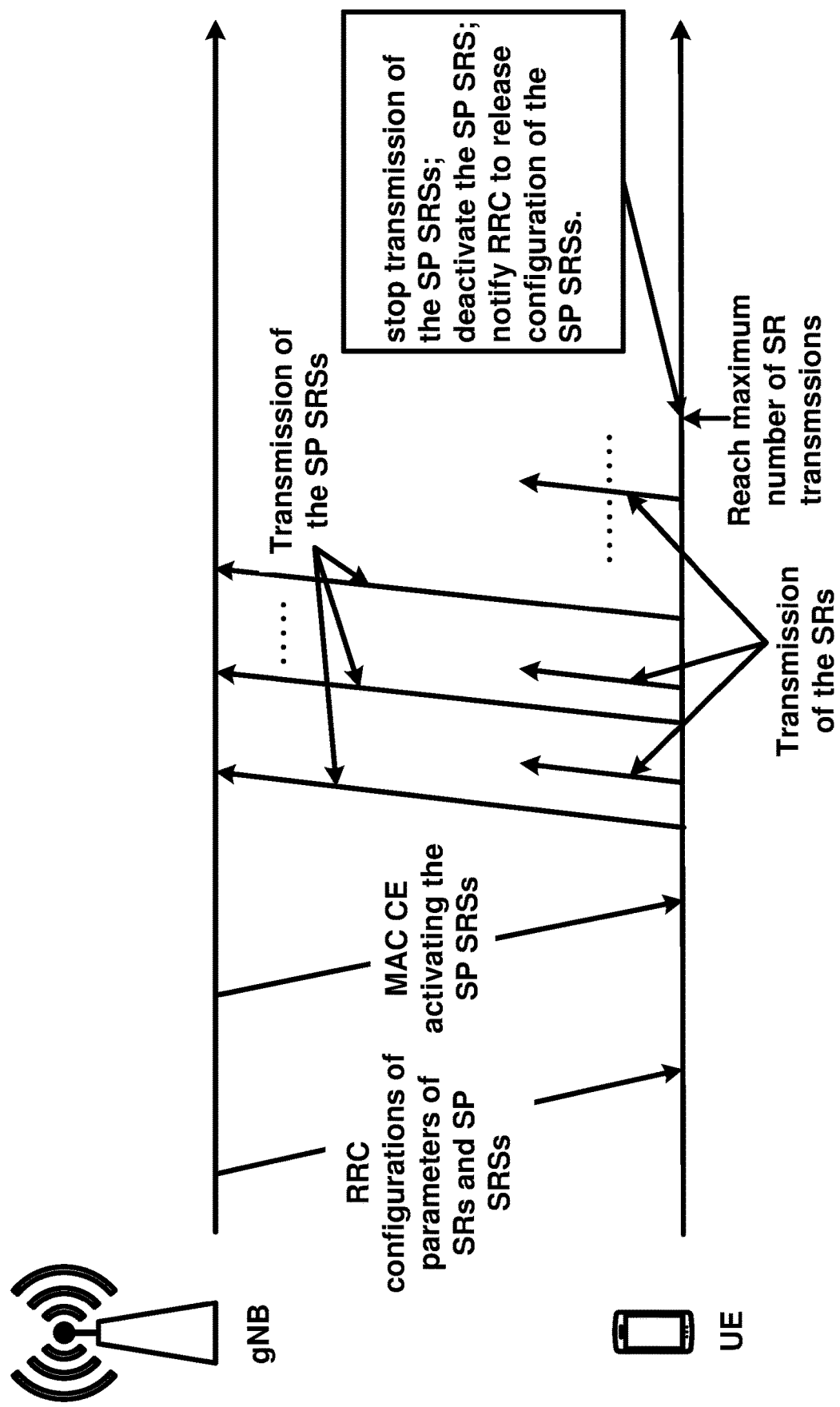
FIG. 41 is an example of SP SRS transmission when SR is triggered as per an aspect of an embodiment of the present disclosure.

FIG. 41 shows an example embodiment of activation and deactivation of a SP SRS transmission while performing a scheduling request procedure. In an example, a base station (e.g., gNB in FIG. 41) may transmit to a wireless device (e.g., UE in FIG. 41) one or more RRC messages comprising first configuration parameters of scheduling requests and second configuration parameters of one or more SP SRS resource sets. The first configuration parameters may comprise parameters of one or more scheduling request configurations. For each of the one or more scheduling request configurations, the first configuration parameters may indicate at least one of: a scheduling request prohibit timer; a first number indicating a maximum number of scheduling request transmission; a parameter indicating a periodicity and offset of scheduling request transmission; and/or a PUCCH resource identified by a PUCCH resource index. The second configuration parameters of a SP SRS resource set may comprise at least one of: a periodicity of the SP SRS transmission; a time/frequency radio resource; cyclic shift parameters; power control parameters; and/or other radio parameters (e.g., bandwidth, frequency hopping, transmission comb and offset, frequency-domain position).

In an example, when a scheduling request of a scheduling request configuration triggered (therefore in pending now) in response to a buffer status report being triggered on an LCH corresponding to the scheduling request configuration, a wireless device may set a sr counter (e.g., SR_COUNTER) to a first value (e.g., 0), if there is no other pending scheduling requests corresponding to the scheduling request configuration. As shown in FIG. 35, the wireless device may repeat one or more actions comprising at least one of: determining at least one valid PUCCH resource; checking whether a scheduling request prohibit timer is running; checking whether the sr counter is equal to or greater than the maximum number of scheduling request transmission; incrementing the sr counter (e.g., by one) in response to the sr counter being less than the maximum number of scheduling request transmission; transmitting the scheduling request and starting the scheduling request prohibit timer; and/or monitoring a PDCCH for uplink grant. In an example, the wireless device may receive a SP SRS activation/deactivation MAC CE (e.g., MAC CE in FIG. 41) indicating an activation of a SP SRS resource set of the one or more SP SRS resource sets. The SP SRS activation/deactivation MAC CE may be identified by a MAC PDU subheader with a LCID value set to a value (e.g., "110010" as shown in FIG. 18). In response to receiving the SP SRS activation/deactivation MAC CE, the wireless device may transmit one or more SP SRSs, based on configuration parameters of the SP SRS resource set. In an example, the wireless device may receive the SP SRS activation/deactivation MAC CE before or after the wireless device triggers the scheduling request procedure.

As shown in FIG. 41, the wireless device may perform the one or more SP SRS transmissions in at least a time duration when the scheduling request procedure is ongoing. The transmissions of the one or more SP SRS may overlap (e.g., fully or partially) in time with a plurality of transmissions of the scheduling request. The transmissions of the one or more SP SRS may interleave in time with a plurality of transmissions of the scheduling request. The wireless device may repeat a scheduling request transmission on PUCCH until receiving one or more UL grants accommodating pending data available for transmission or the sr counter reaching the maximum number of scheduling request transmission. In an example, the sr counter may reach to the maximum number of scheduling request transmission in response to not receiving the uplink grant or the received uplink grant not accommodating pending data available for transmission. In response to the sr counter reaching the maximum number of scheduling request transmission, a MAC entity of the wireless device may notify an RRC layer (or entity) of the wireless device to release PUCCH/SRS resources for one or more serving cells. In response to the sr counter reaching the maximum number of scheduling request transmission, the MAC entity may clear one or more configured downlink assignments and uplink grants, initiate a random access procedure on a PCell/PSCell, and/or cancel the pending scheduling request. In response to the sr counter reaching the maximum number of scheduling request transmission, the MAC entity of the wireless device may deactivate the activated SP SRS resource set. The MAC entity of the wireless device may deactivate the activated SP SRS resource set in response to the sr counter reaching the maximum number of scheduling request transmission and in response to not receiving an SP SRS activation/deactivation MAC CE indicating a deactivation of the SP SRS resource set. The MAC entity of the wireless device may stop the transmissions of the one or more SP SRS in response to the sr counter reaching the maximum number of scheduling request transmission. In an example, the wireless device may receive one or more second RRC messages reconfiguring SP SRS configuration parameters, the wireless device may not transmit a SP SRS unless receiving an SP SRS activation/deactivation MAC CE indicating an activation of a SP SRS resource set. In an example, by the embodiment, the wireless device may avoid transmitting unexpected (or useless) SP SRSs to the base station when receiving the SP SRS reconfiguration RRC messages, therefore reducing power consumption.

Figure 42:
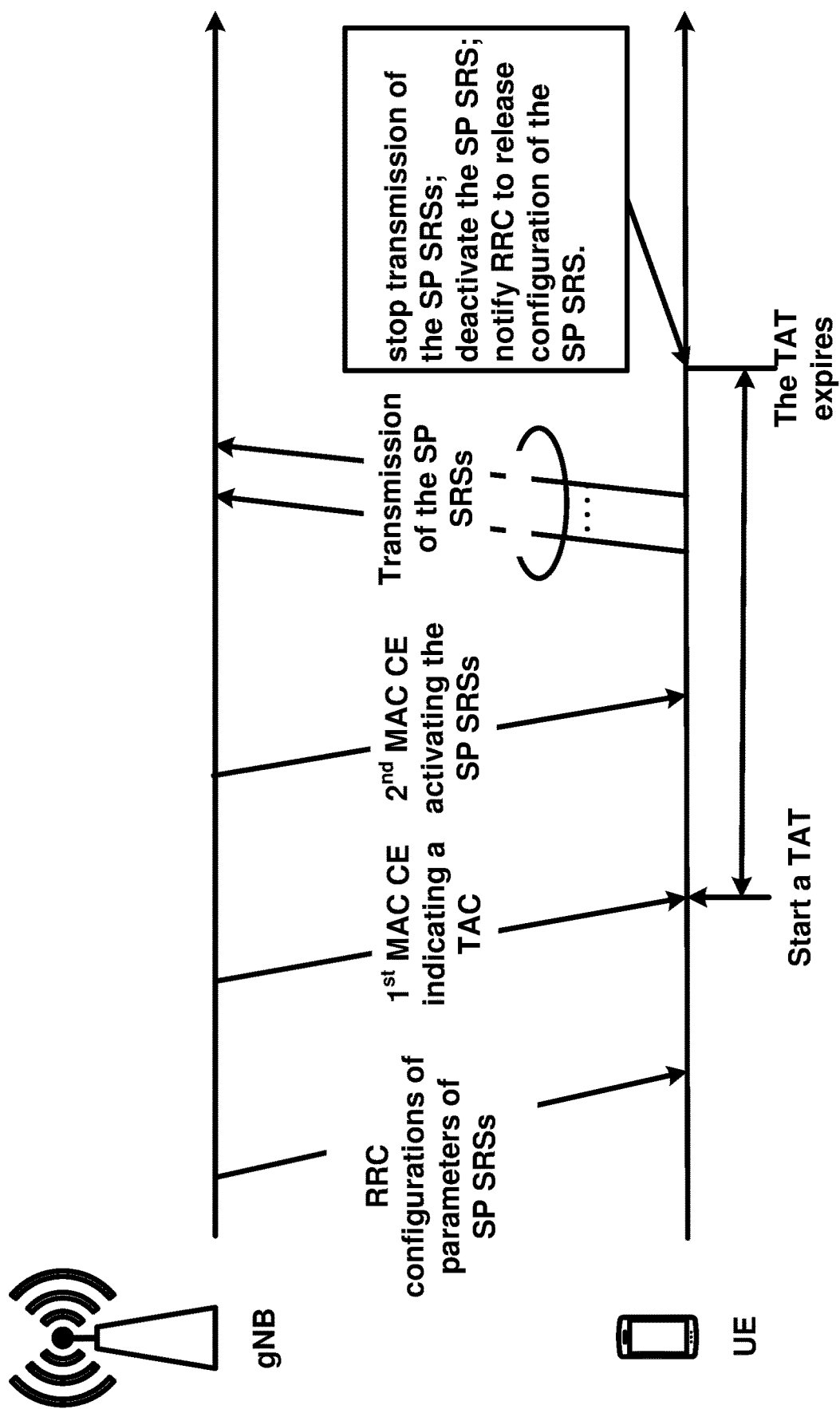
FIG. 42 is an example of SP SRS transmission when TAT expires as per an aspect of an embodiment of the present disclosure.

FIG. 42 shows an example of embodiment of activation and deactivation of a SP SRS transmission while in a process of maintenance of uplink time alignment. In an example, a base station (e.g., gNB in FIG. 42) may transmit to a wireless device (e.g., UE in FIG. 42) one or more RRC messages comprising configuration parameters of one or more SP SRS resource sets. The configuration parameters of a SP SRS resource set may comprise at least one of: a periodicity of the SP SRS transmission; a time/frequency radio resource; cyclic shift parameters; power control parameters; and/or other radio parameters (e.g., bandwidth, frequency hopping, transmission comb and offset, frequency-domain position).

As shown in FIG. 42, the wireless device may receive a timing advance command MAC CE (e.g., $1^{st}$ MAC CE in FIG. 42) from the base station. The timing advance command MAC CE may be identified by a MAC PDU subheader with a LCID value set to a first value (e.g., "111101" as shown in FIG. 18). In response to receiving the timing advance command MAC CE, the wireless device may apply a timing advance command indicated by the timing advance command MAC CE and start a time alignment timer (e.g., TAT in FIG. 42) based on an RRC configured time alignment timer value. In an example, the wireless device may receive a SP SRS activation/deactivation MAC CE (e.g., $2^{nd}$ MAC CE in FIG. 42) indicating an activation of a SP SRS resource set of the one or more SP SRS resource sets. In response to receiving the SP SRS activation/deactivation MAC CE, the wireless device may transmit one or more SP SRSs, based on parameters of the SP SRS resource set. In an example, the wireless device may receive the timing advance command MAC CE before or after receives the SP SRS activation/deactivation MAC CE.

As shown in FIG. 42, the time alignment timer may expire. The time alignment timer may expire in response to not receiving a timing advance command MAC CE during the time alignment timer being running. In response to the time alignment timer expiring, a MAC entity of the wireless device may flush HARQ buffers for all serving cells, notify an RRC layer (or entity) of the wireless device to release PUCCH/SRS resources for one or more serving cells, clear one or more configured downlink assignments and uplink grants, consider all running time alignment timers as expired if a cell associated with the time alignment timer belong to a first cell group (e.g., primary timing advance group, PTAG), and/or maintain a current time value (e.g., $N_{TA}$). In response to the time alignment timer expiring, the MAC entity of the wireless device may deactivate the activated SP SRS resource set. The MAC entity of the wireless device may deactivate the activated SP SRS resource set in response to the time alignment timer expiring and in response to not receiving an SP SRS activation/deactivation MAC CE indicating a deactivation of the SP SRS resource set. The MAC entity of the wireless device may stop the transmissions of the SP SRS in response to the time alignment timer expiring. In an example, the wireless device may receive one or more second RRC messages reconfiguring SP SRS resource sets, the wireless device may not transmit SP SRS unless receiving an activation/deactivation MAC CE indicating an activation of a SP SRS resource set. In an example, by the embodiment, the wireless device may avoid transmitting unexpected (or useless) SP SRSs to the base station when receiving the SP SRS reconfiguration RRC messages, therefore reducing power consumption.

Figure 43:
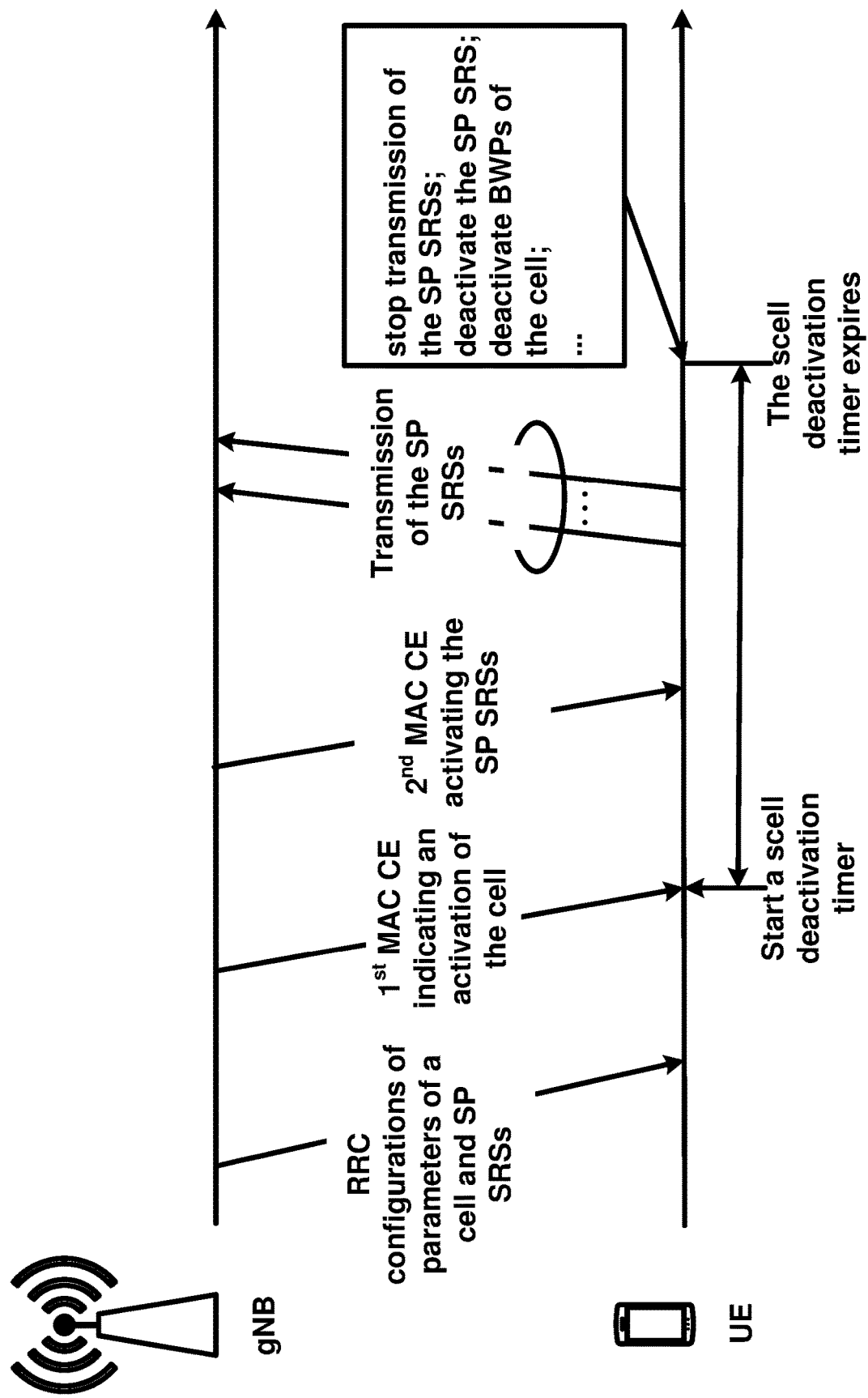
FIG. 43 is an example of SP SRS transmission when a SCell deactivation timer expires as per an aspect of an embodiment of the present disclosure.

FIG. 43 shows an example of embodiment of activation and deactivation of a SP SRS resource set on a secondary cell. In an example, a base station (e.g., gNB in FIG. 43) may transmit to a wireless device (e.g., UE in FIG. 43) one or more RRC messages comprising first configuration parameters of a secondary cell and second configuration parameters of one or more SP SRS resource sets. The first configuration parameters may comprise a sell deactivation timer value of a scell deactivation timer and one or more radio resource parameters of the secondary cell. The second configuration parameters of a SP SRS resource set may comprise at least one of: a periodicity of the SP SRS transmission; a time/frequency radio resource; cyclic shift parameters; power control parameters; and/or other radio parameters (e.g., bandwidth, frequency hopping, transmission comb and offset, frequency-domain position).

As shown in FIG. 43, the wireless device may receive a scell activation/deactivation MAC CE (e.g., $1^{st}$ MAC CE in FIG. 43) from the base station. The scell activation/deactivation MAC CE may be identified by a MAC PDU subheader with a LCID value set to a first value (e.g., "111001" or "111010" as shown in FIG. 18). In response to receiving the scell activation/deactivation MAC CE, the wireless device may activate the secondary cell and start the scell deactivation timer (e.g., scell deactivation timer in FIG. 43) based on the scell deactivation timer value. In an example, the wireless device may receive a SP SRS activation/deactivation MAC CE (e.g., $2^{nd}$ MAC CE in FIG. 43) indicating an activation of a SP SRS resource set of the one or more SP SRS resource sets. In response to receiving the SP SRS activation/deactivation MAC CE, the wireless device may transmit one or more SP SRSs, based on parameters of the SP SRS resource set via the activated secondary cell. In an example, the wireless device may receive the scell activation/deactivation MAC CE before or after receives the SP SRS activation/deactivation MAC CE.

As shown in FIG. 43, the scell deactivation timer may expire. The scell deactivation timer may expire in response to not receiving one or more DCIs or MAC PDUs on the secondary cell during the scell deactivation timer being running. In response to the scell deactivation timer expiring, a MAC entity of the wireless device may flush HARQ buffers for the secondary cell, clear one or more configured downlink assignments and uplink grants associated with the secondary cell, and/or deactivate the secondary cell. In response to the scell deactivation timer expiring, the MAC entity of the wireless device may deactivate the activated SP SRS resource set. The MAC entity of the wireless device may deactivate the activated SP SRS resource set in response to the scell deactivation timer expiring and in response to not receiving an SP SRS activation/deactivation MAC CE indicating a deactivation of the SP SRS resource set. The MAC entity of the wireless device may stop the transmissions of the SP SRS in response to the scell deactivation timer expiring. In an example, the wireless device may receive one or more second RRC messages reconfiguring SP SRS resource sets, the wireless device may not transmit SP SRS unless receiving an activation/deactivation MAC CE indicating an activation of a SP SRS resource set. In an example, by the embodiment, the wireless device may avoid transmitting unexpected (or useless) SP SRSs to the base station when receiving the SP SRS reconfiguration RRC messages, therefore reducing power consumption.

In an example, embodiment of FIG. 43 may similarly apply to the case of a secondary cell being transitioned to a dormant state. In an example, before the secondary cell is transitioned to a dormant state, a wireless device may perform a SP SRS transmission on the secondary cell, based on an SP SRS activation/deactivation MAC CE. The wireless device may transition the secondary cell into a dormant state in response to receiving one or more MAC CEs indicating a transitioning of the secondary cell into the dormant state (e.g., as shown in 21A, 21B, and/or 21C), or in response to a scell hibernation timer (e.g., sCellHibernationTimer) expiring. In response to the scell hibernation timer expiring, a MAC layer of the wireless device may deactivate an activated SP SRS resource set. A physical layer of the wireless device may stop the transmissions of the SP SRSs. In an example, in response to the scell hibernation timer expiring, the wireless device may: keep (e.g., not release) the SP SRS resource set in RRC layer; keep the activated SP SRS resource set in active state (in a MAC entity of the wireless device); transmitting the SP SRSs.

In an example, by the embodiments (e.g., FIGS. 41, 42, and/or 43), the wireless device may deactivate an activated SP SRS resource set in response to a scheduling request procedure failure or a time alignment timer expiring or a scell deactivation timer expiring. Deactivating the activated SP SRS resource set may avoid misalignment between a base station and the wireless device regarding a state of SP SRS resource set in a MAC entity of the wireless device. In an example, the embodiments may reduce power consumption of SRS transmission from the wireless device, and/or avoid unexpected behavior of SRS transmission after reconfiguring SP SRS configuration parameters.

In an example, a wireless device may receive from a base station, one or more RRC messages comprising first parameters of semi-persistent (SP) SRS resources and second parameters of scheduling requests. The second parameters may comprise at least a first number indicating an allowable number of transmissions of the scheduling requests. In an example, the wireless device may receive a MAC CE indicating activation of transmission of at least one SP SRS of the SP SRS resources. The wireless device may transmit the at least one SP SRS in response to receiving the MAC CE. The wireless device may transmit a scheduling request based on the second parameters of the scheduling requests, in response to triggering a buffer status report. In response to a scheduling request transmission counter being greater than the first number, the wireless device may: stop transmitting the at least one SP SRS; deactivating the at least one SP SRS; and/or notify an RRC of the wireless device to release the SP SRS resources.

In an example, the wireless device may increment the scheduling request transmission counter by one, in response to the transmission of the scheduling request. The scheduling request transmission counter may be initialized to zero when triggering the buffer status report.

In an example, a wireless device may receive from a base station, one or more RRC messages comprising parameters of SP SRS resources. The wireless device may receive a first MAC CE indicating a timing advance command. The wireless device may start a time alignment timer with a first timer value in response to the first MAC CE. The wireless device may receive a second MAC CE indicating activation of transmission of at least one SP SRS of the SP SRSs resources. The wireless device may transmit the at least one SP SRS in response to the second MAC CE. In response to the time alignment timer expiring, the wireless device may: stop transmitting the at least one SP SRS; deactivate the at least one SP SRS; and notify a radio resource control layer of the wireless device to release the SP SRS resources.

FIG. 44 is a flow diagram as per an aspect of an example embodiment of the present disclosure. At 4410, a wireless device my receive configuration parameters of a cell. The configuration parameters comprise first configuration of first SRS(s) for a first power state and second configuration of second SRS(s) for a second power state. At 4420, the wireless device may receive a first command indicating transition of the cell into the first power state. At 4430, the wireless device transmits the first SRS(s) via the cell in the first power state. At 4440, the wireless device may receive a second command indicating transition of the cell into the second power state. At 4450, the wireless device transmits, in response to the second command, the second SRS(s) via the cell in the second power state.

According to an example embodiment, a first power state may comprise a non-power-saving state or an active state of the cell. A wireless device, in the first power state, performs at least one of: monitoring downlink control channel for/on the cell, receiving downlink transport blocks via the cell, transmitting uplink control channel or uplink shared channel for/on the cell, and/or transmitting channel state information report on/for the cell.

According to an example embodiment, a second power state may comprise a power saving state of the cell. A wireless device, in the second power state, performs at least one of: refraining from monitoring downlink control channel on/for the cell, refraining from receiving downlink TBs via the cell, refraining from transmitting PUCCH/PUSCH/RACH on/for the cell, transmitting CSI report for the cell.

According to an example embodiment, the first configuration indicates a first number of OFDM symbols for transmission of the first SRS(s). The second configuration indicates a second number of OFDM symbols for transmission of the second SRS(s).

According to an example embodiment, the wireless device stops the transmitting the first SRS(s) in response to receiving the second command. The second SRS(s) may comprise one or more uplink positioning RS. The first command may comprise a RRC message, and/or a MAC CE.

According to an example embodiment, the first configuration indicates a first number of antenna ports for transmission of the first SRS(s). The second configuration indicates a second number of antenna ports for transmission of the second SRS(s). The second number may be equal to or smaller than the first number.

According to an example embodiment, the first configuration indicates a first periodicity value of transmission of the first SRS(s). The second configuration indicates a second periodicity value for transmission of the second SRS(s). The second periodicity value may be equal to or smaller than the first periodicity value.

According to an example embodiment, the second command may comprise at least a DCI received via a downlink control channel. The at least DCI may not comprise an SRS indication. CRC bits of the at least DCI may be scrambled with a RNTI dedicated for reception of the second command. The RNTI may be independently and/or separately configured from a C-RNTI, the C-RNTI being configured for reception of a second DCI indicating downlink assignment or uplink grant.

According to an example embodiment, the cell comprises a plurality of BWPs. The first configuration is on a first BWP of the plurality of BWPs. The second configuration is on a second BWP of the plurality of BWPs. The first BWP may be different from the second BWP. The wireless device transmits the first SRS(s) via the first BWP of the cell. The wireless device transmits the second SRS(s) via the second BWP of the cell.

Figure 45:
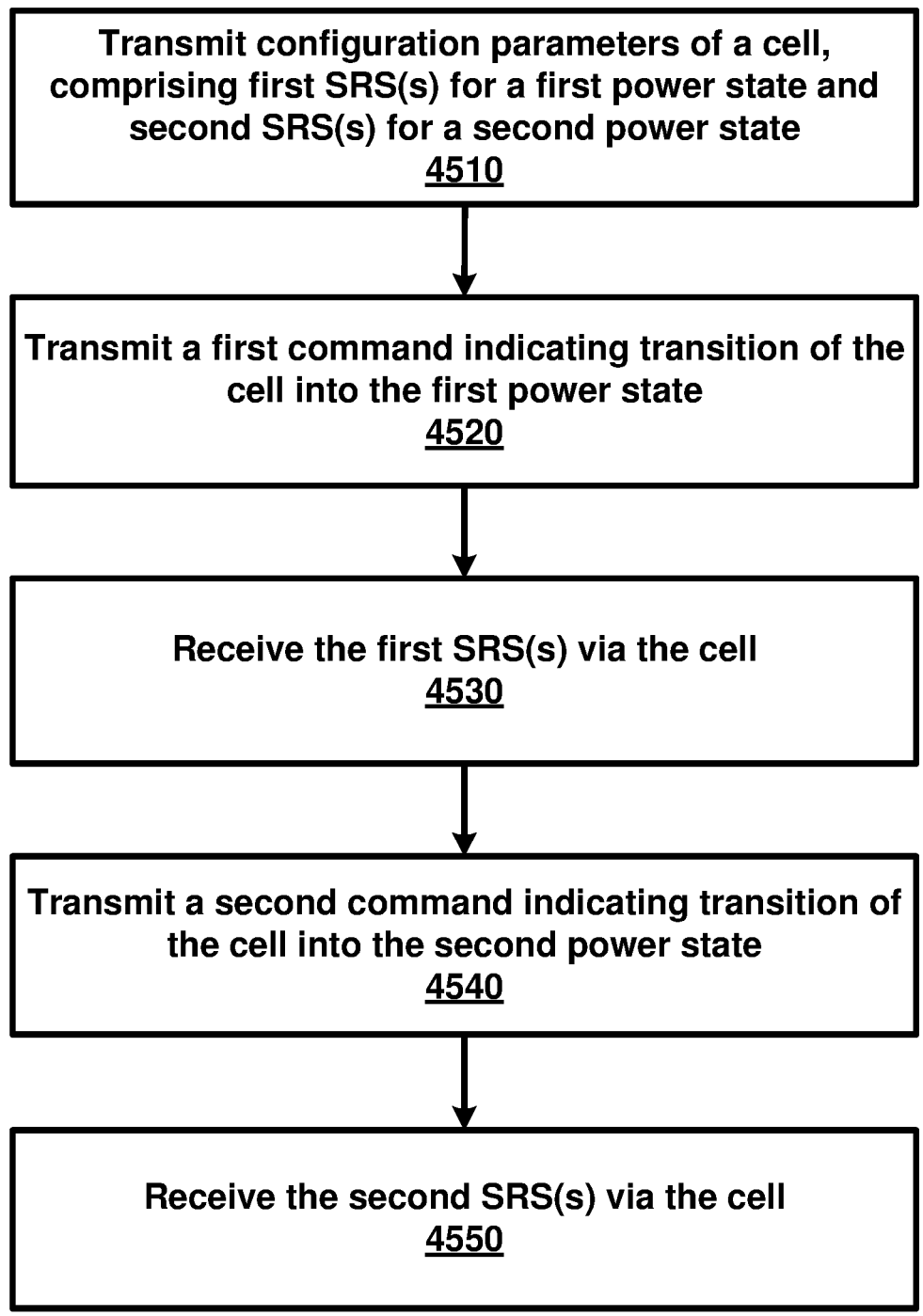
FIG. 45 a flowchart of an example SRS transmission in a power saving state as per an aspect of an embodiment of the present disclosure.

FIG. 45 is a flow diagram as per an aspect of an example embodiment of the present disclosure. At 4510, a base station transmits to a wireless device, configuration parameters of a cell, the configuration parameters comprising first SRS(s) for a first power state and second SRS(s) for a second power state. At 4520, the base station may transmit a first command indicating transition of the cell into the first power state. At 4530, the base station may receive from the wireless device the first SRS(s) via the cell in the first power state. At 4540, the base station may transmit a second command indicating transition of the cell into the second power state. At 4550, the base station may receive the second SRS(s) via the cell in the second power state. The first power state may be a duration when the cell is in active state, or in a non-power-saving state. The second power state may be a duration when the cell is in a power saving state.

Figure 46:
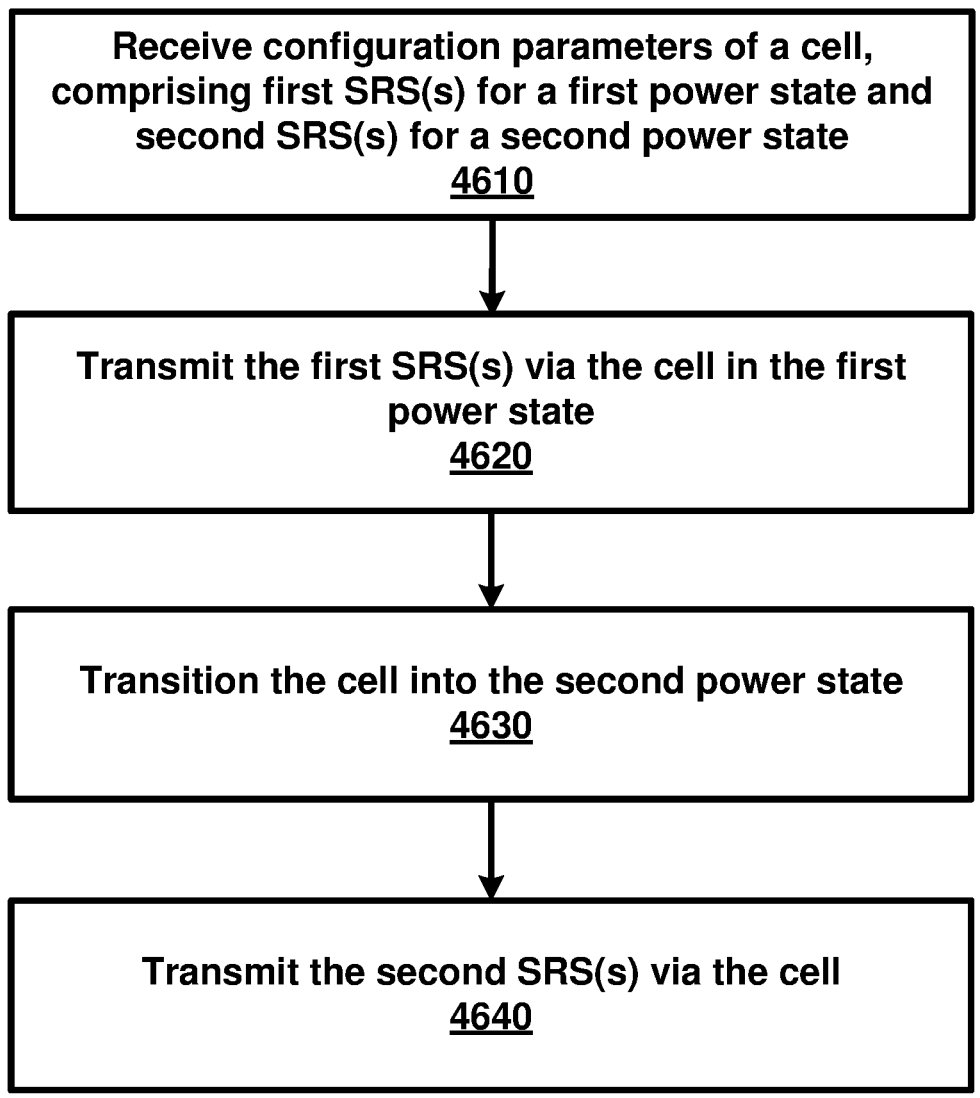
FIG. 46 a flowchart of an example SRS transmission in a power saving state as per an aspect of an embodiment of the present disclosure.

FIG. 46 is a flow diagram as per an aspect of an example embodiment of the present disclosure. At 4610, a wireless device receives, from a base station, configuration parameters of a cell, the configuration parameters comprising first SRS(s) for a first power state and second SRS(s) for a second power state. At 4620, the wireless device transmits first SRS(s) via the cell in the first power state. At 4630, the wireless device transitions the cell into the second power state from the first power state. At 4640, the wireless device transmits the second SRS(s) via the cell in the second power state. The first power state may be a duration when the cell is in active state, or in a non-power-saving state. The second power state may be a duration when the cell is in a power saving state.

Figure 47:
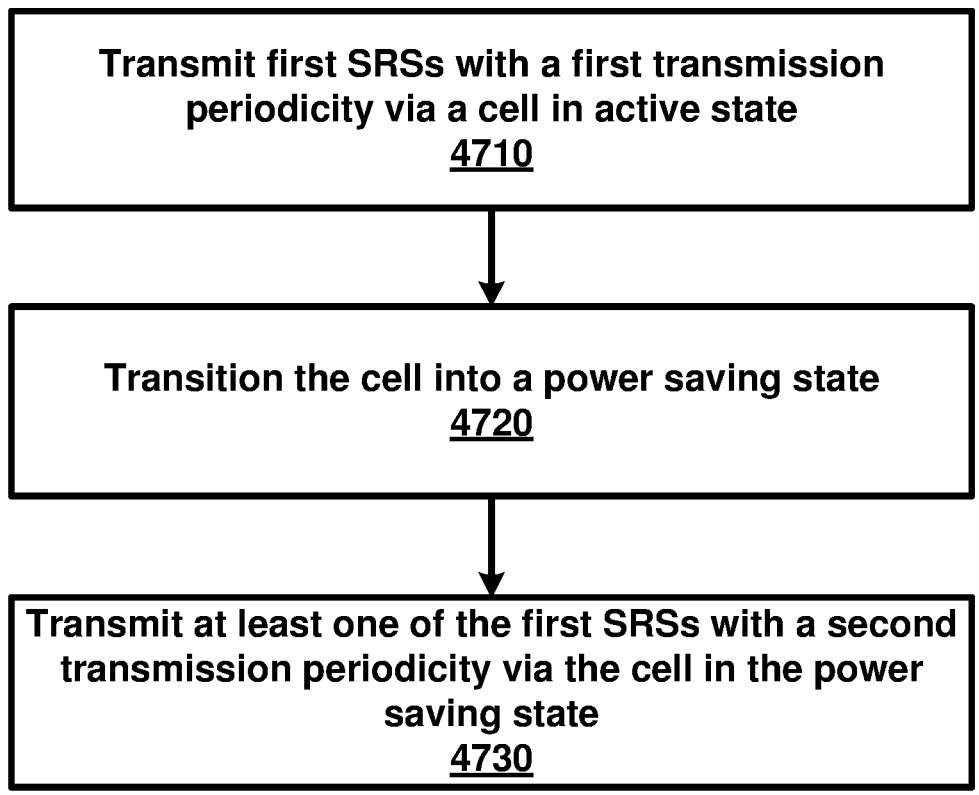
FIG. 47 is a flowchart of an example SRS transmission in a power saving state as per an aspect of an embodiment of the present disclosure.

FIG. 47 is a flow diagram as per an aspect of an example embodiment of the present disclosure. At 4710, a wireless device transmits first SRSs with a first transmission periodicity via a cell in active state. At 4720, the wireless device may transition the cell into a power saving state from the active state. At 4730, the wireless device transmits at least one of the first SRSs with a second transmission periodicity via the cell in the power saving state. The second transmission periodicity may be smaller than the first transmission periodicity.

FIG. 48 is a flow diagram as per an aspect of an example embodiment of the present disclosure. At 4810, a wireless device receives from a base station, configuration parameters of a cell, the configuration parameters comprising first parameters of a first power state and a second power state, and second parameters of uplink radio resources of SRS(s) in the first power state of the cell. At 4820, the wireless device may transmit, in the first power state, the SRS(s) via at least one of the uplink radio resources of the cell, the SRS(s) indicating a transition of the cell to the second power state. At 4830, the wireless device, based on the transmitting the SRS(s), transitions the cell to the second power state from the first power state. At 4840, the wireless device may start monitoring a PDCCH via the cell in the second power state, for receiving a DCI. At 4850, the wireless device may transmit uplink TBs via an uplink grant based on receiving the DCI.

Figure 49:
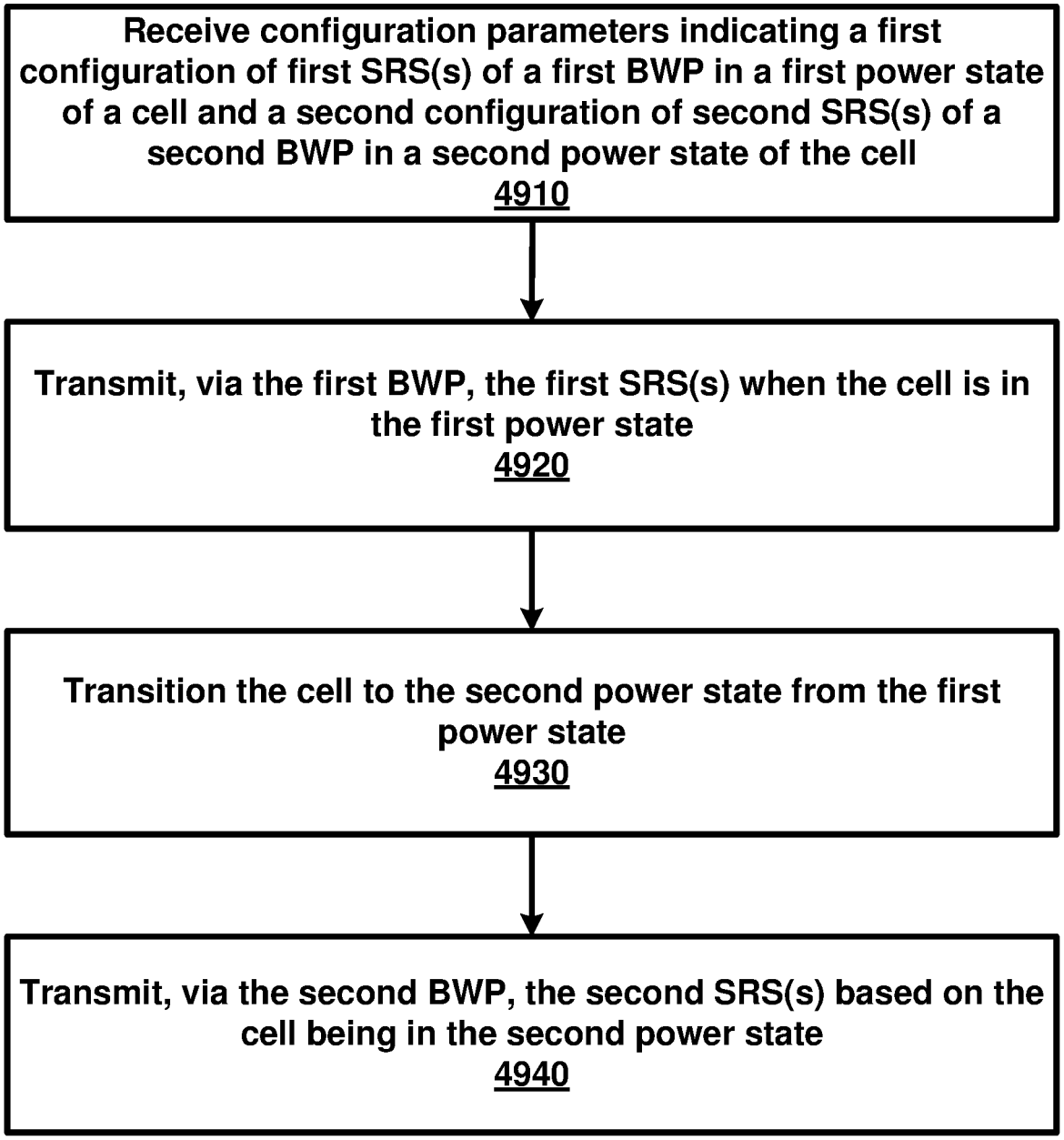
FIG. 49 is a flowchart of an example SRS transmission in a power saving state as per an aspect of an embodiment of the present disclosure.

FIG. 49 is a flow diagram as per an aspect of an example embodiment of the present disclosure. At 4910, a wireless device receives from a base station, configuration parameters indicating a first configuration of first SRS(s) of a first BWP of a cell for a first power state of the cell and a second configuration of second SRS(s) of a second BWP of the cell for a second power state of the cell. At 4920, the wireless device transmits, via the first BWP, the first SRS(s) when the cell is in the first power state. At 4930, the wireless device may transition the cell to the second power state from the first power state. At 4940, the wireless device transmits, via the second BWP, the second SRS(s) based on the cell being in the second power state. The first power state may be a duration when the cell is in active state, or in a non-power-saving state. The second power state may be a duration when the cell is in a power saving state. The first BWP may be different from the second BWP. The first BWP may be an active BWP of the cell. The second BWP may be a default BWP of the cell.

Figure 50:
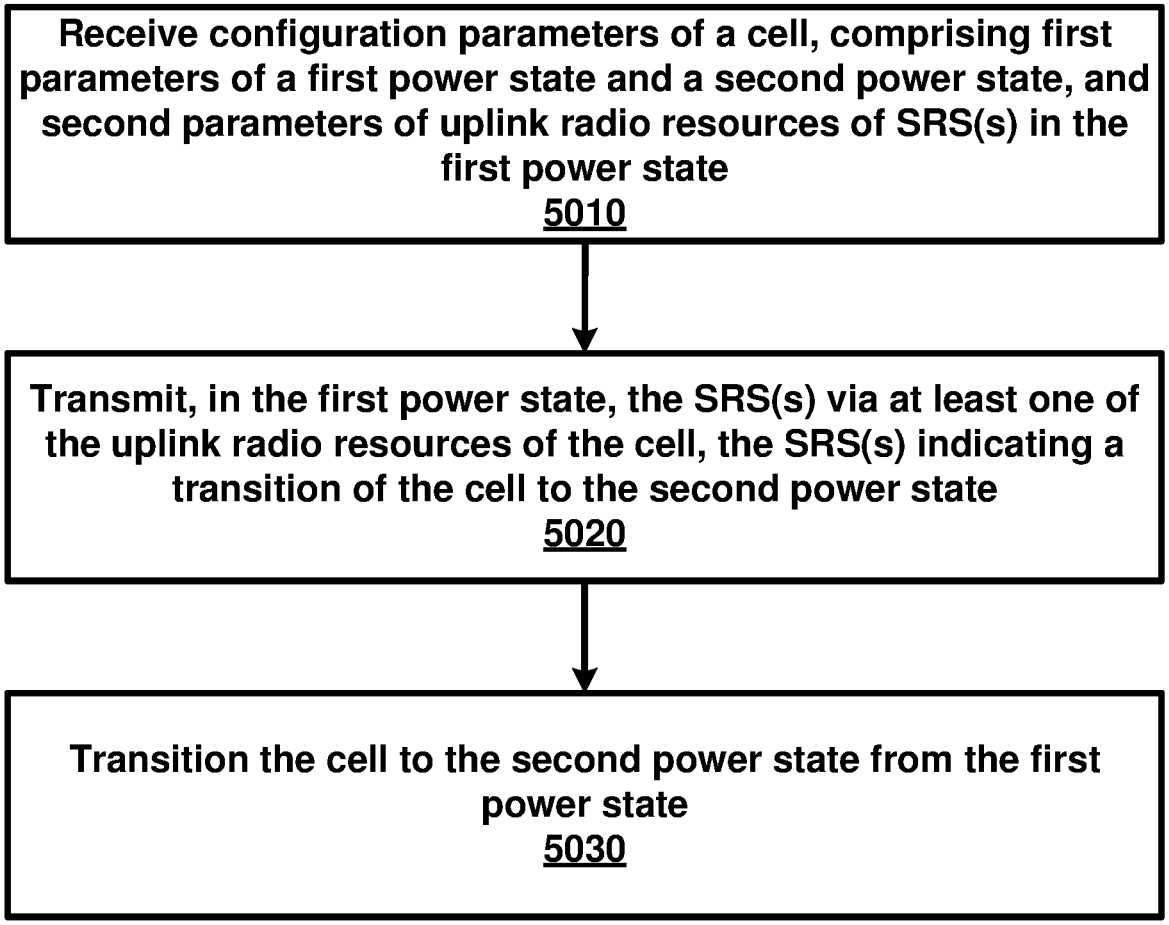
FIG. 50 is a flowchart of an example SRS transmission in a power saving state as per an aspect of an embodiment of the present disclosure.

FIG. 50 is a flow diagram as per an aspect of an example embodiment of the present disclosure. At 5010, a wireless device receives from a base station, configuration parameters of a cell, the configuration parameters comprising first parameters of a first power state and a second power state, and second parameters of uplink radio resources of SRS(s) for the first power state of the cell. At 5020, the wireless device may transmit, in the first power state, the SRS(s) via at least one of the uplink radio resources of the cell, the SRS(s) indicating a transition of the cell to the second power state. At 5030, the wireless device, based on the transmitting the SRS(s), transitions the cell to the second power state from the first power state. The first power state may be a duration when the cell is in active state, or in a non-power-saving state. The second power state may be a duration when the cell is in a power saving state.

Figure 51:
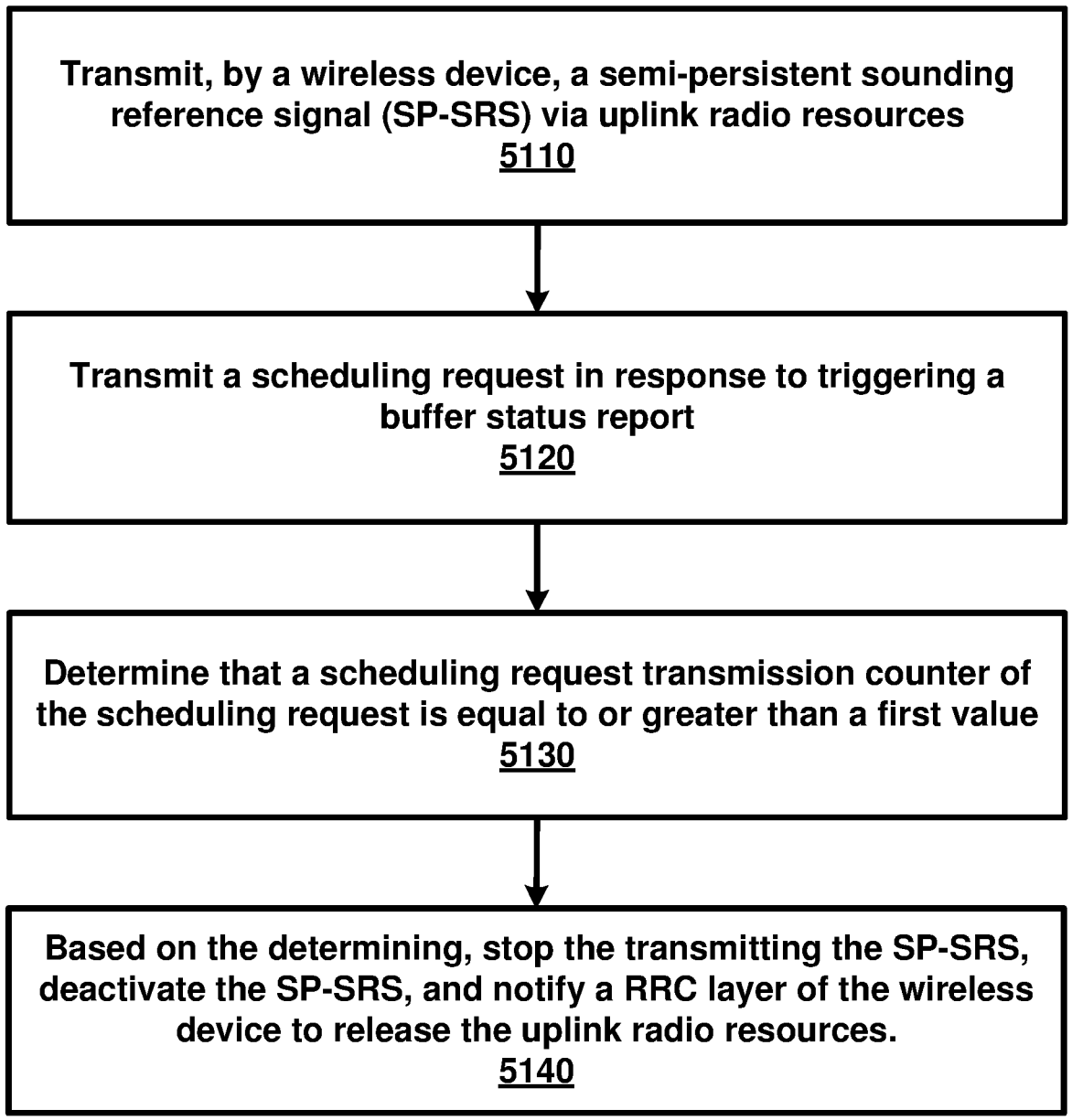
FIG. 51 is a flowchart of an example SP-SRS transmission when SR is triggered as per an aspect of an embodiment of the present disclosure.

FIG. 51 is a flow diagram as per an aspect of an example embodiment of the present disclosure. At 5110, a wireless device transmits a SP-SRS via uplink radio resources of a cell. At 5120, the wireless device may transmit a scheduling request in response to triggering a buffer status report. At 5130, the wireless device may determine that a scheduling request transmission counter of the scheduling request is equal to or greater than a first value. At 5140, the wireless device may, based on the determining, stop the transmitting the SP-SRS by a physical layer of the wireless device, deactivate the SP-SRS by a MAC layer of the wireless device, and notify an RRC layer of the wireless device to release the uplink radio resources. The first value is configured in an RRC message for the scheduling request. The SP-SRS is activated based on a MAC CE or a DCI. The wireless device deactivates the SP-SRS, regardless of whether the wireless device receives a SP-SRS deactivation command.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    receiving, by a wireless device, one or more radio resource control messages comprising configuration parameters of a cell, the configuration parameters comprising:
        a first configuration of a first sounding reference signal of the cell in a first power state, wherein the first power state is a non-power-saving state of the cell; and
        a second configuration of a second sounding reference signal of the cell in a second power state, wherein the second power state is a power-saving state of the cell;
    receiving a first command indicating that the cell is being transitioned into the first power state;
    transmitting, in response to the first command and via the cell, the first sounding reference signal;
    receiving a second command indicating that the cell is being transitioned into the second power state; and
    transmitting, in response to the second command and via the cell, the second sounding reference signal.

2. The method of claim 1, wherein the non-power-saving state is a power state in which the wireless device performs at least one of:
    monitoring downlink control channel on the cell;
    monitoring downlink control channel for the cell;
    receiving downlink transport blocks via the cell;
    transmitting uplink control channel or uplink shared channel on the cell; or
    transmitting channel state information report for the cell.

3. The method of claim 1, wherein the power-saving state is a power state in which the wireless device performs at least one of:
    stopping monitoring downlink control channel on the cell;
    stopping monitoring downlink control channel for the cell;
    stopping receiving downlink transport blocks via the cell;
    stopping transmitting uplink control channel or uplink shared channel on the cell;
    not transmitting on resource of a random access channel of the cell; or
    transmitting channel state information report for the cell.

4. The method of claim 1, wherein:
    the first configuration indicates a first number of orthogonal frequency division multiplexing (OFDM) symbols for transmission of the first sounding reference signal; and
    the second configuration indicates a second number of OFDM symbols for transmission of the second sounding reference signal.

5. The method of claim 1, further comprising stopping the transmitting the first sounding reference signal in response to receiving the second command.

6. The method of claim 1, wherein the second sounding reference signal comprises an uplink positioning reference signal.

7. The method of claim 1, wherein the first command comprises at least a radio resource control message or a medium access control element.

8. The method of claim 1, wherein:
    the first configuration indicates a first number of antenna ports for transmission of the first sounding reference signal; and
    the second configuration indicates a second number of antenna ports for transmission of the second sounding reference signal, wherein the second number is equal to or smaller than the first number.

9. The method of claim 1, wherein:
    the first configuration indicates a first periodicity value for transmission of the first sounding reference signal; and
    the second configuration indicates a second periodicity value for transmission of the second sounding reference signal, wherein the second periodicity value is equal to or less than the first periodicity value.

10. The method of claim 1, wherein:
    the cell comprises a plurality of bandwidth parts;
    the first configuration is on a first bandwidth part of the plurality of bandwidth parts of the cell; and
    the second configuration is on a second bandwidth part of the plurality of bandwidth parts of the cell.

11. The method of claim 10, wherein the first bandwidth part is different from the second bandwidth part.

12. The method of claim 11, further comprising:
    transmitting the first sounding reference signal via the first bandwidth part of the cell; and
    transmitting the second sounding reference signal via the second bandwidth part of the cell.

13. A wireless device comprising:
    one or more processors;
    memory storing instructions that, when executed by the one or more processors, cause the wireless device to:
        receive one or more radio resource control messages comprising configuration parameters of a cell, the configuration parameters comprising:
            a first configuration of a first sounding reference signal of the cell in a first power state, wherein the first power state is a non-power-saving state of the cell; and
            a second configuration of a second sounding reference signal of the cell in a second power state, wherein the second power state is a power-saving state of the cell;
        receive a first command indicating that the cell is being transitioned into the first power state;
        transmit, in response to the first command and via the cell, the first sounding reference signal;
        receive a second command indicating that the cell is being transitioned into the second power state; and transmit, in response to the second command and via the cell, the second sounding reference signal.

14. The wireless device of claim 13, wherein:
the first configuration indicates a first number of orthogonal frequency division multiplexing (OFDM) symbols for transmission of the first sounding reference signal; and
the second configuration indicates a second number of OFDM symbols for transmission of the second sounding reference signal.

15. The wireless device of claim 13, wherein the instructions further cause the wireless device to stop the transmitting the first sounding reference signal in response to receiving the second command.

16. The wireless device of claim 13, wherein:
the first configuration indicates a first number of antenna ports for transmission of the first sounding reference signal; and
the second configuration indicates a second number of antenna ports for transmission of the second sounding reference signal, wherein the second number is equal to or smaller than the first number.

17. The wireless device of claim 13, wherein:
the first configuration indicates a first periodicity value for transmission of the first sounding reference signal; and
the second configuration indicates a second periodicity value for transmission of the second sounding reference signal, wherein the second periodicity value is equal to or less than the first periodicity value.

18. The wireless device of claim 13, wherein:
the cell comprises a plurality of bandwidth parts;
the first configuration is on a first bandwidth part of the plurality of bandwidth parts of the cell; and
the second configuration is on a second bandwidth part of the plurality of bandwidth parts of the cell.

19. The wireless device of claim 18, wherein the instructions further cause the wireless device to:
transmit the first sounding reference signal via the first bandwidth part of the cell; and
transmit the second sounding reference signal via the second bandwidth part of the cell.

20. A system comprising:
a base station comprising:
one or more first processors;
first memory storing instructions that, when executed by the one or more first processors, cause the base station to:
transmit one or more radio resource control messages comprising configuration parameters of a cell, the configuration parameters comprising:
a first configuration of a first sounding reference signal of the cell in a first power state, wherein the first power state is a non-power-saving state of the cell; and
a second configuration of a second sounding reference signal of the cell in a second power state, wherein the second power state is a power-saving state of the cell;
transmit a first command indicating that the cell is being transitioned into the first power state for a wireless device;
receive, in response to the first command and via the cell, the first sounding reference signal;
transmit a second command indicating that the cell is being transitioned into the second power state for the wireless device; and
receive, in response to the second command and via the cell, the second sounding reference signal;
the wireless device comprising:
one or more second processors;
second memory storing instructions that, when executed by the one or more second processors, cause the wireless device to:
receive, from the base station, the one or more radio resource control messages;
receive, from the base station, the first command indicating that the the cell is being transitioned into the first power state;
transmit, in response to the first command and via the cell, the first sounding reference signal to the base station;
receive, from the base station, the second command indicating that the cell is being transitioned into the second power state; and
transmit, in response to the second command and via the cell, the second sounding reference signal.

* * * * *